United States Patent [19]

Wilhite

[11] 4,156,278
[45] May 22, 1979

[54] MULTIPLE CONTROL STORE MICROPROGRAMMABLE CONTROL UNIT INCLUDING MULTIPLE FUNCTION REGISTER CONTROL FIELD

[75] Inventor: John E. Wilhite, Glendale, Ariz.

[73] Assignee: Honeywell Information Systems Inc., Waltham, Mass.

[21] Appl. No.: 853,937

[22] Filed: Nov. 22, 1977

[51] Int. Cl.² .................. G06F 9/16; G06F 13/00
[52] U.S. Cl. .................................................. 364/200
[58] Field of Search ..................... 364/200 MS File

[56] References Cited

U.S. PATENT DOCUMENTS

| 3,766,532 | 10/1973 | Liebel, Jr. ........................ 364/200 |
| 3,800,293 | 3/1974 | Enger et al. ..................... 364/200 |
| 3,872,447 | 3/1975 | Tessera et al. .................. 364/200 |
| 4,042,972 | 8/1977 | Gruner et al. .................. 364/200 |
| 4,070,703 | 1/1978 | Negi ................................ 364/200 |

*Primary Examiner*—Harvey E. Springborn
*Attorney, Agent, or Firm*—Faith F. Driscoll; Nicholas Prasinos; Ronald T. Reiling

[57] ABSTRACT

A microprogrammable control unit of a data processing unit includes first and second control stores. The first control store is addressed initially by the operation code of a program instruction for read out of an address field, a control sequence field and a register control field. The second control store is arranged to store a plurality of microinstruction sequences for executing program instructions. The control sequence field conditions hardware sequence control circuits to execute operations during instruction and cache cycles of program instruction processing. The address field is used for accessing a microinstruction sequence during the execution cycles of program instruction processing for completion of the operation specified by a program instruction. The register control field is used to condition register circuits, register busy circuits or increment circuits for selecting various program visible registers, for controlling the updating of registers or for specifying an increment value to be added to the program instruction counter respectively during the processing of program instructions in the hardware sequence circuits and microinstruction sequences stored in the second control store.

36 Claims, 30 Drawing Figures

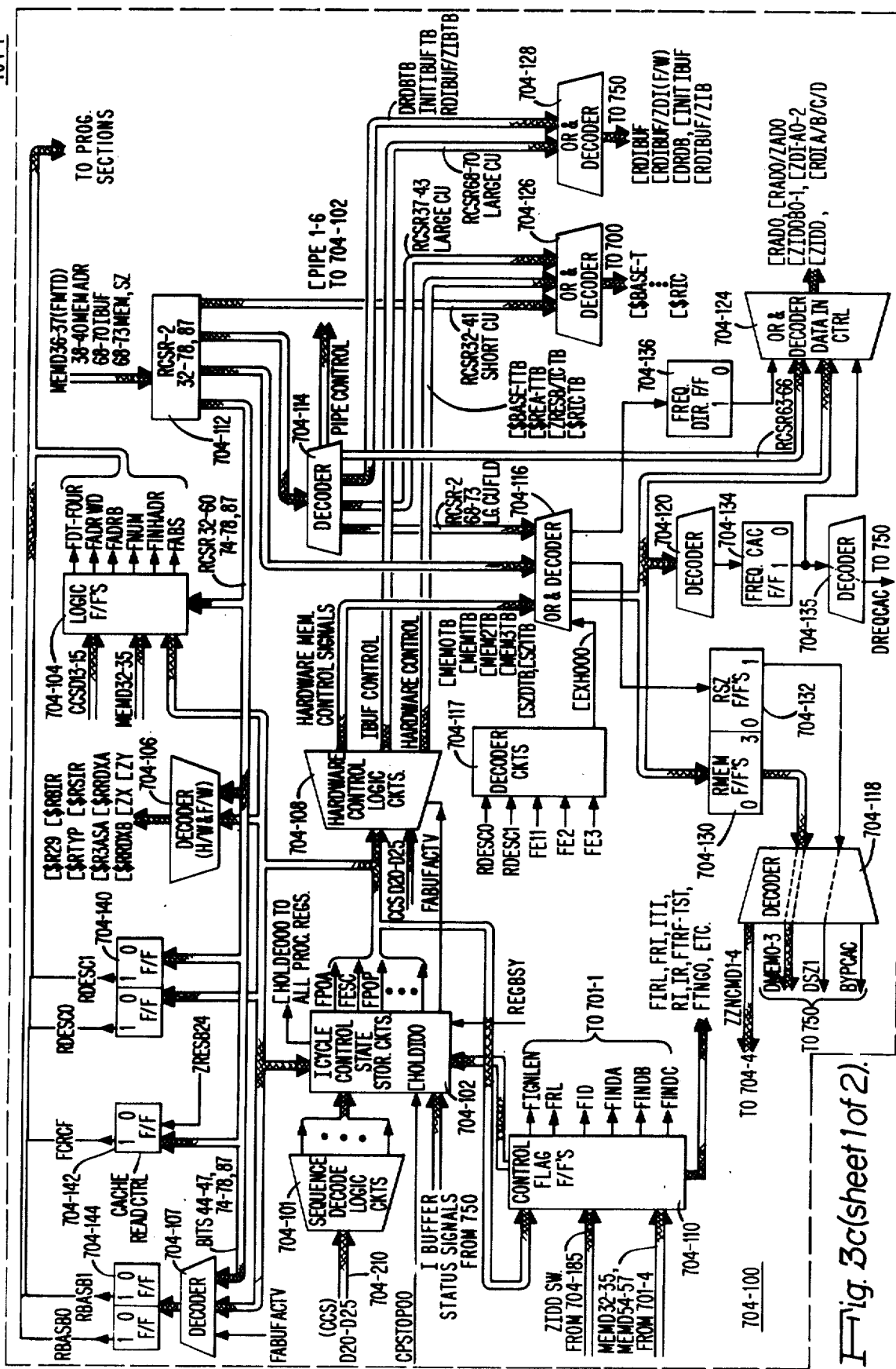
Fig. 3c (sheet 1 of 2).

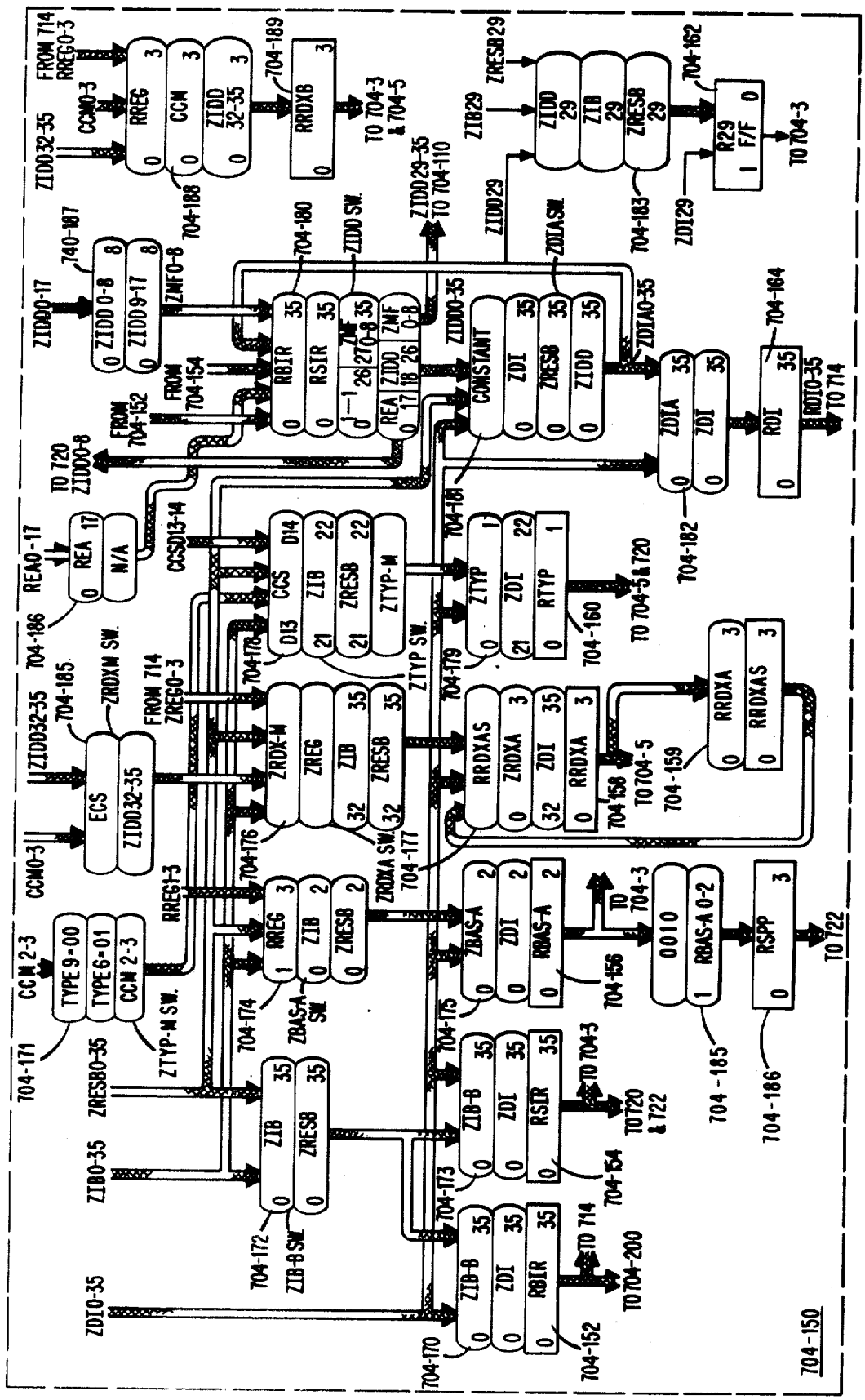
Fig. 3c (sheet 2 of 2).

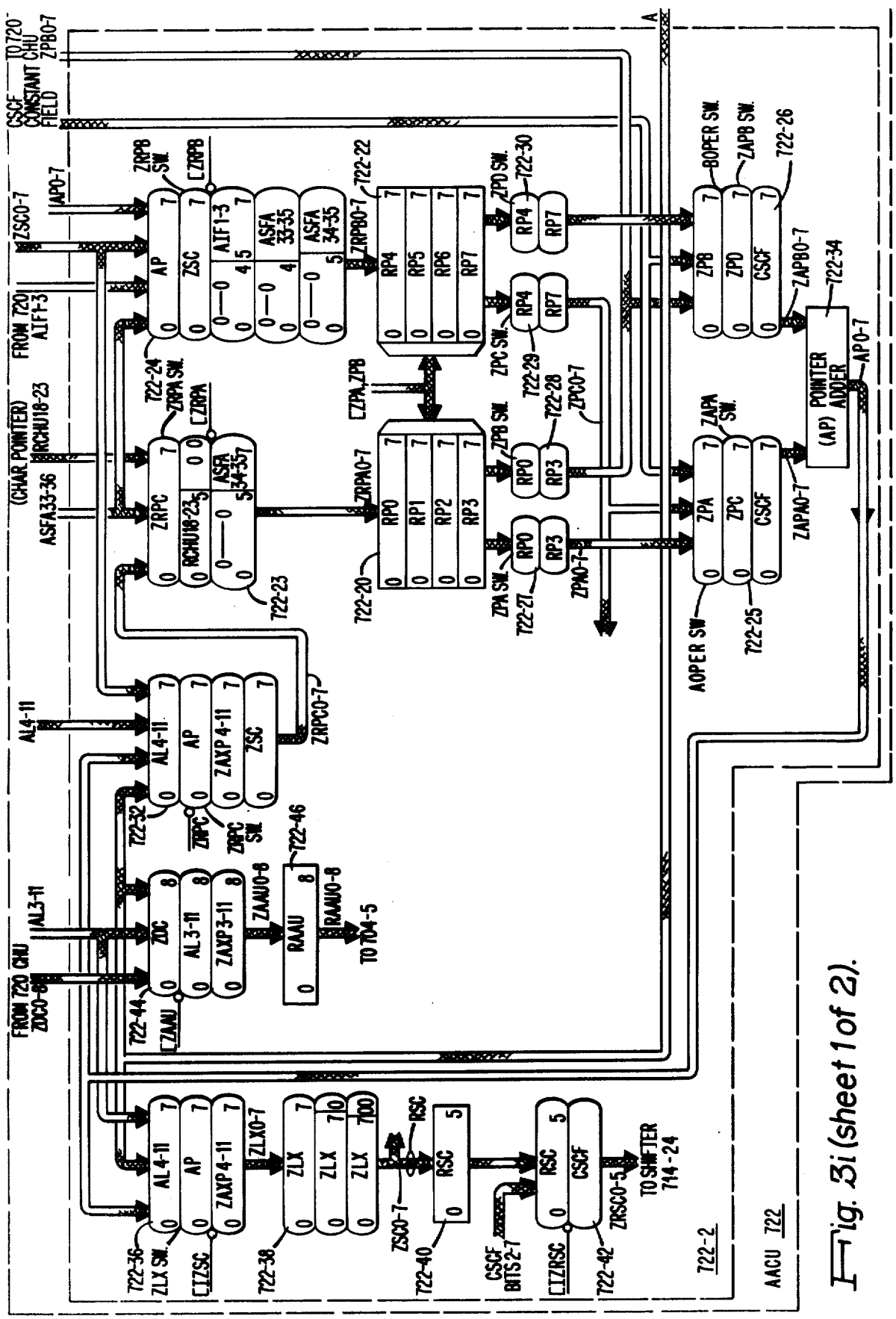
Fig. 3i (sheet 1 of 2).

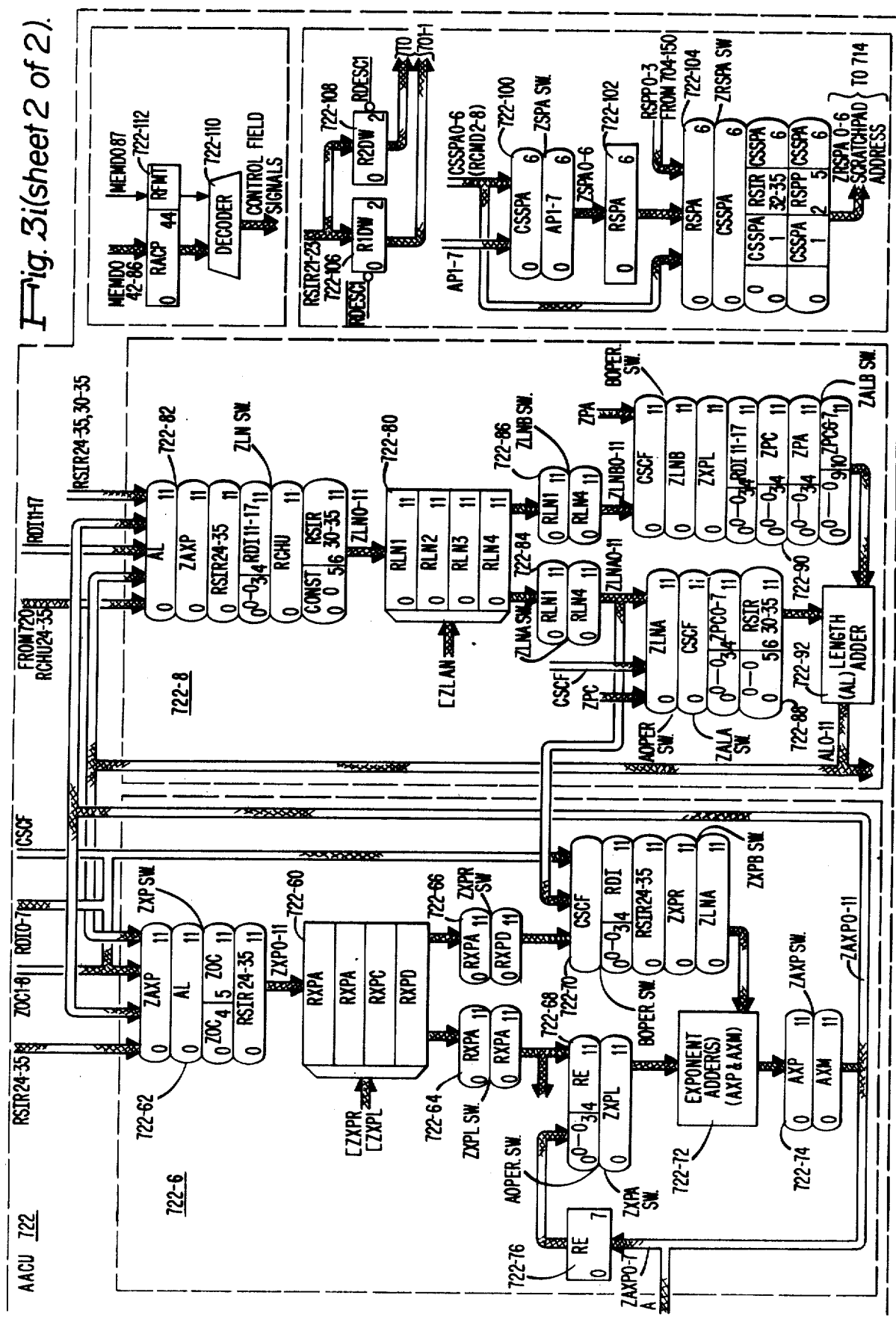
Fig. 3i (sheet 2 of 2).

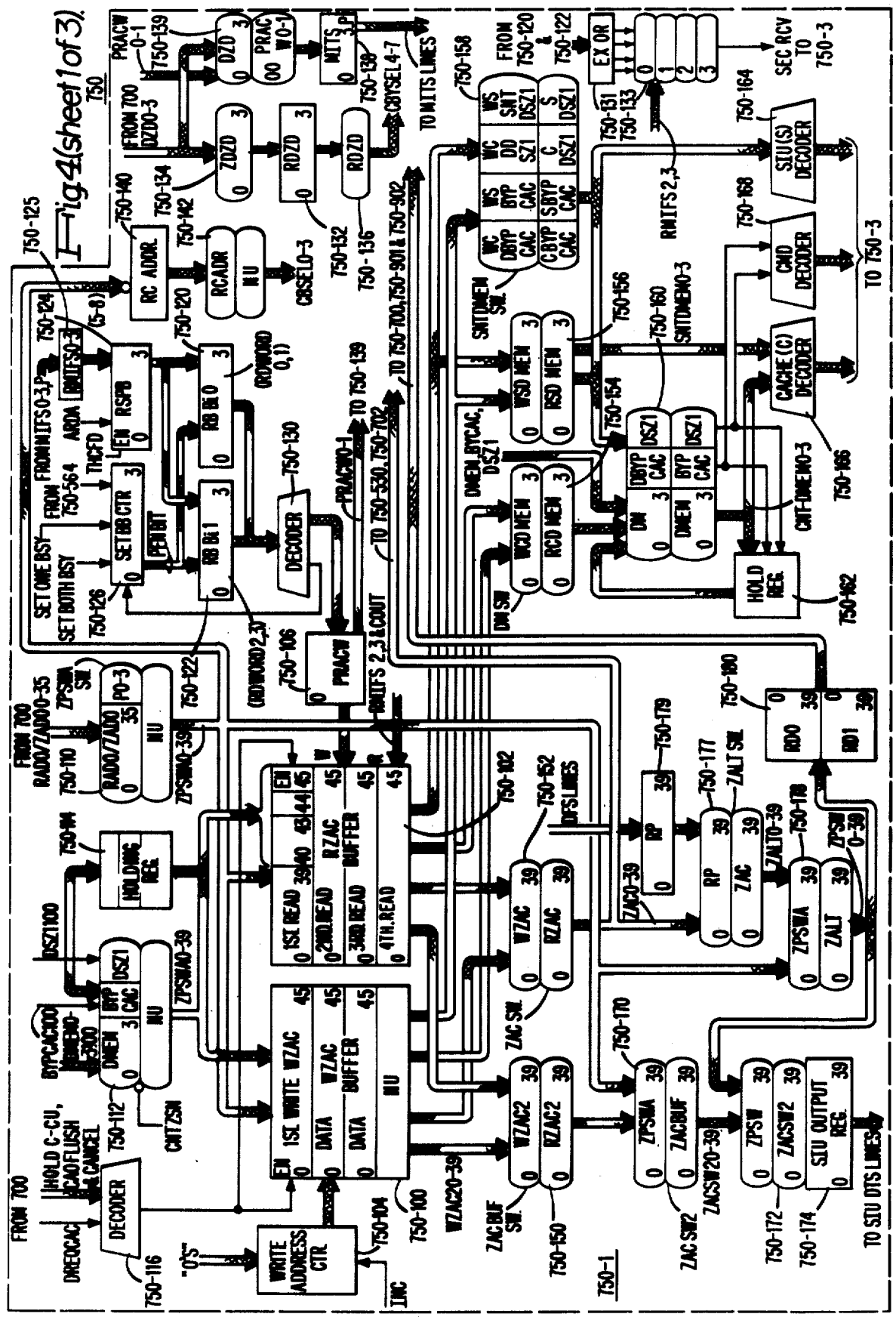

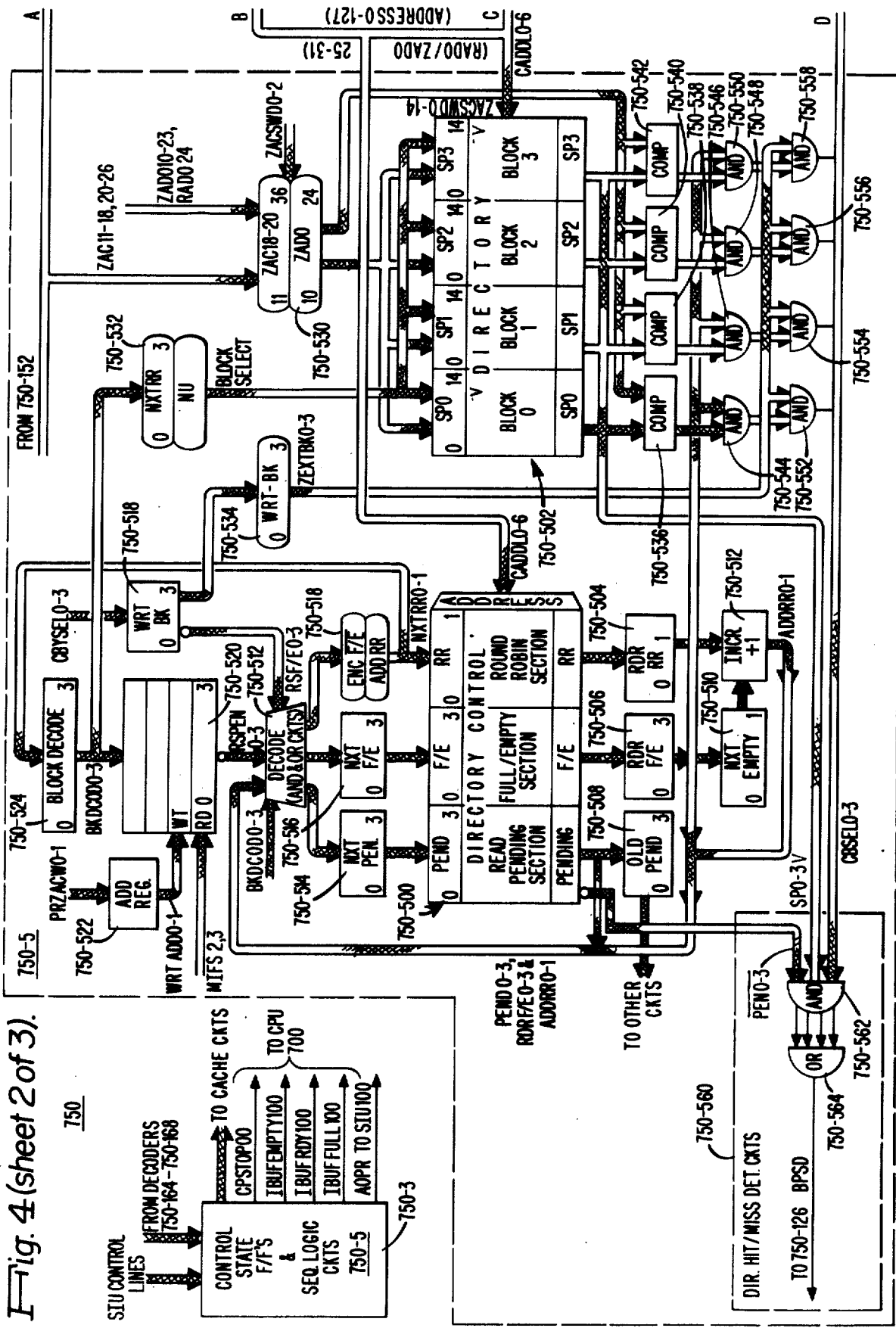
Fig. 4 (sheet 2 of 3).

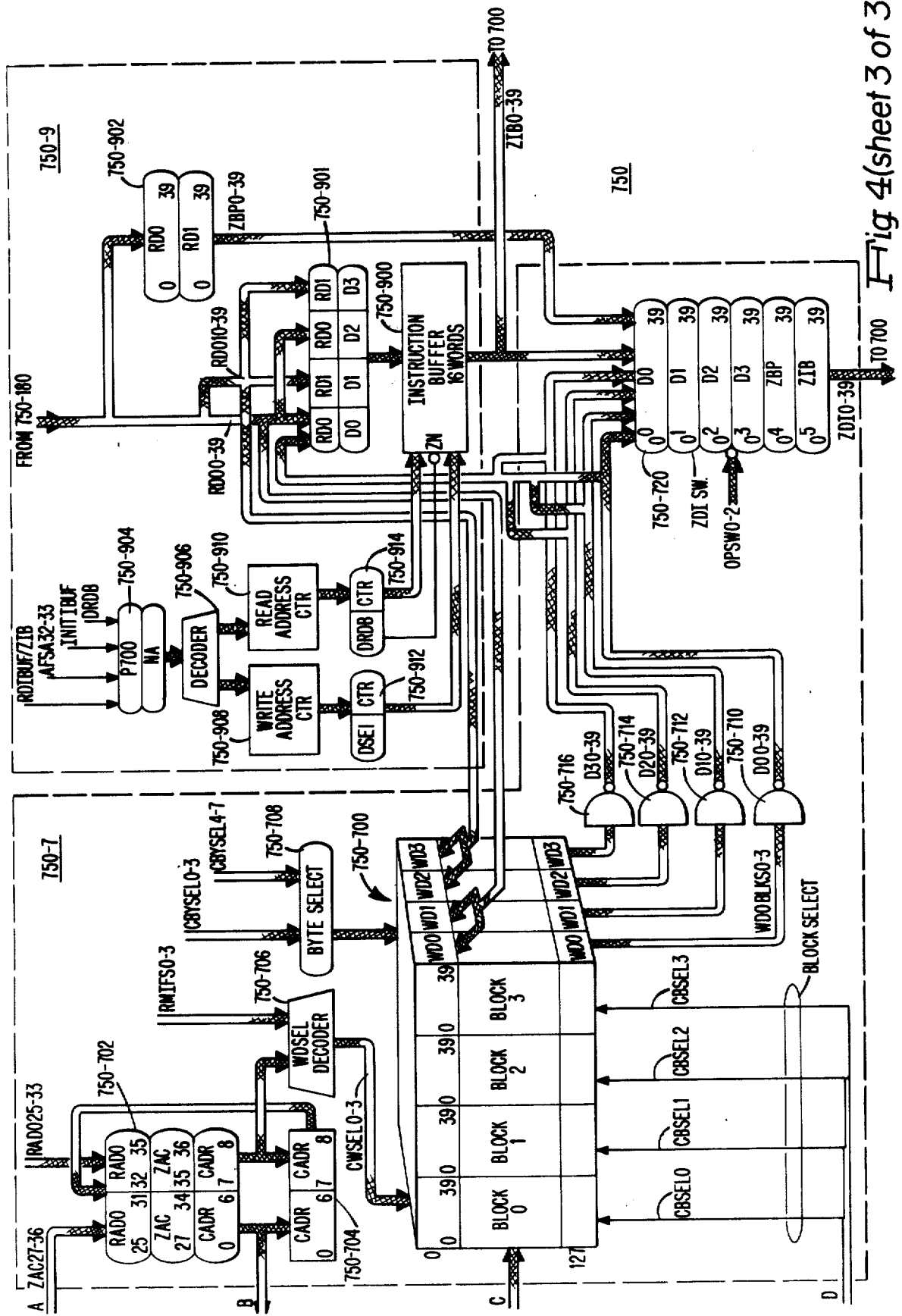
Fig 4(sheet 3 of 3).

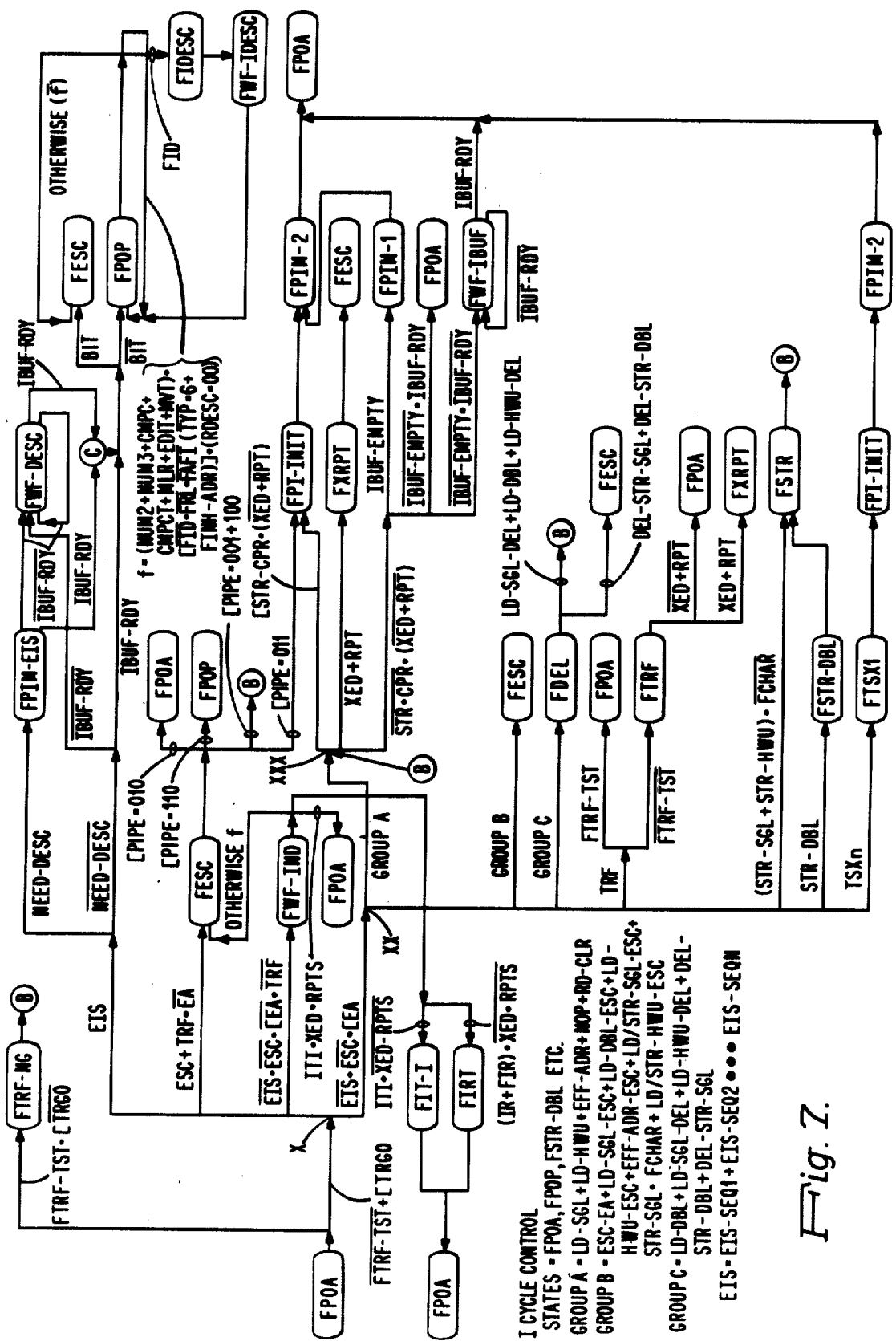
Fig. Z.

SINGLE WORD INSTRUCTION FORMAT

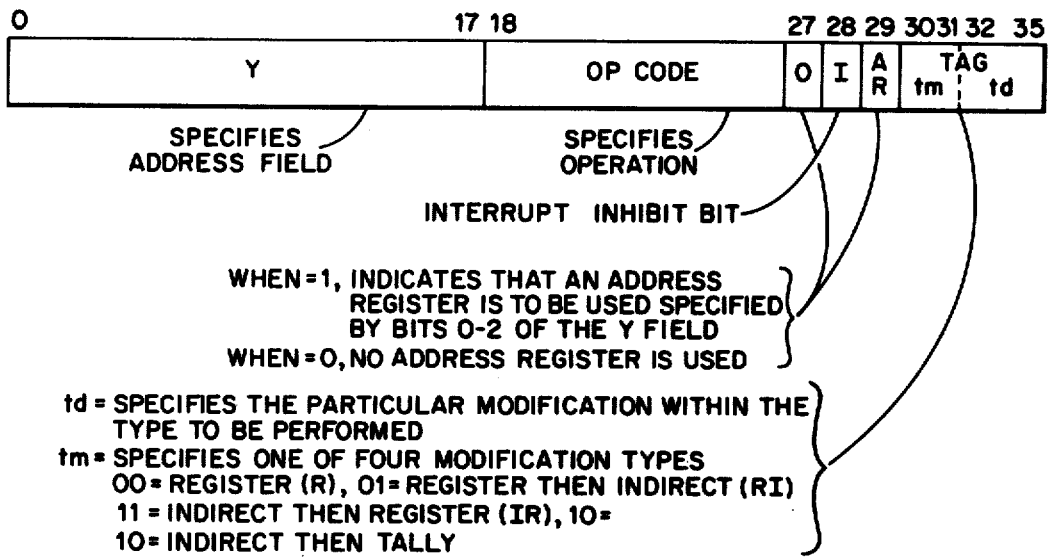

*Fig. 8a.*

MODIFICATION FIELD FORMAT

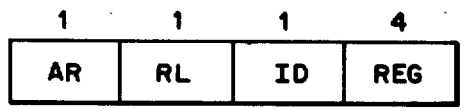

AR – ADDRESS REGISTER SPECIFIER
  0 – NO ADDRESS REGISTER USED
  1 – BITS 0-2 OF THE OPERAND DESCRIPTOR ADDRESS FIELD Y SPECIFY THE ADDRESS REGISTER TO BE USED IN COMPUTING THE EFFECTIVE ADDRESS FOR THE OPERAND

RL – REGISTER OR LENGTH
  0 – OPERAND LENGTH IS SPECIFIED IN THE N FIELD OF THE OPERAND DESCRIPTOR
  1 – LENGTH OF OPERAND IS CONTAINED IN A REGISTER WHICH IS SPECIFIED BY A CODE IN THE N-FIELD (BITS 32-35) OF THE OPERAND DESCRIPTOR IN THE FORMAT OF REG

ID – INDIRECT OPERAND DESCRIPTOR
  0 – THE OPERAND DESCRIPTOR FOLLOWS THE INSTRUCTION WORD IN ITS SEQUENTIAL STORE LOCATION
  1 – THE OPERAND DESCRIPTOR LOCATION CONTAINS AN INDIRECT WORD WHICH POINTS TO THE OPERAND DESCRIPTOR
    ONLY ONE LEVEL OF INDIRECTION IS ALLOWED

REG – ADDRESS MODIFICATION REGISTER SELECTION FOR R TYPE MODIFICATION OF THE OPERAND DESCRIPTOR ADDRESS FIELD

*Fig. 8c.*

MULTIWORD INSTRUCTION FORMAT

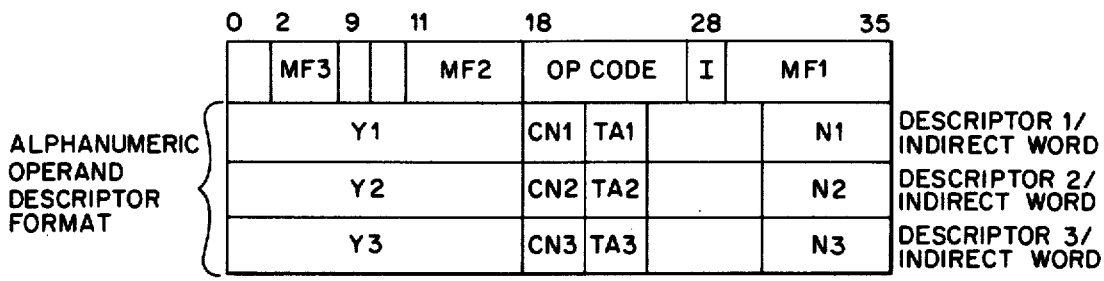

FIELDS MF1, MF2 & MF3 DESCRIBE THE ADDRESS MODIFICATIONS TO BE PERFORMED FOR DESCRIPTORS 1, 2 & 3 RESPECTIVELY

OP CODE - SPECIFIES THE OPERATION TO BE PERFORMED

I = THE INTERRUPT INHIBIT BIT

Y1, Y2 & Y3 = ORIGINAL DATA WORD ADDRESSES FOR DESCRIPTORS 1, 2 & 3

CN1, CN2 & CN3 = CODES THAT DEFINE THE ORIGINAL CHARACTER NUMBERS WITHIN DATA WORDS REFERENCED BY THE ORIGINAL ADDRESSES Y1, Y2 & Y3

TA1, TA2 & TA3 = CODES THAT DEFINE WHICH TYPES OF ALPHANUMERIC CHARACTERS ARE IN DATA FOR DESCRIPTORS 1, 2 & 3 RESPECTIVELY

| CODE | DATA TYPE |
|------|-----------|
| 00   | 9 BIT     |
| 01   | 6 BIT     |
| 10   | 4 BIT     |
| 11   | ILLEGAL   |

N1, N2 & N3 = EITHER THE NUMBER OF CHARACTERS OR BITS IN THE DATA STRING OR 4 BIT CODES (32-35) WHICH SPECIFY REGISTERS THAT CONTAIN THE NUMBER OF CHARACTERS OR BITS

Fig. 8b.

INDIRECT WORD FORMAT

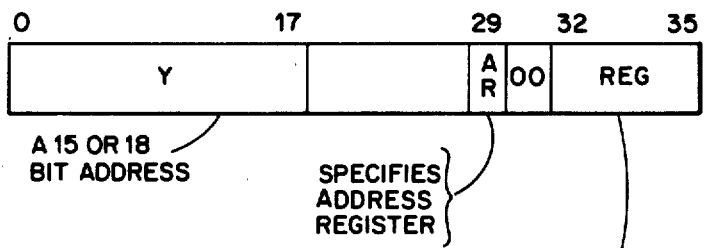

Fig. 8d.

MULTIPLE CONTROL STORE MICROPROGRAMMABLE CONTROL UNIT INCLUDING MULTIPLE FUNCTION REGISTER CONTROL FIELD

RELATED APPLICATIONS

1. "Data Processing System Programmable Pre-Read Capability" invented by John E. Wilhite, William A. Shelly and Charles P. Ryan, Ser. No. 853,944 filed on Nov. 22, 1977 and assigned to the same assignee as named herein.

2. "Microprogrammed Data Processing Unit Including A Multifunction Secondary Control Store" invented by John E. Wilhite, Ser. No. 853,945, filed on Nov. 22, 1977 and assigned to the same assignee as named herein.

BACKGROUND OF THE INVENTION

1. Field of Use

The present invention relates to control units and more particularly to a microprogrammable control unit which provides for increased processing efficiency.

2. Prior Art

In general, a substantial number of central processing units (CPU's) employ microprogrammed control units for executing program instructions. In order to reduce the size of the control store and to increase processing efficiency, a number of control units have employed two control stores. Examples of such systems are disclosed in U.S. Pat. Nos. 3,949,372, 3,953,833 and 4,001,788. While such systems provide such advantages essentially all of the processing of an instruction proceeds under microprogram control. Moreover, normally separate sequences of microinstruction or additional microinstructions are required for processing different program instructions specifying load and store operations involving different program visible registers or program instructions involving updating register operations.

It is a primary object of the present invention to provide a microprogrammable control unit which has reduced storage requirements.

It is a further object of the present invention to provide a two control store microprogrammable control unit which provides for increased processing efficiency.

SUMMARY OF THE INVENTION

The above objects are achieved in a preferred embodiment of the present invention by a two control store microprgrammed control unit of a pipelined data processing unit. The first control store includes a plurality of storage locations, each for a different instruction operation code coded to include an address field, a control sequence field and a control register field. The second control store includes a plurality of storage locations, groups of which store microinstruction sequences for executing different groups of program instructions.

The preferred embodiment further includes hardware sequence control circuits and various register control circuits utilized for selection and for updating of the different program visible registers included within the data processing unit. Such data processing unit operates as a pipeline unit wherein the stages of the pipeline operation include an instruction cycle, followed by a cache cycle and an execution cycle.

In the processing of each program instruction, the operation code of the instruction is used to address the first control store for read out of the address and control information contents of one of the plurality of locations. The sequence control contents conditions the hardware sequence control circuits to execute the required operations during the instruction and cache cycles of operation. The address contents are used for accesing an execution microinstruction sequence required during the execution cycle of operation.

During the instruction cycle of different program instructions, such as load and store instructions, the register control contents are used to condition the various register control circuits for selection of which one of a number of program visible registers are to be operated upon. In the preferred embodiment, such registers include the accumulator (A), the quotient (Q), index (Xo, X1 . . . etc.) and instruction counter (IC). This arrangement of the present invention permits a number of execution microinstruction sequences to be made common to a group of program instructions. For example, there are groups of instructions which perform the same operations with different ones of a group of registers. By having the regiser control field coded to select the particular register, all program instructions within the group can use the same microinstruction specified by the address field for execution.

Additionally, in accordance with the present invention, the register control field can also be used for controlling the operation of register busy hardware circuits. Such circuits normally used to keep track of updating the various program visible registers from the first cycle (I cycle) to a last cycle (E cycle) of the pipeline.

In the preferred embodiment, the register control field is decoded and selects the data loaded into a number of busy registers included within the busy hardware circuits. The register control field can be coded to specify none of the registers are busy, a single register is busy (i.e., A, Q, X0, X1, etc.), the A and Q registers are busy in that order or the A and Q registers are busy in reverse order. This arrangement of the present invention eliminates the need for providing additional more complex circuits for decoding the different operation codes of certain program instructions or additional microinstructions for testing operation code values.

Also, in accordance with the teachings of the present invention, the register control field can be used to provide a constant value to be used in modifying the address contents of the data processing units' program instruction counter. In the case of certain program instructions such as multiword instructions, the register control field can be coded to specify the value to be added to the instruction counter. This again eliminates the need for providing additional circuits for further decoding of instruction operation codes.

Thus, it is seen from the above that the present invention facilitates the microprogramming of a control unit constructed in accordance with such teachings. An important advantage of the arrangement of the present invention is that it provides great flexibility in controlling various register operations. Also, by being able to be used in controlling a number of different register operations, this reduces the complexity and the number of additional decoder circuits.

BRIEF DESCRIPTION OF THE DRAWINGS

FIG. 3a through 3i show in greater detail the different blocks of FIG. 2.

FIG. 4 shows in greater detail the cache unit 750 of FIG. 2i.

FIG. 7 is a state diagram used in describing the hardware sequencing of the apparatus of the present invention.

FIGS. 8a through 8d illustrate the formats of certain types of instructions used in describing the operation of the present invention.

DESCRIPTION OF THE PREFERRED EMBODIMENT

General Description

Figure 1:
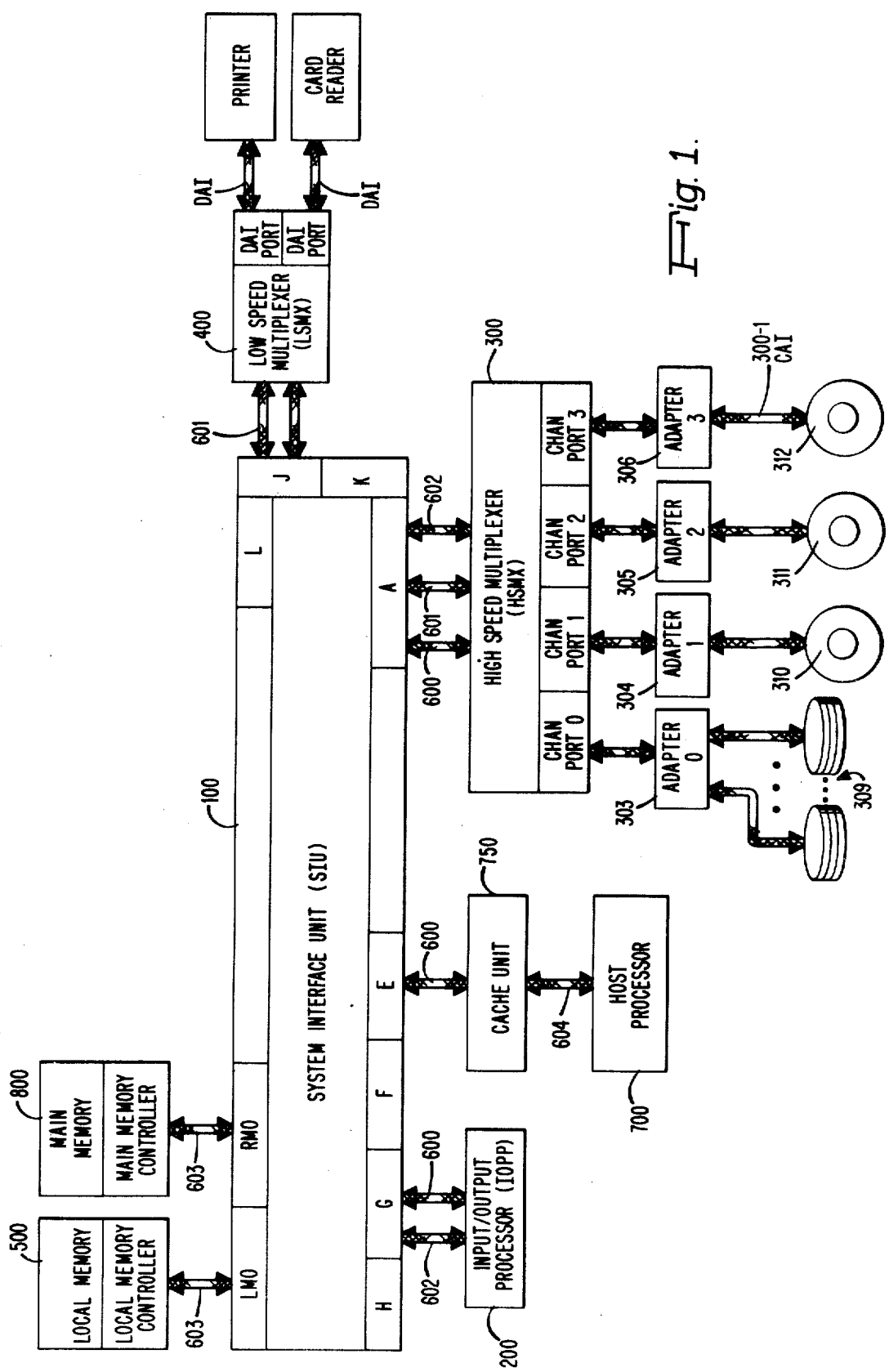
FIG. 1 illustrates in block form a system employing the principles of the present invention.

As seen from FIG. 1, the system which incorporates the principles of the present invention includes at least 1 input/output processor (IOPP) 200, a system interface unit (SIU) 100, a high-spped multiplexer (HSMX) 300, a low-speed multiplexer (LSMX) 400, a host processor 700, a cache memory 750, at least one memory module corresponding to a local memory module 500, and at least one memory module corresponding to a remote memory module 800. Different ones of these modules connect to one of a number of ports of the system interface unit 100 through a plurality of lines of different types of interfaces 600 through 603. More specifically, the input/output processor 200, the cache memory 750, and the high-speed multiplexer 300 connect to ports G, E and A, respectively, while the low-speed multiplexer 400, local memory module 500, and main memory module 800 connect to ports J, LMO and RMO, respectively. The host processor 700 connects to the cache memory 750.

The input/output system of FIG. 1 can be viewed as including a number of "active modules", "passive modules" and "memory modules". The IOP processor 200, host processor 700 and high-speed multiplexer 300 serve as active modules in that each has the ability to issue commands. The active modules normally connect to ports A through H while the host processor 700 connects to port E through the cache unit 750 via interfaces 604 and 600. A plurality of passive modules are connected to three ports J, K and L. These modules correspond to the low-speed multiplexer 400 and the system interface unit 100 and are units capable of intercepting and executing commands applied to the lines of interface 601 as described herein. The last group of modules constitutes local memory modules, and main memory modules capable of executing two different types of commands applied to the lines of interface 603.

The input/output system of FIG. 1 normally functions as an input/output subsystem responsive to input/output instructions issued by the host processor 700. Ports E and F include interfaces for enabling connection of either multiplexer or processor modules of FIG. 1. These interfaces are described in greater detail herein.

For the purpose of the present invention, host processor 700 is conventional in design and may take the form of those units described in U.S. Pat. No. 3,413,613. In the preferred embodiment, the input/output processor 200 initiates and termintes channel programs required for the execution of input/output instructions, processes interrupt requests received from the system interface unit 100, and directly controls unit record peripheral devices coupled to low-speed multiplexer 400. The processor 200 connects to port G via the data interface 600 and interrupt interface 602.

The low-speed multiplexer 400, for the purposes of the present invention can be considered conventional in design, provides for attachment of low-speed peripheral devices via peripheral adapters, each of which couple to the lines of a device adapter interface (DAI). The interface and adapter may take the form of those units described in U.S. Pat. No. 3,742,457, which is assigned to the assignee of the present invention. The low-speed devices include card readers, card punches and printers. As seen from FIG. 1, the multiplexer 400 connects to port J via the programmable interface 601.

The high-speed multiplexer 300 directly controls transfers between the groups of disk devices and tape devices 309 through 312, which connect to different ones of the channel adapters 303 to 306. Each of the channel controller adapters 303 through 306 which can connect up to a maximum of 16 devices to a different one of the channel ports 0 through 3 via the interface lines of a channel interface (CAI) 300-1. The high-speed multiplexer 300 connects to port A corresponding to a data interface 600, a programmable interface 601 and an interrupt interface 602.

For the purposes of the present invention, each of the channel controller adapters 302 through 305 may be considered in design and take the form of controller adapters described in the aforementioned U.S. Pat. No. 3,742,457.

System Interfaces

Before describing in detail the processor 700 and cache unit 750, constructed in accordance with principles of the present invention, each of the interfaces 600 through 604 discussed previously will now be described with reference to FIGS. 5a through 5e.

Figure 5A:
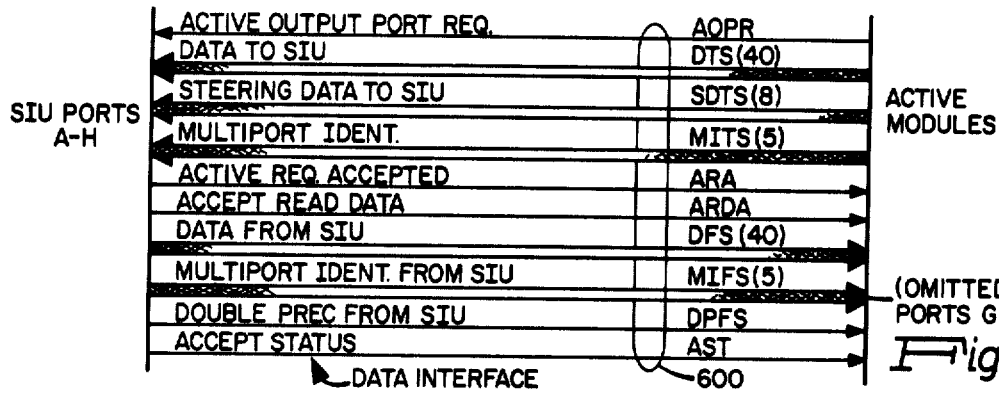
FIGS. 5a through 5e show the lines which comprise different ones of the interfaces of FIG. 1.

Referring first to FIG. 5a, it is seen that this figure discloses the lines which constitute the data interface 600 which is one of the interfaces which provides for exchange of information between an active module and the system interface unit 100. Exchange is accomplished by controlling the logical states of various signal lines in accordance with pre-established rules implemented through a sequence of signals termed a "dialog".

As seen from FIG. 5a, the interface includes an active output port request line (AOPR), a plurality of data to SIU lines (DTS 00-DTS 35, P0-P3), a plurality of steering data to SIU lines (SDTS 0-6, P), an active request accepted line (ARA), an accept read data line (ARDA), a plurality of data from SIU bus lines (DFS 00-35, P0-P3), a plurality of multiport identifier from SIU lines (MIFS 0-3, P) a double precision from SIU line (DPFS), and an accept status line (AST). The description of the interface lines are given in greater detail in the section to follow.

| DATA INTERFACE LINES | |
|---|---|
| Designation | Description |
| AOPR | The active output port request line is an unidirectional line which extends from each of the active modules to the SIU 100. When set, this line signals the SIU that the module requests a transfer path over which commands or data are to be transmitted. |
| DTS 00-35, P0-P3 | The data path lines are a four byte wide unidirectional path (four to 10 bit bytes) that extends between each of the active modules and the SIU and are used for transferring commands or data from each active module to the SIU 100. |
| SDTS 0-6, P | The steering data to SIU lines extend from each active module to the SIU 100. These lines are used to apply steering control information to the SIU 100 when the line AOPR is set. Steering control information consists of seven bits and a parity bit which are coded as follows: |
| | (a) The state of bit 0 indicates the type of command applied to the DTS lines (whether the command is a programmable interface command or a memory command). |
| | (b) Bits 1-4 are coded to indicate which one of the modules is to receive and interpret the memory command (commands are interpreted only by memory modules and programmable interface commands shall be interpreted by all modules except input/output processor 200). |
| | (c) The state of bit 5 indicates whether one or two words of the command information is to be transferred between the requesting active module and the designated receiving module (one word specifies a single precision transfer and two words specifies a double precision transfer). |
| | (d) The state of bit 6 indicates the direction of transfer between the requesting module and the designated receiver module. |
| | (e) Bit P is a parity bit generated by the requesting active module which is checked by apparatus included within the SIU 100. |
| MITS 0-3, P | The four multiport identifier to SIU lines extend from active module to the SIU 100. These lines are coded to indicate which subchannel or port within an active module caused the setting of line AOPR. |
| ARA | The active request accepted line extends from the SIU 100 to each of the active modules. This line is set to indicate that the designated receiving module has accepted the active module's request which allows the active module to remove the requested information from the data interface lines. |
| ARDA | The accept read data line extends from the SIU to each of the active modules. This line is set by the SIU 100 to indicate to the active module that it is to accept the previously requested data from a designated module. |
| DFS 00-35, P0-P3 | The data from SIU lines are another set of data path lines which are a four byte wide unidirectional path (four 10 bit bytes) which extends from the SIU to each active module. These sets of lines are used by the SIU 100 to convey read type data to a designated one of the active modules. |

-continued

| DATA INTERFACE LINES | |
|---|---|
| Designation | Description |
| MIFS 0-3, P | The four multiport identifier lines plus odd parity line extend from the SIU 100 to each of the active modules. These lines are coded to indicate which port or subchannel on the active module is to accept the data of a previous read operation from the SIU 100. |
| DPFS | The double precision from SIU line extends from the SIU to each of the active modules. The state of this line indicates whether one or two words of read data are to be accepted by the active module to complete a transfer (read command). |
| AST | The accept status line extends from the SIU 100 to each active module. The state of this line which is mutually exclusive of line ARDA, signals the active module that it should accept status information applied to the DFS lines. |

Figure 5B:
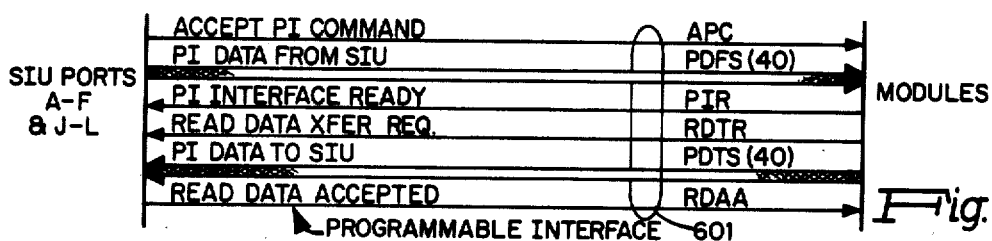

The lines of the programmable interface 601 shown in FIG. 5b provide for transfer of command information from an active module and a designated module. The transfer is accomplished by controlling the logic of states of the various signal lines in accordance with pre-established rules implemented through a sequence of signals termed dialog. The programmable interface includes an accept programmable interface command line (APC), a plurality of programmable interface data from SIU lines (PDFS 00-35, P0-P3), a programmable interface ready line (PIR), a read data transfer request line (RDTR), a plurality of programmable interface data to SIU lines (PDTS 00-35, P0-P3) and a read data accepted line (RDAA). The description of the interface lines are given in greater detail herein.

| PROGRAMMABLE INTERFACE LINES | |
|---|---|
| Designation | Description |
| APC | The accept programmable interface command line extends from the SIU 100 to each receiving module. When set, this line signals the module that command information has been applied to the PDFS lines of the interface by the SIU and is to be accepted by the module. |
| PDFS 00-35, P0-P3 | The programmable interface data from SIU lines are a four byte wide unidirectional path (four 10 bit bytes) that extend from the SIU 100 to each module. These lines apply programmable interface information from the system interface unit to a designated receiving module. |
| PIR | The programmable interface ready line extends from each module to the SIU. When set, this line indicates that the module is ready to accept a command to be applied to line PDFS. |
| PDTS 00-35, P0-P3 | The programmable interface data to the SIU lines are a four byte wide unidirectional path (four 10 bit bytes) that extends from each module to the SIU 100. These lines are used to transfer programmable interface information to the SIU. |
| RDTR | The read data transfer request line extends from each module connected to the programmable interface to the SIU 100. When set, this line indicates that the previously requested read data is available for transfer to a module and has been applied to the lines PDTS by the module. |
| RDAA | The read data accepted line extends from the SIU 100 to each module. When set, |

| PROGRAMMABLE INTERFACE LINES | |
|---|---|
| Designation | Description |
| | the line indicates to the module that the data applied to the ines PDTS has been accepted and that the module may remove the information from these lines. |

Figure 5C:
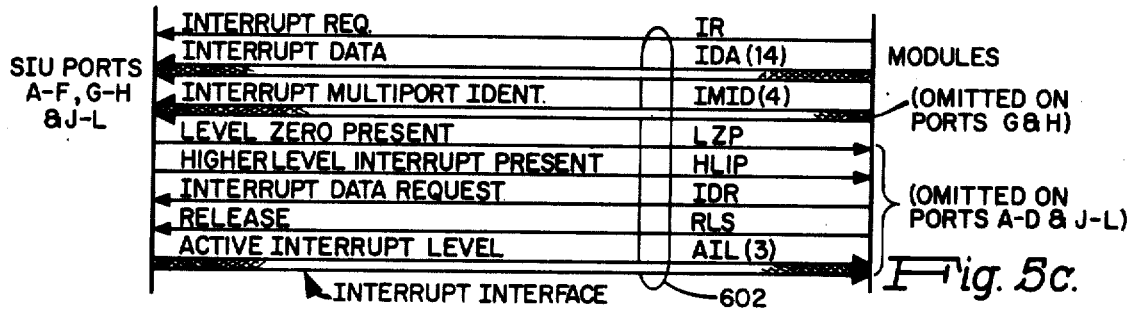

A further interface is the interrupt interface 602 of FIG. 5c which provides for interrupt processing by the input/output processor 200. That is, the interface enables the transfer of interrupt information by an active module to the SIU 100 as well as the transfer of interrupt information by the SIU 100 to the input/output processor 200 for processing. Similar to the other interfaces, the transfer of interrupt requests is accomplished by controlling the logical states of the various signal lines in accordance with pre-established rules implemented through a sequence of signals termed "dialog".

The interface includes an interrupt request line (IR), a plurality of interrupt data lines (IDA 00-11, P0-P1) and a plurality of interrupt multiport identifier lines (IMID 00-03) for modules connected to ports A through L. For modules connected to ports G and H, the interrupt interface further includes a level zero present line (LZP), a higher level interrupt present line (HLIP), an interrupt data request line (IDR), a release line (RLS) and a plurality of active interrupt level lines (AIL 0-2). As seen from FIG. 5c, the interrupt interface ports G and H do not include an interrupt multiport identifier line. The description of the interrupt interface lines are given in greater detail herein.

| INTERRUPT INTERFACE LINES | |
|---|---|
| Designation | Description |
| IR | The interrupt request line extends from each module to the SIU 100. When set, this line indicates to the SIU that it requires service. |
| IDA 0-3, P0 IDA 4-11, P1 | The interrupt data lines extend from an active module to the SIU 100. These lines are coded to contain control information required to be transferred to the input/output processor when an interrupt request has been accepted by the processor. These bits are coded as follows: <br> (a) The state of bit 0 specifies to the SIU 100 which of the two processors (i.e., processor number) is to process the interrupt request. <br> (b) Bits 1-3 are coded to indicate the priority or level number of the interrupt request to the SIU 100. <br> (c) Bit P0 is a parity bit for bits 0-3. <br> (d) Bits 4-8 are coded to provide a portion of an address required to be generated by the input/output processor 200 for referencing the correct procedure for processing the interrupt (i.e., an interrupt control block number ICBN). <br> (e) Bit P1 is a parity bit for bits 4-11. |
| IMID 00-03 | The interrupt multiport identifier lines |

| INTERRUPT INTERFACE LINES | |
|---|---|
| Designation | Description |
| | extend from each active module to the SIU 100. These lines are coded to identify which specific subchannel of the active module has requested interrupt service. |
| LZP | The level zero present line extends from the SIU 100 to the input/output processor 200. When set, this line indicates that there is a highest priority (level 0 interrupt) request being directed to the processor 200 by the SIU 100. |
| HLIP | The higher level interrupt present line extends from the SIU to the input/output processor. When set, this line indicates that there is an interrupt request having a higher level or priority than the procedure or process being executed by the processor 200. |
| IDR | The interrupt data request line extends from the input/output processor 200 to the SIU 100. When set, this line indicates that interrupt data is to be sent to the processor on lines DFS by the SIU 100. |
| RLS | The release line extends from the input/output processor 200 to the SIU 100. This line when set indicates that the processor 200 has completed execution of the current procedure. |
| AIL 0-2 | The active interrupt level lines extend from the SIU to the input/output processor 200. These lines are coded to designate the interrupt level number of the procedure being executed by the processor 200. |

Figure 5D:
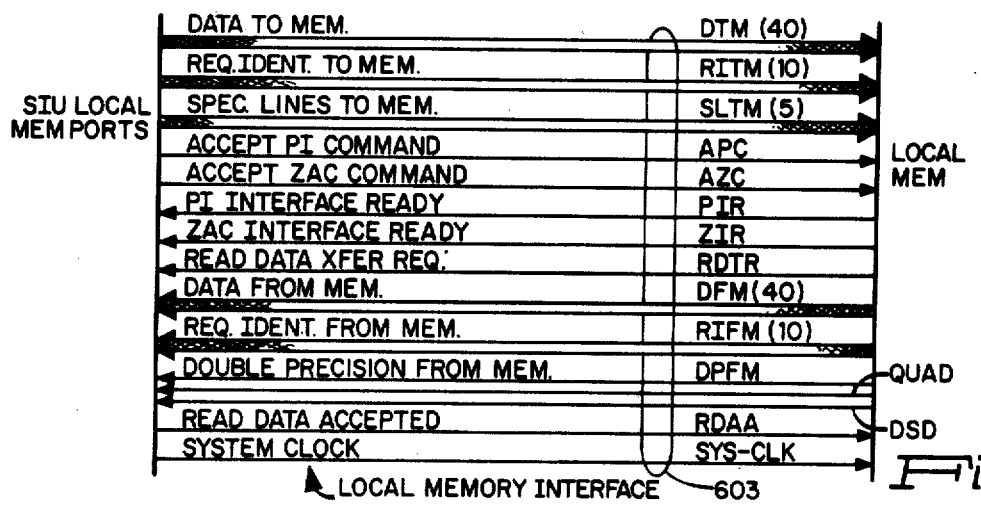

A next bit of interface lines utilized by certain ones of the modules of FIG. 1 corresponds to the local memory interface lines of FIG. 5d. The local memory interface 603 provides for exchanging information between local memory 500 and the modules of the system. The exchange is accomplished by controlling logical states of the various signal interface lines in accordance with pre-established rules implemented through a sequence of signals termed a "dialog". The local memory interface includes a plurality of data to memory lines (DTM 00-35, P0-P3), a plurality of request identifier to memory lines (RITM 0-7, P0-P1), a plurality of specification lines to memory lines (SLTM 0-3, P), an accept P1 command line (APC), an accept ZAC command line (AZC), a P1 interface ready line (PIR), a ZAC interface ready line (ZIR), a read data transfer request line (RDTR), a plurality of data from memory lines (DFM 00-35, P0-P3), a plurality of request identifier from memory lines (RIFM 0-8, P0-P1), a double precision from memory lines (DPFM), a QUAD line, a read data accepted line (RDAA) and a system clock line (SYS-CLK).

Memory and programmable interface commands are transferred out of the same physical data lines of the interface. The interface does not include a set of lines for processing interrupt requests and therefore the modules connected to the local memory by the SIU 100 cannot directly cause a memory interrupt. The description of the local memory interface lines are given in greater detail herein.

| LOCAL MEMORY INTERFACE LINES | |
|---|---|
| Designation | Description |
| DTM 00-35, P0-P3 | The data path lines constitute a four byte wide unidirectional path (36 information lines and four odd parity |

-continued

| LOCAL MEMORY INTERFACE LINES | |
|---|---|
| Designation | Description |
| | lines) that extends from the SIU 100 to the local memory 500. These lines are used to transfer memory or programmable interface commands to the local memory 500. |
| RITM 0-3, P0<br>RITM 4-7, P1 | The requester identifier to memory lines constitute two groups of four lines which extend from the SIU 100 to the local memory 500. These lines are coded to convey information to the local memory identifying the module which initiated the command and are used to return the data requested to the proper module. |
| SLTM 0-3, P | The specification lines to memory extend from the SIU 100 to the local memory 500 and include two port number selection lines, a read/write to memory line, a double precision to memory line and a parity line. The information signals applied to these lines are coded as follows.<br>(a) Bits 0-1 are port number selection bits coded to specify which port or subchannel within the attached module is to receive or interpret the memory command sent to the module.<br>(b) Bit 2 is a read/write to memory bit which is included in the steering control information received from the active module which is forwarded by the SIU to the local memory 500 when a new command is sent to the memory by the SIU 100. The state of this bit indicates the direction of data transfer.<br>(c) Bit 3 is a double precision to memory bit coded to specify the amount of data to be transferred. It is also included in the steering control information provided by the active module which is forwarded to the local memory module 500 by the SIU 100 when a new command is sent to the memory module. |
| AZC | The accept ZAC command line extends from the SIU 100 to the local memory module 500. When set, this line signals the local memory module 500 to accept the ZAC command and control information applied to the other lines by the SIU 100. The setting of this interface line is mutually exclusive with the accept PI command interface line. |
| APC | The accept programmable interface command line, as described in connection with the programmable interface, extends from the SIU 100 to the local memory module 500. When set, line indicates that the command information applied to the lines DTM is to be accepted by the local memory module 500. |
| PIR/ZIR | The programmable interface ready line/ZAC interface ready line extends from the local memory module 500 to the SIU 100. When set each line signals the SIU 100 that the local memory module 500 is capable of accepting a programmable interface (PI)/memory (ZAC) command. |
| RDTR | The read data transfer request line extends from the local memory module 500 to the SIU 100. This line when set indicates that the read type data previously requested by a ZAC or PI command is available along with the necessary control information to be sent to the module requesting the data. |
| DFM 00-35, P0-P3 | The data from memory lines are a four byte wide unidirectional bus which extends from the local memory module 500 to the SIU 100. These lines are used to return read requested type data to an active |

LOCAL MEMORY INTERFACE LINES

| Designation | Description |
|---|---|
| | module via the SIU 100. |
| RIFM 0-3, P0, RIFM 4-7, P1 | The two groups of requestor identifier from memory lines extend from the local memory module 500 to the SIU 100. These lines are coded for directing the read data back from module 500 to the requesting module. |
| DPFM and QUAD | The double precision from memory line and QUAD line extend from the local memory module 500 to the SIU 100. These lines are coded to indicate the number of words to be transferred via the SIU 100 to the requesting module during read data transfer request time interval. These lines are coded as follows: |

| QUAD | DPFM | |
|---|---|---|
| 0 | 0 | one word, single precision |
| 0 | 1 | two words, double precision |
| 1 | X (don't care) | four words |

| Designation | Description |
|---|---|
| DSD | The read data/status identifier line extends from the local memory module 500 to the SIU. The state of this line signals the SIU 100 whether the information applied to the lines DFM is read data or status information when line RDTR is set. When set, the line indicates status information of one or two words (QUAD=0) is being transferred. When reset to a binary ZERO, the line signals that up to four words of data are being transferred, the number being specified by the coding of lines QUAD and DPFM. |
| RDAA | The read data accepted line as mentioned in connection with the programmable terminal extends from the SIU 100 to the local memory module. When set, this line signals the memory module that the data applied on the interface lines by the local memory module has been accepted and that the local memory module may remove data from these lines. |
| SYS-CLK | The system clock line is a line which extends from the SIU 100 to each module of the system. This line is connected to a clock source included within the input/output processor 200 to synchronize the operations of each memory module from a common system clock source. |

Figure 5E:
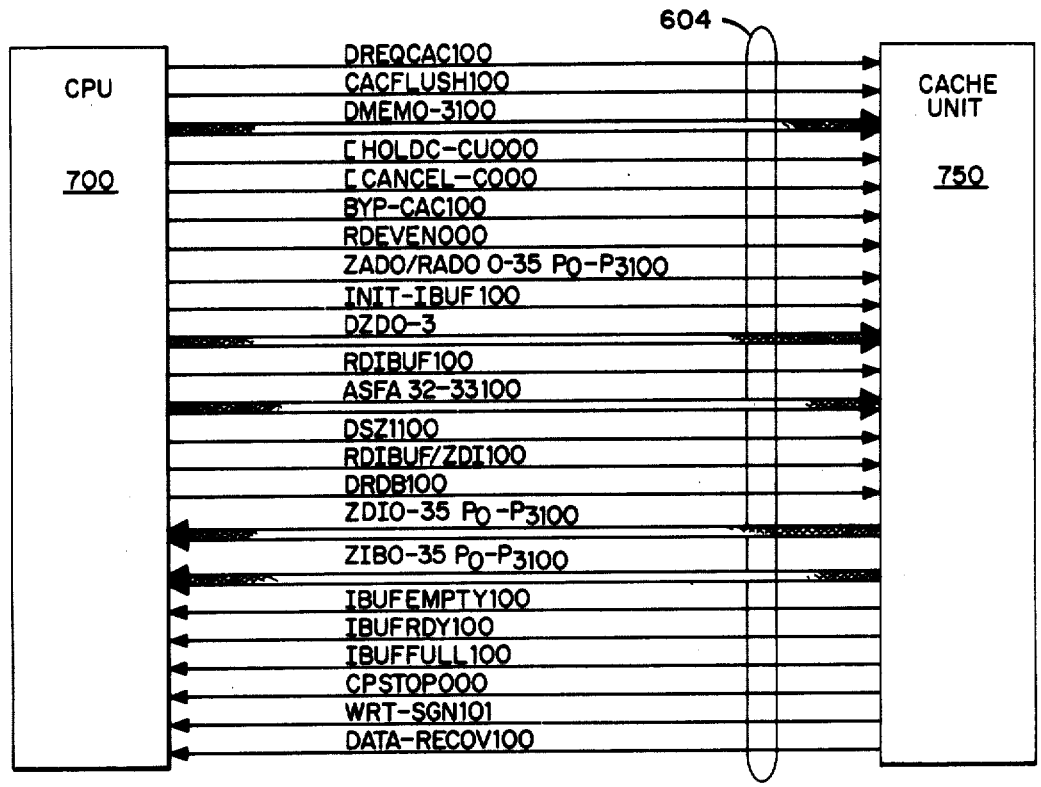

A last set of interface lines utilized as an internal interface between the cache unit 750 and central processor 700 corresponds to the cache/CPU interface lines of FIG. 5e. The interface 604 provides for exchanging information and control signals between the processor 700 and the cache unit 750. The exchange is accomplished by controlling the logical states of the various signal interface lines. The cache/CPU interface includes a plurality of data to processor lines (ZDI 0-35, P0-P3), a plurality ZAC and write data lines (ZADO 0-23, RADO 24-35, P0-P3), a processor request signal line (DREQ-CAC), a plurality of cache command lines (DMEM 0-3), a hold cache line (HOLD-C-CU), a cancel line (CANCEL -C), a flush line (CAC-FLUSH), a read request line (RD-EVEN), a read instruction buffer line (RD-IBUF), a read data buffer line (DRDB), an initialization pointer line (INIT-IBUF), a plurality of instruction lines (ZIB0-35, P0-P3), a plurality of address pointer lines (ASFA 32-33), a control line (DSZ), a read I-buffer data line (RD-IBUF/ZDI), a plurality of zone bit lines (DZD 0-3), a bypass cache line (BYP-CAC), a write signal line (WRT-SGN), an instruction buffer empty line (IBUF-EMPTY), an instruction buffer ready line (IBUF-RDY), an instruction buffer full line (IBUF-FULL), a CP stop line (CP-STOP), and a CP control line (DATA-RECOV).

Instructions, cache commands and data are forwarded to the cache unit 750 via different ones of these lines. Additionally, the operation of the processor 700 is enabled or disabled by certain ones of these lines as explained herein. The description of the CP/cache interface lines are given in greater detail herein.

CP/CACHE INTERFACE LINES

| Designation | Description |
|---|---|
| DREQ-CAC | This line extends from the processor 700 to cache unit 750. When the DREQ-CAC is set to a binary ONE, a ZAC command is transferred to the cache 750. In the |

-continued

CP/CACHE INTERFACE LINES

| Designation | Description |
|---|---|
| | case of a write ZAC command, write data words are transferred in the one or two cycles following the ZAC command and data words are sent from the processor 700 through the cache 750 without modification, to the SIU 100. |
| DMEM 0,1,2,3 | These lines extend from the processor 700 to cache 750. These lines are coded to designate the command that the cache 750 is to execute. The coding is as follows:<br>DMEM=0000 no op No action is taken and no cache request is generated<br>DMEM=0001 Direct The direct command enables the processor 700 to perform a direct transfer of an operand value without action on the part of the cache 750. Hence, no cache request is generated by this type of command.<br>DMEM=0010 0-3 - Address Wraparound Command (ADD-WRAP) The address wraparound command is executed in 2 cycles. At the start of the first cycle, data and command information is transferred to the cache 750. The processor 700 is then turned off before the next clock interval. During the second cycle, the processor is turned on and at the end of the cycle the data given to it is made available to the processor 700.<br>DMEM=0100 0-3 - Load Instruction Buffer Instruction Fetch 1 (LD-IBUF-IF1) The load instruction buffer command is executed in one cycle. At the start of the cycle, address and command information is transferred to the cache 750. At the end of the cycle, the block specified by the address is written into the instruction buffer at a previously designated instruction buffer address, and the addressed word is transferred to the processor 700 via the ZDI lines 0-35.<br>DMEM=0101 0-3 - Load Instruction Buffer Instruction Fetch 2 (LD-IBUF-IFz) The load instruction buffer command is executed in one cycle. At the start of the cycle, address and command information is transferred to the cache 750. At the end of the cycle, the block specified by the address is written into the instruction buffer at the previously designated instruction buffer address.<br>DMEM=0110 - Load Quad The load quad is executed in one cycle. Same as IF2 but data goes to another portion of the I Buffer.<br>DMEM=0111 0-3 - Preread (PR-RD) The preread command is executed in a variable number of cycles with a minimum of one. At the start of the first cycle, address and command information are transferred to cache 750. During the first cycle, when the address specified is that of a block which is in the cache 750, the preread operation terminates and no other action is taken. If the addressed block is not in the cache 750, then at the end of the first cycle, the request is transferred to the main memory. When the requested block has been read from main memory, the data is stored in the cache 750.<br>DMEM=1000 0-3 - Read Single (RD-SNG) The read single command is executed in one cycle. At the start of the cycle, address and command information are given to the cache 750 and at the end of the cycle the data made available to processor 700. |

-continued

| CP/CACHE INTERFACE LINES | |
|---|---|
| Designation | Description |
| | DMEM = 1001 0-3 - Read Clear (RD-CLR) The read clear command is executed in a variable number of cycles with a minimum of 9. At the start of the first cycle, address and command information are transferred to the main memory, and the processor is turned off. During the second cycle, when the addressed word is contained in a cache the block containing the word is fetched from the cache 750. When the requested word has been read from main memory and transferred to the cache 750, then the processor is turned on. |
| | DMEM = 1010 0-3 - Read Double Odd (RD-DBL-O) (line DSZ is a binary ZERO) The read double odd command is executed in two cycles. At the start of the first cycle, address and command information are transferred to the cache 750. At the end of the first cycle, the word at the odd address is made available to the processor 700. At the end of the second cycle, the word at the even address is made available to the processor. |
| | DMEM = 1010 0-3 - Read Double Even (RD-DBL-E) (line DSZ is a binary ONE) The read double even command is executed in two cycles. At the start of the first cycle, address and command information are transferred to cache 750. At the end of the first cycle the word at the even address is made available to the processor 700. At the end of the second cycle, the word at the odd address is made available to the processor 700. |
| | DMEM – 1011 0-3 - Read Remote (RD-RMT) The read remote command is executed in a variable number of cycles, with a minimum of 10. At the start of the first cycle, address and command information are transferred to cache 750. At the end of the first cycle, the request is transferred to the main memory and the processor 700 is turned off. When the requested word pair has been fetched from memory, processor 700 is turned on and the data is made available to it. |
| | DMEM – 1100 0-3 - Write Single (WRT-SNG) The write single command is executed in two cycles. At the start of the first cycle, address and command information is transferred to the cache 750. At the start of the second cycle, the data is transferred to the cache 750. During the second cycle, the data is written into the cache 750, if the block which contains the addressed word is stored in the cache 750. During the end of the second cycle, the write request and the data is transferred to the main memory. |
| | DMEM = 1110 0-3 - Write Double (WRT-DBL) The write double command is executed in three cycles. At the start of the first cycle, address and command information are transferred to the cache 750. At the start of the second (third) cycle the even (odd) data word is transferred to the cache 750. During the third cycle, the data is written into the cache, if the block which contains the addressed word pair is stored in the cache 750. At the end of the third cycle, the write request and both data words will have been passed on to the main memory. |
| | DMEM – 1111 0-3 - Write Remote (WRT-RMT) The write remote command is executed in three cycles. At the start of the first cycle, address and command information |

CP/CACHE INTERFACE LINES

| Designation | Description |
|---|---|
| | are transferred to the cache 750. At the end of the first cycle, the request is transferred to the main memory. During the next two cycles, the 2 data words are transferred to the cache 750 which transfers same to main memory. |
| HOLD-C-CU | This line extends from processor 700 to cache 750. When set to a binary ONE, this control signal specifies that the cache 750 is to assume a HOLD state for requests or data transfers. |
| CANCEL-C | This line extends from processor 700 to cache 750. When set to a binary ONE, this control signal aborts any request made to cache 750. |
| CAC-FLUSH | This line extends from processor 700 to cache 750. When set to a binary ONE, it starts a flush of the cache 750. |
| RD-EVEN | This line extends from processor 700 to cache 750. When the cache makes a double word request to the SIU, the even word is saved in a special register. When RD-EVEN line is set to a binary ONE, the contents of this register is gated onto the ZDI lines. |
| ZADO 0-23, RADO 24-35 P0-P3 | These 40 unidirectional lines extend from processor 700 to cache 750. The lines are used to transfer ZAC command and write data words to the cache 750. |
| RD-IBUF | This line extends from the processor 700 to cache 750. When set to a binary ONE, the line causes an instruction buffer out pointer to increment for processing a next instruction in accordance with the state of a line DRDB as follows. |
| DZD 0-3 | These four lines extend from processor 700 to cache 750. These lines transfer odd word zone bit signals for write double commands. |
| BYP-CAC | This line extends from processor 700 to cache 750. When set to a binary ONE, this line causes the cache 750 to request data words from main memory for read type instructions. |
| WRT-SGN | This line extends from the cache 750 to processor 700. It is used to signal the processor 700 during write commands that the cache 750 has completed the transfer of ZAC commands and data words of the SIU 100. |
| ASFA 31-33 | These two lines extend from processor 700 to cache 750. These lines are coded to specify the next word of a block stored in the I buffer to be read out to the processor 700 when the I buffer is initialized under hardware control via the INIT IBUF line. |
| INIT-IBUF | The initialize instruction buffer command is executed in one cycle. At the end of the cycle, a buffer in pointer is reset to ZEROS and the buffer out pointer is loaded with an initial value. |
| DSZ1 | This line extends from the processor 750 to cache 750. The state of this line specifies to cache 750 the order in which words are to be sent to the processor 700 when a read double command is performed. |
| DRDB100 | This line extends from the processor 700 to cache 750. It is used as the most significant bit of the I Buffer read address. |
| RD-IBUF/ZDI | This line extends from processor 700 to cache 750. It causes the cache 750 to apply the data on the ZIB lines to the ZDI lines. |
| ZDI 0-35 P0, P1, P2, P3 | These 40 unidirectional lines extend from cache 750 to processor 700. They apply data from the cache 750 to the processor 700. |
| ZIB 0-35 | These 40 unidirectional lines extend from |

-continued

CP/CACHE INTERFACE LINES

| Designation | Description |
| --- | --- |
| $P_0, P_1, P_2, P_3$ | cache 750 to processor 700. They apply instructions from the cache Instruction Buffer to the processor 700. |
| BUF-EMPTY | This line extends from cache 750 to processor 700. When set to a binary ONE, this line indicates that the Instruction Buffer contains no instructions at this time. |
| BUF-RDY | This line extends from cache 750 to processor 700. When set to a binary ONE, the line indicates that the Instruction Buffer contains at least one instruction. |
| BUF-FULL | This line extends from cache 750 to processor 700. This line indicates that the Instruction Buffer contains more than four instructions or it has at least one instruction and an outstanding instruction fetch request line. |
| CP STOP | This line extends from cache 750 to processor 700. When forced to a binary ONE state, the line signals that as a result of special conditions detected within the cache unit 750, the processor 700 is required to wait or halt its operation while the cache unit 750 resolves the special conditions. |
| DATA-RECOV | This line extends from the cache 750 to processor 750. It is used to re-strobe processor registers following the stopping of the processor 700 in response to the detection of a cache miss condition |

While FIGS. 5a through 5e show lines which connect the different modules of the system of FIG. 1 to SIU 100 in addition to the connection to processor 700 and cache unit 750, it will be appreciated that other lines are also included for signalling other conditions, as for example, certain error conditions and operational conditions. For further descriptions of the various modules of FIG. 1, reference may be made to U.S. Pat. No. 4,000,487. Now, the processor module 700 and cache unit 750 will be described in greater detail.

Figure 2:
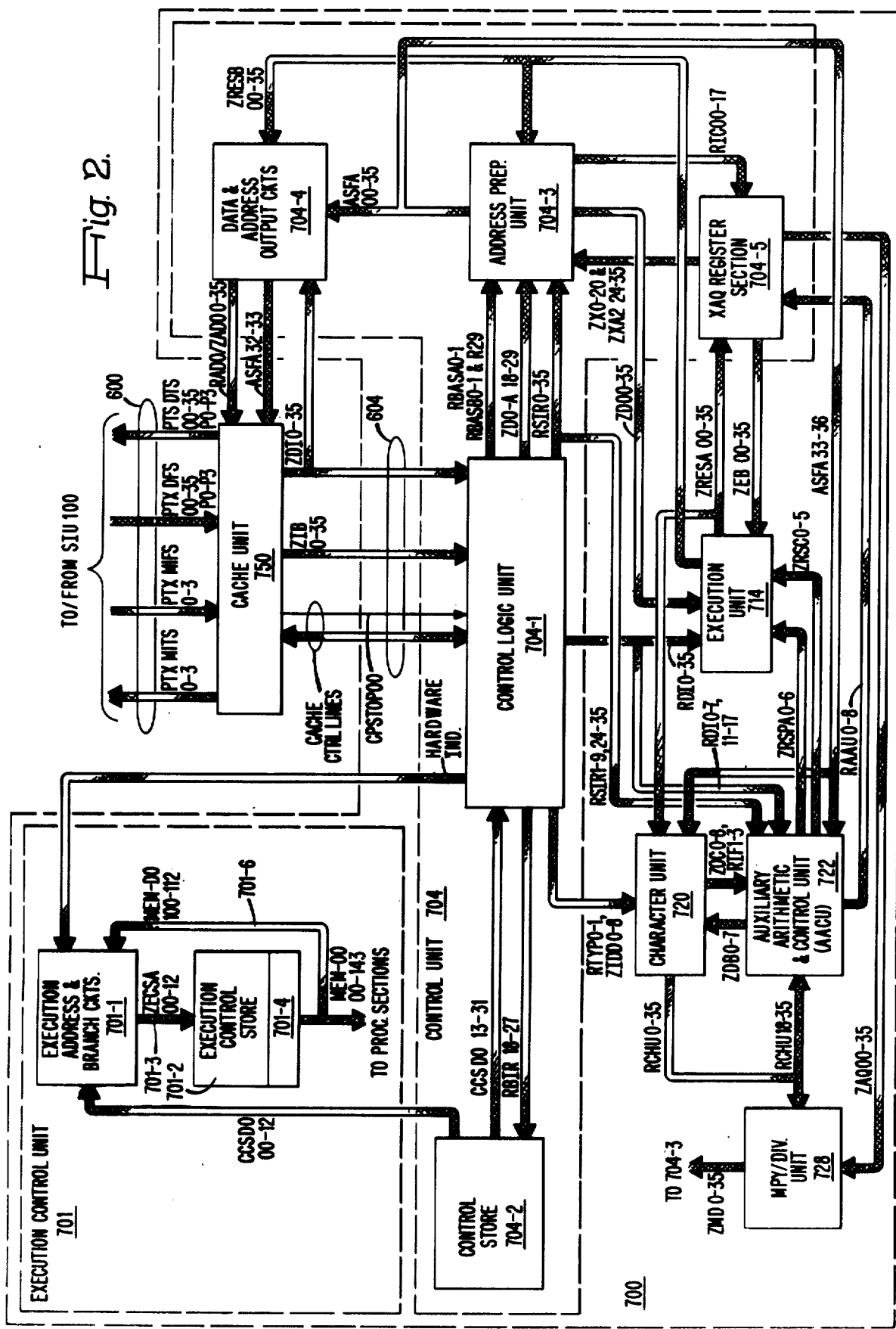
FIG. 2 shows in block diagram form the host processor 700 and the cache memory 750 of FIG. 1.

General Description of Processor 700-FIG. 2

Referring to FIG. 2, it is seen that the host processor 700 includes an execution control unit 701, a control unit 704, an execution unit 714, a character unit 720, an auxiliary arithmetic and control unit (AACU) 722, a multiply-divide unit 728, which are interconnected as shown. Additionally, the control unit 704 has a number of interconnections to the cache unit 750 as shown.

The execution control unit 701 includes an execution control store address preparation and branch unit 701-1, and an execution control store 701-2. The store 701-2 and unit 701-1 are interconnected via buses 701-3 and 701-6 as shown.

The control unit 704 includes a control logic unit 704-1, a control store 704-2, an address preparation unit 704-3, data and address output circuits 704-4, an XAQ register section 704-5 which interconnect as shown.

As seen from FIG. 2, the SIU interface 600 provides a number of input lines to the cache unit 750. The lines of this interface have been described in detail previously. However, in connection with the operation of cache unit 750, certain ones of these lines are specially coded as follows.

1. MITS 0-3 for Reads are coded as follows:
bits 0-1 = 00;
bits 2-3 = Read ZAC buffer address;

For Write Operation bit 0-3 = Odd word zone

2. MIFS lines are coded as follows:
bit 0 = 0;
bit 1 = 0 even word pairs (words 0,1);
bit 1 = 1 odd word pairs (words 2,3);
bits 2—3 = ZAC buffer address to memory.

As concerns the interface lines DFS 00-35, P0-P3, these lines convey read data to cache unit 750. The lines DTS 00-35, P0-P3, are used to transfer data from cache 750 to the SIU 100.

The control unit 704 provides the necessary control for performing address preparation operations, instruction fetcing/execution operations and the sequential control for various cycles of operation and/or machine states. The control is generated by logic circuits of block 704-1 and by the execution control unit 701 for the various portions of the control unit 704.

The TAQ register section 704-5 includes a number of program visible registers such as index registers, an accumulator register, and quotient register. This section will be discussed in greater detail with reference to FIG. 3. Other program visible registers such as the instruction counter and address registers are included within the address preparation unit 704-3.

As seen from FIG. 2, the section 704-5 receives signals from unit 704-3 representative of the contents of the instruction counter via lines RIC 00-17. Also, lines ZRESA 00-35 apply output signals from the execution unit 714 corresponding to the results of operations performed upon various operands. The section 704-5 also receives an output signal from the auxiliary arithmetic and control unit via lines RAAU0-8.

The section 704-5 provides signals representative of the contents of one of the registers included within the section as an input to the address preparation unit 704-3. The address preparation unit 704-3 forwards the information through a switch to the execution unit 714 via the lines ZDO 0-35. Similarly, the contents of certain ones of the registers contained within section 704-5 can be transferred to the execution unit 714 via the lines ZEB 00-35. Lastly, the contents of selected ones of these registers can be transferred from section 704-5 to the multiply/divide unit 728 via the lines ZAQ 00-35.

The address preparation unit 704-3 generates addresses from the contents of various registers contained therein and applies the resultant logical, effective and/or absolute addresses for distribution to other units along the lines ASFA 00-35. The address preparation unit 704-3 receives the results of operations performed on a pair of operands by the execution unit 714 via the lines ZRESB 00-35. The unit 704-3 receives signals representative of the contents of a pair of base pointer registers from the control logic unit 701 via the lines RBASA and RBASB0-1. Outputs from the multiply/divide unit 728 are applied to the address preparation unit 704-3. Lastly, the contents of a secondary instruction register (RSIR) are applied as input to the unit 704-13 via the lines RSIR 00-35.

The data and address output circuits 704-4 generate the cache memory address signals which it applies to the cache unit 705 via the lines RAD0/ZAD0 00-35. These address signals correspond to the signals applied to one of the sets of input lines ZDI 00-35, ASFA 00-35 and ZRESB 00-35 selected by switches included within the circuits of block 704-4. Also, word address signals are applied via the lines ASFA 32-33. These circuits will be further discussed herein in greater detail.

The control logic unit 704-1 provides data paths which have an interface with various units included within the cache unit 750. As described in greater detail herein, the lines ZIB 00-35 provide an interface with an instruction buffer included within the cache 750. The lines ZDI 00-35 are used to transfer data signals from the cache 750 to the control logic unit 704-1. Other signals are applied via the other data and control lines of the cache-CP interface 604. These lines include the CP stop line shown separately in FIG. 2.

As seen from FIG. 2, the control logic unit 704-1 provides a number of groups of output signals. These output signals include the contents of certain registers, as for example, a basic instruction register (RBIR) whose contents are applied as an input to control store 704-2 via the lines RBIR 18-27. The control logic unit 704-1 receives certain control signals read out from control store 704-2 via the lines CCSDO 13-31.

The control logic unit 704-1 also includes a secondary instruction register (RSIR) which is loaded in parallel with the basic instruction register at the start of processing an instruction. The contents of the secondary instruction register RSIR 00-35, as previously mentioned, are applied as inputs to the address preparation unit 704-3. Additionally, a portion of the contents of the secondary instruction register are applied as inputs to the auxiliary arithmetic control unit 722 via the lines RSIR 1-9 and 24-35.

The control store 704-2 as explained herein provides for an initial decoding of program instruction op-codes and therefore is arranged to include a number of storage locations (1024), one for each possible instruction op-code.

As mentioned, signals applied to lines RBIR 18-27 are applied as inputs to control store 704-2. These signals select one of the possible 1024 storage locations. The contents of the selected storage location are applied to the lines CCSD0 13-31 and to CCSD0 00-12 as shown in FIG. 2. The signals supplied to lines CCSD0 00-12 correspond to address signals which are used to address the execution control unit 701 as explained herein.

The remaining sections of processor 700 will now be briefly described. The execution unit 714 provides for instruction execution wherein unit 714 performs arithmetic and/or shift operations upon operands selected from the various inputs. The results of such operations are applied to selected outputs. The execution unit 714 receives data from a data input bus which corresponds to lines RDI 00-35 which have as their source the control logic unit 704-1. The contents of the accumulator and quotient registers included within section 704-5 are applied to the execution unit 714 via the lines ZEB 00-35 as mentioned previously. The signals applied to the input bus lines ZDO 00-35 from the address preparation unit 704-3 are applied via switches included within the execution unit 714 as output signals to the lines ZRESA 00-35 and ZRESB 00-35, as shown in FIG. 2. Additionally, execution unit 714 receives a set of scratch pad address signals from the auxiliary arithmetic and control unit 722 applied via the lines ZRSPA 00-06. Additionally, the unit 722 also provides shift information to the unit 714 via the lines ZRSC 00-05.

The character unit 720 is used to execute character type instructions which require such operations as translation and editing of data fields. As explained herein, these types of instructions are referred to as extended instruction set (EIS) instructions. Such instructions which the character unit 720 executes include the move, scan, compare type instructions. Signals representative of operands are applied via lines ZRESA 00-35. Information as to the type of character position within a word and the number of bits is applied to the character unit 720 via the input lines ZDB 00-07.

Information representative of the results of certain data operations is applied to the unit 722 via the lines ZOC 00-08. Such information includes exponent data and data in hexadecimal form. The character unit 720 applies output operand data and control information to the unit 722 and the unit 728 via the lines RCHU 00-35.

The auxiliary arithmetic and control unit 722 performs arithmetic operations upon control information such as exponents used in floating point operations, calculates operand lengths and pointers and generates count information. The results of these operations are applied to execution unit 714 via the lines ZRSPA 00-06 and lines ZRSC 00-06 as mentioned previously. Information signals corresponding to characters such as 9-bit characters, 6-bit characters, decimal data converted from input hexadecimal data, quotient information and sign information are applied to section 704-5 via the lines RAAU 00-08.

As seen from FIG. 2, the unit 722 receives a number of inputs. Character pointer information is applied via the lines ASFA 33-36. EIS numeric scale factor information and alphanumeric field length information are applied to the unit 722 via the lines RSIR 24-35. Other signals relating to fetching of specific instructions are applied via the lines RSIR 01-09. Exponent signals for floating point data are applied to the unit 722 via the lines ZOC 00-08 while floating point exponent data signals from unit 704-1 are applied via the lines RDI 00-08. Shift count information signals for certain instructions (e.g. binary shift instructions) are applied to the unit via the lines RDI 11-17. As concerns the input signals applied to the lines RCHU 00-35, lines 24-35 apply signals corresponding to the length of EIS instruction fields while 18-23 apply address modification signals to the unit 722.

The last unit is the multiply/divide unit 728 which provides for high-speed execution of multiply and divide instructions. This unit may be considered conventional in design and may take the form of the multiply unit described in U.S. Pat. No. 4,041,292 which is assigned to the same assignee as named herein. The unit 728 as seen from FIG. 2 receives multiplier dividend and divisor input signals via the lines RCHU 00-35. The multiplicand input signals from register section 704-5 are applied via the lines ZAQ 00-35. The results of the calculations performed by the unit 728 are applied as output signals to the lines ZMD 00-35.

As mentioned previously, the cache unit 750 transfers and receives data and control signals to and from the SIU 100 via the data interface line 600. The cache unit 750 transfers and receives data and control signals to and from the processor 700 via the lines of interface 604. Lastly, the cache unit 750 receives address and data signals from the circuits 704-4 via the lines RADO/ZADO 00-35 and the lines ASFA 32-33.

Detailed Description of the processor 700

The various sections which comprise the processor 700 illustrated in FIG. 2 will now be discussed in greater detail with respect to FIGS. 3a through 3i.

Figure 3A:
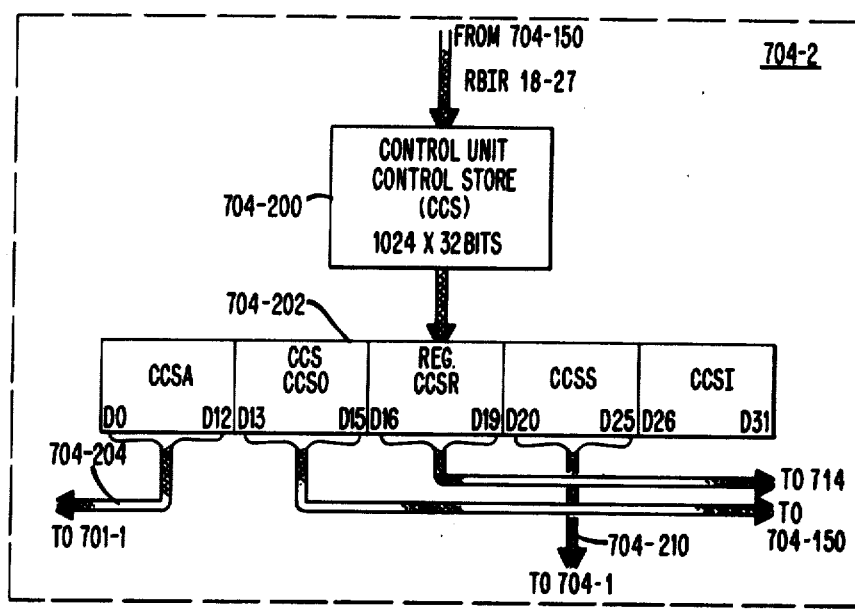
Figure 3E:
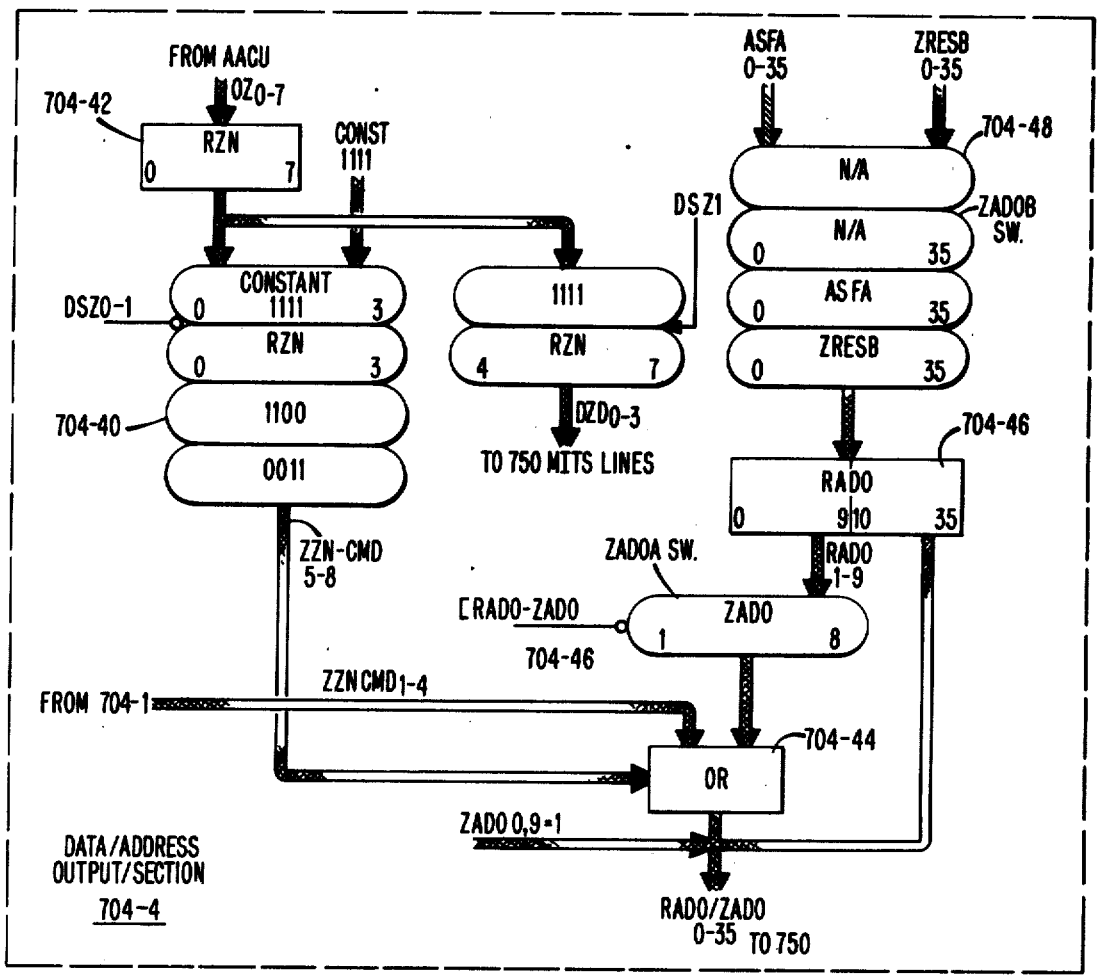
Figure 3B:
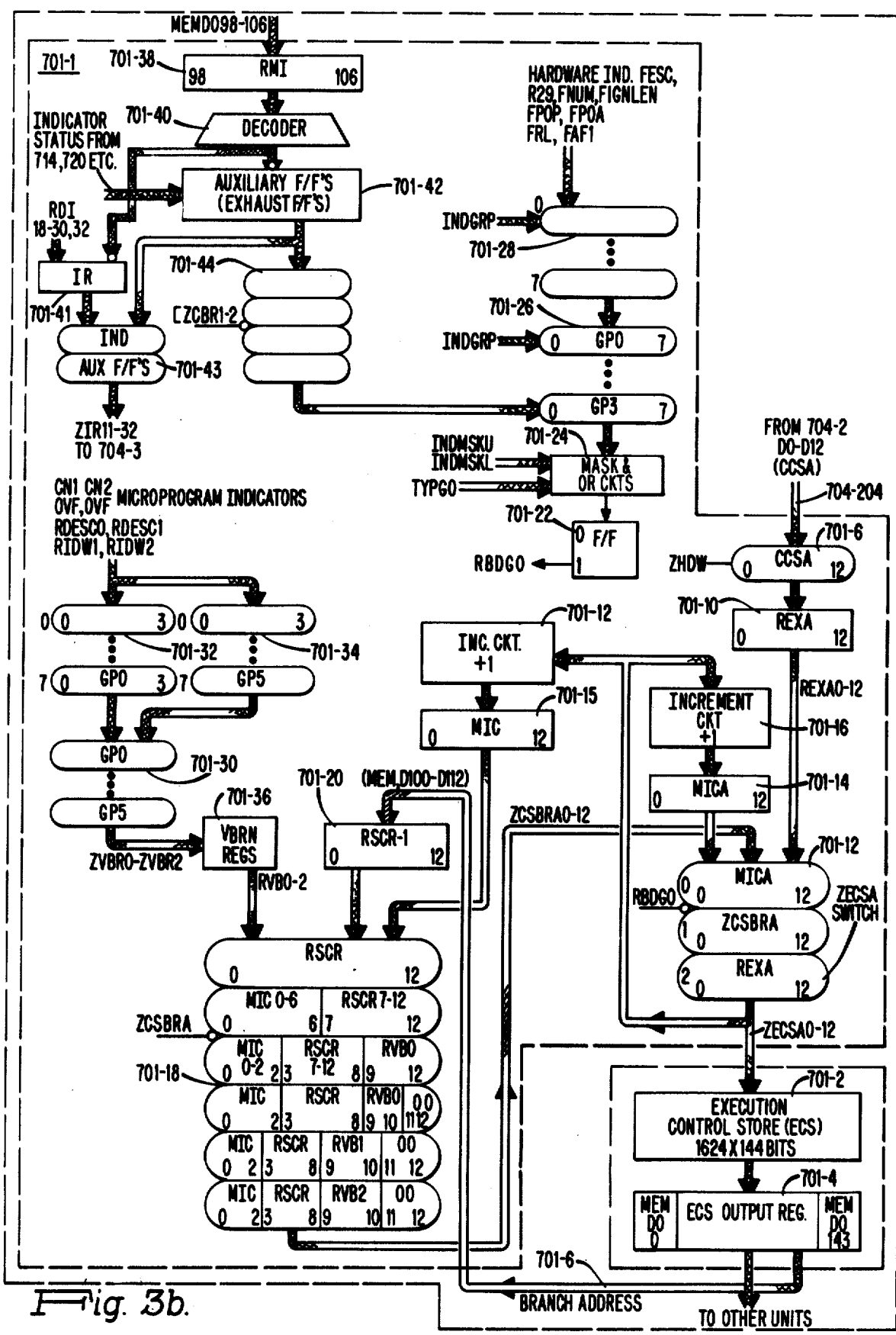

Referring to FIGS. 3a and 3b, it is seen that the processor includes two control stores: (1) the control unit control store (CCS) 704-200 which forms part of the control unit 704; and (2) the execution control store (ECS) 701-3 which is included within the execution control unit 701.

The cache oriented processor 700 of the preferred embodiment of the present invention includes a three stage pipeline. This means that the processor 700 requires at least three processor cycles to complete the processing of a given program instruction and can issue a new instruction at the beginning of each cycle. Hence, a number of program instructions may be in some stage of processing at any given instant of time.

In the preferred embodiment of the processor 700 includes the following stages: an instruction cycle (I) wherein instruction interpretation, op-code decoding and address preparation take place; a cache cycle (C) wherein access to the cache unit 750 is made ensuring high performance operation; and, an execution cycle (E) wherein instruction execution takes place under microprogram control.

As concerns control, during the I cycle, the op-code of the instruction applied via lines RBIR 18-27 is used to access a location within control store 704-2. During a C cycle, the accessed contents from control store 704-2 are applied to lines CCS DO 00-12 and in turn used to access one of the storage locations of the execution control store 701-2. During the C cycle, the microinstructions of the microprogram used to execute the instruction are read out from the execution control store 701-2 into a 144-bit output register 704-1. The signals designated MEMDO 00-143 are distributed to the various functional units of processor 700. During an E cycle, the processor executes the operation specified by the microinstructions.

Figure 6A:
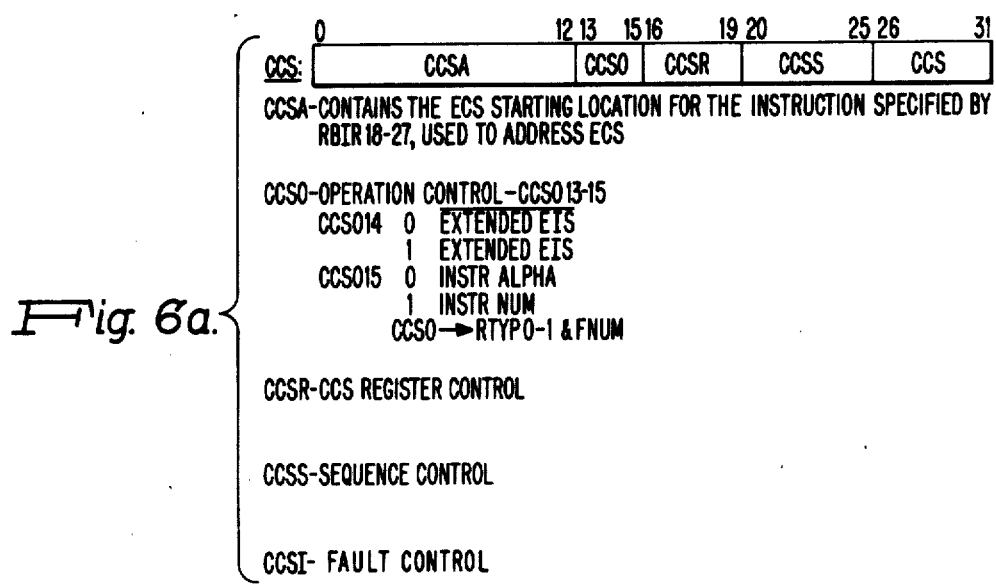
FIG. 6a illustrates the format of the control store control unit of FIG. 1 in accordance with the teachings of the present invention.

Referring specifically to FIG. 2, it is seen that the control store 704-2 includes a control unit control store (CCS) 704-200 which is addressed by the op-code signals applied to the lines RBIR 18-27. The CCS 704-200, as mentioned previously, includes 1024 storage locations, the contents of which are read out into an output register 704-202 during an I cycle of operation. FIG. 6a shows schematically the format of the words stored within the control store 704-200.

Referring to FIG. 6a, it is seen that each control unit control store word includes five fields. The first field is a 13-bit field which contains an ECS starting address location for the instruction having an op-code applied to lines RBIR 18-27. The next field is a three bit field (CCSφ) which provides for the control of certain operations. The bit interpretations of this field depend upon its destination and whether it is decoded by specific logic circuits or decoded under microprogram control. The next field is a 4-bit field which provides for certain register control operations.

The next field is a 6-bit sequence control field which is coded to specify a sequence of operations to be performed under hardwired logic circuit control as well as the type of cache operation. In the present example, this field is coded as $75_8$. The last field is a 6-bit indicator field which is not pertinent to an understanding of the present invention.

As seen from FIG. 3a, signals corresponding to the CCSA field of a control unit control store word are applied via a path 704-204 as an input to the execution generation circuits 701-7. Signals corresponding to the CCSR field are applied as an input to the execution unit 714 via path 704-206. Additionally, the same signals are applied as an input to the address preparation unit 704-3 via another path 704-208.

Signals representative of the sequence control field apply as an input to the sequence control logic circuits 704-100 via path 704-210. As explained herein, these circuits decode the sequence control field and generate signals for conditioning the cache unit 750 to perform the operation designated.

As mentioned previously, the execution address generation circuit 701-1 receives an input address which corresponds to field CCSA from the control store 704-2. As seen from FIG. 3b, these circuits include an input address register 701-10 whose output is connected to one position of a four position switch 701-12 designated ZECSA. The output of the switch serves as an address source for the control store 701-2. The first position of the switch 701-12 is connected to receive an address from the MICA register 701-14. The contents of register 701-14 are updated at the end of each cycle to point to the location within the ECS control store following the location whose contents were read out during that cycle.

The second position selects the address produced from the ZCSBRA branch address selector switch 701-18. The third position selects the address of the first microinstruction in each microprogram provided by the CCS control store which is loaded into the REXA register 701-10. When the CCS output is not available at the termination of a microprogram, a predetermined address (octal address 14) is automatically selected.

The first position of branch switch 701-18 receives signals corresponding to a branch address read out from store 701-2 into register 701-4 which is in turn forwarded to a return control register 701-20. The second, third and fourth positions of switch 701-18 receives signals from RSCR register 701-20, an MIC register 701-15 and the contents of a number of vector branch registers 701-36. The MIC register 701-15 stores an address which points to the microinstruction word following the microinstruction word being executed. This address corresponds to address from switch 701-12 incremented by one by an increment circuit 701-12.

The vector branch registers include a 4-bit vector branch register 0 (RVB0), a 2-bit vector branch register 1 (RVB1) and a 2-bit vector branch register 2 (RVB2). These registers are loaded during a cycle of operation with address values derived from signals stored in a number of different indicator flip-flops and registers applied as inputs to the number of groups of input multiplexer selector circuits 701-32 and 701-34. The outputs of the circuits 701-32 and 701-34 are applied as inputs to two position selector circuits 701-30. These circuits in turn generate the output signals ZVBR0, ZVBR1 and ZVBR2 which are stored in the registers 701-36.

The switch 701-36 provides an address based upon the testing of various hardware indicator signals, state flip-flop signals selected via an INDGRP field. The branch decision is determined by masking (ANDING) the selected indicator set with the INDMSKU and INDMSKL fields of a microinstruction word. If a vector branch is selected, INDMSKU is treated as 4 ZERO bits. The "OR" of the 8 bits is compared to the state defined by the TYPG and GO microinstruction fields. The hardware signals are applied via a number of data selector circuits 701-28 only one of which is shown whose outputs are in turn applied as inputs to a further five position multiplexer selector circuit 701-26. The output of the multiplexer circuit 701-26 feeds a comparison circuit which "ands" the indicator signals with the mask signals to produce the resulting signals MSKCBR0-7.

The signals MSKCBR0-7 are applied to another comparison circuit which "ands" the signals with the condition branch test signals TYPGGO to set or reset a branch decision flip-flop 701-22 which produces a signal RBDGO whose state indicates whether branching is to take place. The output signal RBDGO is applied as a control input to the first two positions of switch 701-12. When the branch test condition is not met (i.e., signal are selected and tested in a manner similar to that of other indicators (i.e., mask fields).

Additionally, the unit 701-1 includes a number of indicator circuits, certain ones of these are used to control the operation of certain portions of the processor 700 when the strings being processed by certain types of instructions have been exhausted. These indicator circuits are included in block 701-42 and are set and reset under the control of a field within the microinstruction word of FIG. 6a (i.e., IND6 field). The bits of this field read out from the ECS output register 701-4 are applied to an RMI register 701-38 for decoding by a decoder 701-40. Based upon the state of status indicator signals received from the various processor units (e.g. 714, 720, 722, etc.), the appropriate ones of the auxiliary flip-flops are switched to binary ONE states. The outputs of these flip-flops are applied via the different positions of a 4 position switch 701-44 to the GP3 position of switch 701-26 for testing. The same outputs are applied to a second position of a ZIR switch 701-43 for storage via the ZDO switch 704-340. The ZIR switch 701-43 also receives indicator signals from an indicator register (IR) 701-41. This register is loaded via the RDI lines 18-30 and 32 in response to certain instructions.

The indicator status signals for example include the outputs of the different adder circuits (SL, AXP) of the unit 720. These signals will set different ones of a number of exhaust flag flip-flops designated FE11, FE12, FE13, FE1E, FE2E, FE2 and FE3. The FE1E and FE2E flip-flops are set during any FPOA cycle of any instruction. These flip-flops in turn cause the FE11, FE12, and FE13 flip-flops to be set when the outputs from the AL or AXP adder circuits of unit 720. The setting and resetting of these indicators will be described herein in further detail in connection with the description of operation. However, the exhaust flag flip-flops pertinent to the example given herein are set and reset in accordance with the following Boolean expressions.

| | | |
|---|---|---|
| SET | FE1E = | FPOA + IND6FLD field. |
| RESET | FE1E = | IND6FLD field. |
| SET | FE2E = | FPOA + IND6FLD field. |
| RESET | FE2E = | IND6FLD field. |
| SET | FE11 = | IND6FLD field . FE1E (ALES + AXPES + DESC1 . AP0-4 = 0) + IND6FLD field . FE1E . DESC1 . (AP0-5 = 0+APZN+ALZN) + IND6FLD field. |
| RESET | FE11 = | FPOA + IND6FLD field. |
| SET | FE12 = | IND6FLD field . FE1E . (ALES + AXPES + FE13). |
| RESET | FE12 = | FPOA + IND6FLD field. |
| SET | FE13 = | IND6FLD field . FE1E . ALES + IND6FLD field. |
| RESET | FE13 = | FPOA + IND6FLD field. |
| SET | FE2 = | IND6FLD field . FE2E . ALES + IND6FLD field . FE2E. DESC2 . (AP0-4 = 0 + AP0-5 = 0 + APZN + ALZN) + (IND6FLD field) FE2E . DESC2 + IND6FLD. |
| RESET | FE2 = | FPOA + IND6FLD field. |
| SET | FE3 = | IND6FLD field . DESC3 . (AP0-4 = 0 + AP0-5 = 0 + APZN + ALZN) + IND6FLD field . DESC3 + IND6FLD. |
| RESET | FE3 = | FPOA + IND6FLD field. |
| Wherein IND6FLD indicates a particular code; | | |
| ALES = | Al = 0 or $\overline{AL\text{-}C}$; | |
| AXPES + | AXP = 0 or $\overline{AXP\text{-}C}$; | |
| APZN = | AP0-7 $\leq$ 0; and, | |
| ALZN = | AL0-11 $\leq$ 0. | |

RBDGO = 0), then the incremented address from the MICA register 701-14 is selected.

In some instances, as seen herein, it is not possible to test the state of an indicator on the cycle following its formation. For this reason, history registers HR0-HR7, not shown, are provided for register storage of the Group 2 indicators. The states of such stored indicators The ZCSBRA switch 701-18 is normally enabled when the branch decision flip-flop RBD was set to a binary ONE in the previous cycle The first position selects a 13-bit branch address from the current microinstruction applied via the RSCR register 701-20. The branch address enables any one of the locations of the ECS control store to be addressed directly. The second position selects the concatenation of the 6 low order address bits from the current microinstruction applied via MIC register 701-15 and the 7 upper bits of the branch address from the current microinstruction applied via the RSCR register 701-20. This permits branches within a 64-word page defined by the contents of the MIC register 701-15 (current location + 1).

The third position selects the concatenation of 4 low order bits from the RVB0 vector branch register, 6 bits from the branch field of the current microinstruction stored in RCSR register and the 3 upper bits of the address stored in the MIC register. This permits 16-way branches. The fourth position selects the concatenation of the 2 low order ZEROS with 4 bits from the vector branch register RVB0 with the 4 most significant bits of the branch address field of the current microinstruction and the 3 upper bits of the current address stored in the MIC register. This permits 16-way branches with 3 control store locations between each adjacent pair of destination addresses.

The fifth position selects the concatenation of 2 low order ZEROS with 2 bits from vector branch register RVB1, with the 6 bits of the branch address of the current microinstruction and the upper 3 bits from the MIC register. This permits branches with 4 possible destinations with 3 control store locations between each adjacent pair of destination addresses.

The sixth position selects the concatenation of 2 low order ZEROS with 2 bits from vector branch register RVB2 with the 6 bits of the branch address of the current microinstruction and the upper 3 bits from the MIC register. This permits 4-way branches with 3 control store locations between each adjacent pair of destination addresses.

Figure 6B:
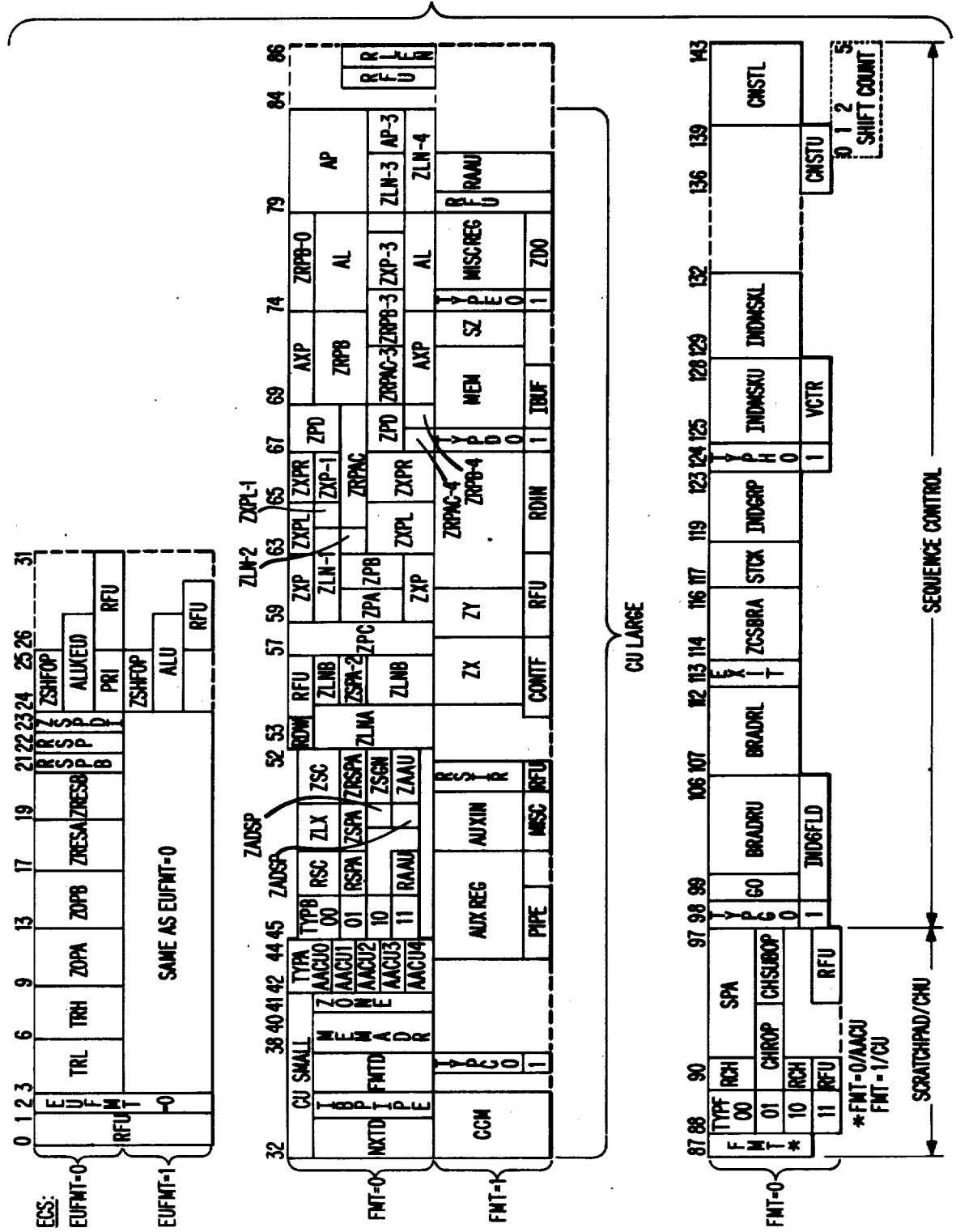
FIG. 6b illustrates the format of the microinstruction words of the execution control store of FIGS. 2 and 3.

The output of switch 701-12 addresses a specific location within control store 701-2 which causes the read out of a microinstruction word having a format illustrated in FIG. 6b. Referring to that Figure, it is seen that this microinstruction word is coded to include a number of different fields which are used to control the various functional units within processor 700. Only those fields which are related to the present example will be described herein.

| | | |
|---|---|---|
| Bits 0 - 1 | | Reserved for Future Use. |
| Bit 2 | EUFMT | Defines which format the EU is to operate with. EUFMT-0 specifies a first microinstruction format while EUFMT=1 specifies an alternate microinstruction format. |
| Bits 3 - 5 | TRL | TR Low Write Control. Write control of EU temporary registers TR0-TR3. |
| | 0XX | No change |
| | 100 | Write TR0 |
| | 101 | Write TR1 |
| | 110 | Write TR2 |
| | 111 | Write TR3 |
| Bits 6 - 8 | TRH | TR High Write Control. Write control of EU temporary registers TR4-TR7. |
| | 0XX | No change |
| | 100 | Write TR4 |
| | 101 | Write TR5 |
| | 110 | Write TR6 |
| | 111 | Write TR7 |
| Bits 9 - 12 | ZOPA | ZOPA Switch Control. Selects the output of ZOPA switch. |
| | 0) 0000 | TR0 |
| | 1) 0001 | TR1 |
| | 2) 0010 | TR2 |
| | 3) 0011 | TR3 |
| | 4) 0100 | TR4 |
| | 5) 0101 | TR5 |
| | 6) 0110 | TR6 |
| | 7) 0111 | TR7 |
| | 8 - 11) 10XX | RDI |
| | 12) 1100 | ZEB |
| | 13) 1101 | ZEB |
| | 14) 1110 | ZEB |
| | 15) 1111 | 0 (disable) |
| Bits 13 - 16 | ZOPB | ZOPB Switch Control. Selects the output of ZOPB switch. |
| Bits 17 - 18 | ZRESA | ZRESA Switch Control. Selects the output of ZRESA switch. |
| | 00 | ALU |
| | 01 | Shifter |
| | 10 | Scratchpad/RDI switch |
| | 11 | ZDO |
| Bits 19 - 20 | ZRESB | ZRESB Switch Control. Selects the output of ZRESB switch. |
| | 00 | ALU |
| | 01 | Shifter |
| | 10 | Scratchpad/RDI switch |
| | 11 | ZDO |
| Bit 21 | RSPB | Scratchpad Buffer Strobe Control. Strobes RSPB with ZRESB data. |
| | 0 | No strobe |
| | 1 | Strobe RSPB |
| Bit 22 | RSP | Scratchpad Write Control. |
| | 0 | Read scratchpad |
| | 1 | Write scratchpad |
| Bit 23 | ZSPDI | Scratchpad/RDI Switch Control. Selects the output of the Scratchpad/RDI switch. |
| | 0 | Scratchpad output |
| | 1 | RDI |
| Bits 24 - 25 | ZSHFOP | Shifter Operand Switch Control. Selects the left operand to the Shifter. |
| | 00 | ZOPA output |
| | 01 | EIS output |
| | 10 | 0 |
| | 11 | Select 0 or −1 depending on bit 0 of right operand to Shifter. |
| Bits 24 - 27 | ALU | ALU Function Control. Selects the operation applied to the two inputs (A and B) to the ALU. |
| Bits 24 - 29 | N/A | |
| Bits 26 - 31 | RFU | Reserved for Future Use. |
| Bits 30 - 31 | ZALU | ALU Switch Control. Selects the output of ZALU switch. |
| Bits 32 - 33 | NXTD | Next Descriptor Control. Strobes RBASB and RDESC registers. |
| | 00 | RBASB←00 RDESC←00 |
| | 01 | RBASB←01 RDESC←01 |
| | 10 | RBASB←Alt RDESC←10 |
| | 11 | No strobes (default) |
| Bits 32 - 35 | CCM | Control constant field referenced by the CONTF field. |
| Bits 34 - 35 | IBPIPE | IBUF/Pipeline Control. Selects the reading of IBUF or the pipeline operation. |
| | 00 | No operation |
| | 01 | Read IBUF/ZDI (Alt) |
| | 10 | Type 1 Restart Release or |
| | 11 | Type 4 Restart Wait |
| Bits 36 - 37 | FMTD | Selects the loading of various CU registers and indicates the interpretation to be given to the MEMADR field for small CU control. |
| | 00 | No operation |
| | 01 | RADO←ASFA |
| | 10 | RADO←ZRESB |
| | 11 | RADO←ASFA |
| Bits 38 - 40 | MEMADR | Cache Control. Selects cache operations. The complete interpretation for this control is a function of the FMTD control. |
| | 000 | No operation |
| | 001 | Read Sgl |
| | 010 | Load Quad |
| | 011 | Preread |

|  |  |  |
|---|---|---|
|  | 100 | Write Sgl |
|  | 101 | Write Dbl |
|  | 110 | Read Sgl Trans (for FMTD = 11 only) |
|  | 111 | Write Sgl Word (for FMTD = 11 only) |
| Bit 41 | ZONE | Zone Control. |

Indicates zone or no zone for small CU control.
    0    No zone
    1    Zone

Bits 42 - 44    TYPA    Type A Flag.
Indicates the type A overlayed fields being used.
    000    Type A = 0 fields
    .
    .
    100    Type A = 4 fields Bits 44 - 46    PIPE    Pipeline Control
Selects the type of restart to be initiated.
    000    No operation
    001    Type 1 Restart and Release
    010    Type 2 Restart
    011    Type 3 Restart
    100    Type 4 Restart
    101    Type 5 Release
    110    Type 6 Restart Bits 44 - 47    AUXREG    Auxiliary Register Write Control
Selects an auxiliary register or combinations to be strobed with data selected by the AUXIN control field.
    0) 0000    No strobe
    1) 0001    RRDXA
    2) 0010    R29
    3) 0011    R29, RRDXA, FRL, RID
    4) 0100    RRDXB
    5) 0101    RTYP
    6) 0110    RBASA
    7) 0111    RBASA, RTYP
    8) 1000    RBASB
    9) 1001    RDESC
    10)    RBASA, R29, RRDXA Bits 45 - 46    TYPB    Type B Flag.
Indicates the Type B overlayed fields being used.
    00    Type B = 0 fields
    .
    .
    11    Type B = 3 fields Bit 47    RSC    RSC Strobe Control.
Strobes the RSC register. (Shift Count)

Bit 47    RSPA    RSPA Strobe Control.
Strobes the RSPA register.

Bits 47 - 48    N/A

Bit 47    RAAU    RAAU Strobe Control.
Strobes RAAU register.

Bits 48 - 49    ZLX    ZLX Switch Control.
Selects the output of the ZLX switch.

Bits 48 - 49    ZSPA    ZSPA Switch Control.
Selects the output of the ZSPA switch.

Bits 48 - 50    AUXIN    Auxiliary Register Input Control.
Selects data to be strobed into auxiliary register(s).

Bit 49    ZADSP    ZADSP Switch Control.
Selects the output of ZADSP switch.

Bits 50 - 52    ZSC    ZSC Switch Control.
Selects the output of ZSC switch.

Bits 50 - 52    ZRSPA    ZRSPA Switch Control.
Selects the output of ZRSPA switch.

Bits 50 - 52    ZAAU    ZAAU Switch Control.

Bit 51    RSIR    RSIR Register Strobe.
Strobes the RSIR register as a function of the AUXIN field.

Bit 53    RDW    R1DW, R2DW Register Strobe.
Strobes the R1DW or R2DW register as a function of the RDESC register.

Bits 53 - 54    ZLNA    ZLNA Switch Control.
Selects output of ZLNA switch.

Bits 54 - 57    CONTF    Miscellaneous Flip-Flop Control.
Selects one of four groups of control flip-flops to be set or reset by the control constant field (CCM). The flip-flop include those of blocks 704 - 104 and 704 - 110.

Bits 55 - 56    ZLNB    ZLNB Switch Control.
Selects the output of ZLNB switch.

Bits 55 - 56    ZSPA(2) (Type A = 2)    ZSPA Switch, RSPA Register Control.
Selects ZSPA switch output and strobes RSPA register.

Bits 57 - 58    ZPC    ZPC Switch Control.
Selects the output of ZPC switch.

Bits 59 - 62    ZXP    ZXP Switch, RXP Register Bank Control.
Selects ZXP switch output and the RXP register into which it will be written.

Bits 59 - 63    ZLN(1) (Type A = 1)    ZLN Switch, RLN Register Bank Control.
Selects ZLN switch output and the RLN register into which it will be written.

Bits 59 - 60    ZPA    ZPA Switch Control.
Selects the output of ZPA switch.
    00 = RP0
    .
    .
    11 = RP3

Bits 61 - 62    ZPB    ZPB Switch Control.
Selects the output of ZPB switch.
    00 = RP0
    .
    .
    11 = RP3

Bits 63 - 64    ZXPL (Type A = 0)    ZXPL Switch Control.
Selects the output of ZXPL switch.
    00 = RXPA
    .
    .
    11 = RXPD Bit 63    ZLN(2) (Type A = 2)    ZLN Switch, RLN Register Bank Control.
Selects ZLN switch output and the RLN register into which it will be written.

Bits 63 - 66    RDIN    RDI In Control.
Selects the data to be strobed into the RDI register and selects one of the modification control fields (MF1 - MF3, TAG) of an instruction word. RDI strobe may also be controlled by the MISCREG field.

Bit 64    ZXPL(1) (Type A = 1)    ZXPL Switch Control.
Selects the output of ZXPL switch.

Bits 64 - 68    ZRPAC (Type A = 2)    ZRPA Switch, ZRPC Switch, RP0-3 Register Bank Control.
Selects ZRPC and ZRPA switch outputs and the RP0-3 register into which the ZRPA output will be written.

Bits 65 - 66    ZXPR (Type A = 0)    ZXPR Switch Control.
Selects the output of ZXPR switch.

Bits 65 - 66    ZXP (1) (Type A = 1)    ZXP Switch, RXP Register Bank Control.
Selects ZXP switch output and the RXP register into which it will be written.

Bits 67 - 68 (Type A = 0)    ZPD    ZPD Switch Control.
Selects the output of ZPD switch.

Bit 67    ZRPAC (4) (Type A = 4)    ZRPA Switch, ZRPC Switch, RP0-3 Register Bank Control.
Selects CP4 from ZRPA switch and strobes the RP1 register.

Bit 67    TYPD    Type D Flag.
Type D Flag which indicates type D overlayed fields.

Bit 68    ZRPB (4) (Type A = 4)    ZRPB Switch, RP4-7 Register Bank Control.
Selects 0 from ZRPB switch and strobes the RP4 register.

-continued

| | | |
|---|---|---|
| Bits 68 – 71 | MEM | Cache Memory Control. Selects the cache operation in conjunction with the SZ control. |
| | | 0) 0000 No operation |
| | | . |
| | | . |
| | | . |
| | | 15) 1111 Write Remote |
| Bits 68 – 70 | IBUF | IBUF Read Control. Selects the destination of IBUF data when reading IBUF. |
| Bits 69 – 73 | AXP (Type A = 0) | ZXPA Switch, ZXPB Switch, AXP Adder, ZAXP Switch, RE Register Control. Selects ZXPA and ZXPB switch outputs, the AXP adder function applied to them, and the ZAXP switch output. Also strobes the RE register. |
| Bits 69 – 73 | ZRPB (Type A = 1) | ZRPB Switch, RP4-7 Register Bank Control. Selects ZRPB switch output and the RP4-7 register into which it will be written. |
| Bits 69 – 71 | ZRPAC-3 (Type A = 3) | ZRPA Switch, ZRPC Switch, RP0-3 Register Bank Control. Selects ZRPC and ZRPA switch outputs and the RP0-3 register into which the ZRPA output will be written. |
| Bits 72 – 74 | ZRPB (3) (Type A = 3) | ZRPB Switch, RP4-7 Register Bank Control. Selects ZRPB switch output and the RP4-7 register into which it will be written. |
| Bits 72 – 73 | SZ | Size/Zone Cache Control. Controls cache operations in conjunction with the MEM control field. |
| Bits 74 – 78 | ZRPB (0) (Type A = 0) | ZRPB Switch, RP4-7 Register Bank Control. Selects ZRP switch output and the RP4-7 register into which it will be written. |
| Bits 74 – 78 | AL (Type A = 1) | ZALA Switch, ZALB Switch, AL Adder Control. Selects ZALA and ZALB switch outputs and the AL adder function applied to them. |
| Bit 74 | TYPE | Type E Flag. Type E flag which indicates the type E overlayed fields. |
| Bits 75 – 77 | ZXP (3) (Type A = 3) | ZXP Switch, RXP Register Bank Control. Selects ZXP switch output and the RXP register into which it will be written. |
| Bits 75 – 78 | MISCREG | Miscellaneous REgister Control. Selects various operations on miscellaneous registers (e.g. RBIR, RDI, RLEN, RSPP). |
| Bits 75 – 78 | ZDO | ZDO Switch Control. Selects the output of the ZDO switch. |
| Bit 78 | ZIZN | ZIZN Switch Control. Selects the output of ZIZN switch. |
| Bits 79 – 83 | AP | ZAPA Switch, ZAPB Switch, AP Adder Control. Selects ZAPA and ZAPB switch output and the AP adder function applied to them. |
| Bits 79 – 81 | ZLN (3) (Type A = 3) | ZLN Switch, RLN Register Bank Control. Selects ZLN switch output and the RLN register into which it will be written. |
| Bits 79 – 83 | ZLN (4) (Type A = 4) | ZLN Switch, RLN register Bank Control. Selects ZLN output and the RLN register into which it will be written. |
| Bits 80 – 81 | RAAU | RAAU/RE Register Strobe. Selects the data to be strobed into the RAAU and RE registers by controlling several switches and adders in the unit 722. |
| Bits 82 – 83 | AP (3) (Type A = 3) | ZAPA Switch, ZAPB Switch, AP Adder Control. Selects ZAPA and ZAPB switch outputs and the AP adder function applied to them. |
| Bit 84 | ZRSC (Type A = 0) | ZRSC Switch Control. Selects the output of ZRSC Switch. |
| Bits 85 – 86 | N/A | |
| Bit 86 | RLEN (Type A = 3) | RLEN Strobe Control. RLEN strobes are also controlled by hardware or by the MISCREG field. |
| Bit 87 | FMT | Format Flag. Indicates the type of format. |
| Bits 88 – 89 | TYPF | Indicates the type of overlayed fields. |
| | | 00 = Scratchpad Address |
| | | 01 = Character Unit Control |
| | | 10 = Multiply/Divide Control |
| | | 11 = N/A |
| Bit 90 | RFU | Reserved for Future Use. |
| Bits 90 – 93 | CHROP | Character Unit Op Code. Selects main operation to be performed by Character Unit and the interpretation to be given to the CHSUBOP field. |
| | | 0) 0000 No operation |
| | | 1) 0001 Load Data |
| | | 2) 0010 MOP Execute |
| | | 3) 0011 Compare Single |
| | | 4) 0100 Compare Double |
| | | 5) 0101 Load Register |
| | | 6) 0110 Update CN |
| | | 7) 0111 Undefined |
| | | 8) 1000 Set RCH Operation A |
| | | 9) 1001 Set RTF1 |
| | | 10) 1010 Set RTF2 |
| | | 11) 1011 Set RTF3 |
| | | 12) 1100 Set RCN1 |
| | | 13) 1101 Set RCN2 |
| | | 14) 1110 Set Edit Flags |
| | | 15) 1111 CH Unit Clear |
| Bit 90 | RCH | RCH Register Strobe. Strobes the OP1 RCH register. |
| Bit 90 | RFU | Reserved for Future Use. |
| Bits 91 – 97 | SPA | Scratchpad Address. Contains the address that may be used to address the EU scratchpad. |
| Bits 91 – 93 | N/A | |
| Bits 94 – 97 | CHSUBOP | Character Unit Sub-Op Code. Selects the detailed function of the Character Unit or it may contain a constant. The interpretation of this field is a function of the CHROP control as shown below. |

CHROP = 0000 No Operation

| CHSUBOP$_{0-3}$ | |
|---|---|
| XXXX | No interpretation |

CHROP = 0001 Load Data Operation

| CHSUBOP$_{0-1}$ | (Suboperation) |
|---|---|
| 00 | OP1 Load by CN1 and TF1 |
| 01 | OP1 Load in Reverse by CN1 and TF1 |
| 10 | OP2 Load by CN2 and TF2 and Test Character |
| 11 | Load Sign |
| CHSUBOP$_{2-3}$ | (Fill Control) |
| 1X | Fill character loaded to ZCU |
| X1 | Fill character loaded to ZCV |

CHROP = 0010 MOP Execute Operation

| CHSUBOP$_{0-1}$ | (Suboperation) |
|---|---|
| 00 | MOP set by CN2 |
| 01 | MOP Execute |
| 10 | Undefined |
| 11 | Undefined |
| CHSUBOP$_{2-3}$ | |
| XX | No interpretation |

CHROP = 0101 Load Register Operation

| CHSUBOP$_{0-1}$ | (Selects output of RCH) |
|---|---|
| CHSUBOP$_{2-3}$ | (Selects output of ZOC switch) |

CHROP = 1011 Set RTF3 Operation

| CHSUBOP$_{0-1}$ | (Selects data to be inspected for 00, indicating a 9-bit character. |
|---|---|
| CHSUBOP$_{2-3}$ | (Constant Field) |

CHROP = 1110 Set Edit Flags Operation

| CHSUBOP$_{0-3}$ | (Constant selecting flags to be set) |
|---|---|
| 1XXX | Set ES (End suppression) |
| X1XX | Set SN (sign) |
| XX1X | Set Z (zero) |
| XXX1 | Set BZ (Blank When Zero). |

| Bits 94 – 97 | RFU | Reserved for Future Use. |
|---|---|---|
| Bits 97 – 97 | N/A | |

-continued

| Bit 98 | TYPG | TYPE G FLAG. |
| | | Indicates the type of overlayed fields. |
| | | 0 = BRADRU field |
| | | 1 = IND6 field |
| Bit 99 | GO | State of Conditional Branch Test. |
| Bits 99 - 106 | BRADRU | Branch Address Upper. |
| Bits 99 - 106 | IND6FLD | Indicator Control. |
| | | Selects an indicator. |
| Bits 99 - 106 | | Bit 99 = 0 specifies a change indicators instruction. |
| | | Bit 99 = 1 specifies a set/reset indicators instruction (set or reset indicated by X bit 0 or 1 respectively. |

```
        Bits 100 - 104    105 - 1      106 = 1
             0000
              .
              .
              .
             1100X         Exhaust 1    Exhaust 2
             1101X         Exhaust 3    N/A
             1110X         Exhaust 1    Exhaust 2
                           Eff.         Eff.
```

| Bits 107 - 112 | BRADRL | BRANCH ADDRESS LOWER. |
| | | Contains lower portion of an ECS address used for branching. |
| Bit 113 | EXIT | Selection of Exit Switch Control. |
| | | Selection of Exit indicates end of microprogram. |
| Bits 114 - 116 | ZCSBRA | ZCSBRA Switch Control. |
| | | Defines the position to be selected in a Control Store Branch Address Switch. |
| Bits 117 - 118 | N/A | |
| Bits 119 - 123 | INDGRP | Conditional Branch Indicator Group Control. |
| | | The first two bits (119 - 120 select the "group" of microprogram indicators. The last three bits (121 - 123 select the "set" of indicators within each "group". |
| Bit 124 | TYPH | Type H field. |
| | | Indicates the type H overlayed fields. |
| | | 0 = INDMSKU |
| | | 1 = VCTR field |
| Bits 125 - 128 | INDMSKU | Conditional Branch Indicator Mask Upper. |
| | | Contains the upper 4 bits of the indicator mask in type H = 0 field. |
| Bits 125 - 129 | VCTR | Vector Select. |
| | | Selects the branching vectors to be strobed into the RVB0, RVB1 and RVB2 registers. The most significant bit (125) determines which of two groups 0 or 1, 2 or 3 and 4 or 5 will be strobed into the RVB0, RVB1 and RVB2 registers respectively. The remaining 3 bits select the vector within each group. |
| Bits 129 - 132 | INDMSKL | Conditional Branch Indicator Mask Lower. |
| | | Contains the lower 4 bits of the indicator mask. |
| Bits 133 - 135 | N/A | |
| Bits 136 - 139 | CNSTU | Constant Upper. |
| | | Contains the upper 4 bits of the constant field. |
| Bits 140 - 143 | CNSTL | Constant Lower. |
| | | Contains the lower 4 bits of the constant field. |

Control Logic Unit 704-1

This unit includes the sequence decode logic circuits 704-100 as mentioned whose outputs feed a plurality of I cycle control state flip-flops of block 704-102. These flip-flops in response to signals from the circuits 704-100 as well as microinstruction signals from register 701-4 (DEMR038-40 which correspond to the mem address field MEMADR of FIG. 6b) generate the various required I cycle control states required for the execution of program instructions. It is assumed that block 704-102 also includes gate circuits which generate register hold signals [HOLDE00 which are distributed throughout the processor 700.

As seen from FIG. 3c, the I cycle control state flip-flop receive control input signals via control lines including a line CPSTOP00 from cache unit 750 and a REGBSY signal from section 704-5. As explained herein, the state of the CPSTOP00 line determines whether processor operation continues in that when the line is forced to a binary ZERO, the hold or enabling signals for the I cycle control state flip-flops and other storage registers are also forced to ZEROS. The hold signals corresponding to signals [HOLDI00 and [HOLDE00 operate to hold or freeze the state of the processor 700. Since no incrementing of the control store address an take, the ECS control store reads out the same microinstruction word. The signals [HOLDI and [HOLDE are set in accordance with the following Boolean expressions: [HOLDI = REG.BSY + CACHE HOLD + TERMB (DREQ-IF-DIR) + HOLD REL wherein the state of signal REGBSY corresponds to the output of the register busy circuits, signal CACHE HOLD corresponds to the state of signal CPSTOP, the states of signals TERMB (DREQ-IF-DIR) are binary ONES during control state FPOA when the cache command specifies an I fetch or direct operation and the signal HOLD REL is a binary ONE until switched to a binary ZERO by the generation of a microprogram release signal; and [HOLD E = [HOLD I.

In accordance with the teachings of the present invention, each of the instructions which comprise the repertoire of the preferred embodiment of the present invention are assigned one of a number of control sequence codes (CCSS) as follows which enable efficient instruction cycle processing. These different classes of hardwired sequences are established to permit the kind of performance desired for the execution of the entire repertoire of instructions listed in Appendix A. The hardwired sequence selected for each instruction is chosen to provide the particular type of performance required for efficient pipeline operation.

The instructions are designated by mnemonics which are listed in an instruction index included in an appendix A. A number of the instructions are described in the publication "Series 60 (Level 66)/6000 MACRO Assembler Program (GMAP)" by Honeywell Information Systems Inc., copyright 1977, order number DD08B, Rev. 0.

| CCS-S | SEQUENCE | INSTRUCTION TYPES |
|---|---|---|
| 000000 | LD-SGL | LDA, LDQ, LCA, LCQ, ADA, ADQ, ADLA, ADLQ, AWCA, AWCQ, SWCA, SWCQ, CMPA, CMPQ, CANA, CANQ, ANA, ANQ, ORA, ORQ, ERA, ERQ, SBA, SBQ, SBLA, SBLQ, LDE, FSZN, LXLN, LDI |

| CCS-S | SEQUENCE | INSTRUCTION TYPES |
|---|---|---|
| 000001 | LD-SGL-DEL | FLD, CNAA, CNAQ, ADE |
| 000010 | LD-SGL-ESC | MPY, MPF, DIV. DVF, CWL, CMG, CMK, FAD, UFA, FSB, UFS, FMP, UFM, FDV, FDI, LDT, FCMP, FCMG, CCD, ADL, XEC, CIOC, LPDBR, LDDSA, LDO, LDPn, LDEAn, PAS, LARn, AARn, NARn, LDWS |
| 000011 | LD/STR-SGL-ESC | ASA, ASQ, AOS, SSA, SSQ, ANSA, ANSQ, ORSA, ORSQ, ERSA, ERSQ, ARAn, ARNn, SARn. |
| 000100 | LD-HWU | LDXn, LCXn, ADXn, ADLXn, SBXn, SBLXn, ANXn, ORXn, ERXn, CMPXn |
| 000101 | LD-HWU-DEL | CNAXn |
| 000110 | LD-HWU-ESC | LBAR, LBER, LMBA, LMBB |
| 000111 | LD/STR-HWU-ESC | ASXn, SSXn, ANSXn, ORSXn, ERSXn |
| 001001 | LD-DBL | LDAQ, LCAQ, ADAQ, ADLAQ, SBAQ, SBLAQ, ANAQ, ORAQ, ERAQ, CMPAQ, CANAQ, DFLD |
| 001010 | LD-DBL-ESC | CNAAQ, XED, LDSS, LDAS, LDPS, LDDSD, DFSB, DUFS, DFMP, DUFM, DFDV, DFDI, DFCMP, DFCMG, DFAD, DUFA, QFLD, QFAD, QFSB, QFMP, QSMP, |
| 010000 | STR-SGL | STA, STQ |
| 010001 | STR-HWU | STXn |
| 010010 | STR-DBL | STAQ |
| 010100 | RD-CLR | |
| 011000 | EFF-ADR | EAA, EAQ, EAXn, NEG |
| 011010 | EFF-ADR-ESC | ARS, QRS, LRS, ALS, QLS, LLS, ARL, QRL, ERL, ALR, LLR, QLR, GTB, NEGL |
| 100000 | TRF | TRA, TZE, TNZ, TMI, TPL, TRC, TNC, TOV, TEO, TEU, TTF, TRTN, TRTF, TTN, TMOZ, TPNZ |
| 100100 | ESC | RCCL, LCCL, RPT, RPD, RPL, STCA, STCQ, STBA, STBQ, MME, DRL, ILLOC, CCAC, AWD, SWD, A9BD, A4BD, A6BD, ABD, S9BD, S4BD, S6BD, SBD, CAMP, RPN, RIMR, SFR, LLUF, LIMR, RRES, HALT, SDRn, ESC-LD |
| 100101 | ESC-ID | MLDA, MLDQ, MLDAQ |
| 100110 | ESC-ST | MSTA, MSTQ, MSTAQ |
| 101000 | NO-OP | NOP |
| 101001 | TSXN | TSXN |
| 101010 | ESC-EA | LREG, SREG, STC1, STC2, FSTR, DFSTR, STE, SBAR, TSS, RET, SPL, LPL, STI, SBER, SMBA, SMBB, SAREG, SXLn, EPAT, EPPRn, CLIMB, STWS, STPn, LAREG, QFSTR, LDDn, FST, DFST, FRD, DFRD, FNEG, FNO, STDn, LDAC, LDQC, SZNC, DIS |
| 101100 | DEL-STR-SGL | STT, STZ, SPDBR, STPDW, STPTW, STDSA, STO |
| 101101 | DEL-STR-DBL | STSS, STDSD, STTA, STTD, STPS, STAS SDZn, QFST |
| 110000 | BIT | CSL, CSR, SZTL, SZTR, CMPB |
| 110001 | MTM-MTR | MTM, MTR |
| 110011 | MRL | MRL |
| 110100 | TCT | TCT |
| 110101 | TCTR | TCTR |
| 110110 | SCAN-FWD | SCM, SCD |
| 110111 | SCAN-REV | SCMR, SCDR |
| 111000 | NUM2 | MVN, MUNX, CMPN, CMPNX, AD2D, AD2DX, SB2D, SB2DX, DV2D, DV2DX, MP2D, MP2DX |
| 111001 | MVT | MVT |
| 111010 | CONV | BTD, DTB |
| 111011 | MLR | MLR |
| 111100 | NUM3 | AD3D, AD3DX, SB3D, SB3DX, MP3D, MP3DX, DV3D, DV3DX |
| 111101 | EDIT | MVE, MVNE, MVNEX |
| 111110 | CMPC | CMPC |
| 111111 | CMPCT | CMPCT |

The different assignable hardwired sequences operate in the following manner.

HARDWIRED SEQUENCES

LD-SGL SEQ

This hardwired sequence causes the control unit to generate the effective address during a FPOA cycle and to cause the cache unit to execute a read single memory cycle of operation. When indirect addressing is specified, control is transferred to an address preparation microprogram routine. The requested data is loaded into the RDI register at the completion of the cache cycle and is then available for use during the execution cycle.

LD-SGL-DEL SEQ

This 2T hardwired sequence is the same as LD-SGL except that a 1T delay state is entered after the FPOA cycle (FPOA→FDEL →EPOA-NEXT).

LD-SGL-ESC SEQ

Same as LD-SGL sequence except the pipeline is stopped after the current FPOA cycle is completed (escape state is entered).

LD-HWU SEQ

Same as LD-SGL sequence except that bits 00-17 of RDI register are loaded from the cache unit. Memory bits 00-17 and zeros are loaded into $RDI_{18-35}$.

LD-HWU-DEL

This 2T hardwired sequence is the same as the LD-HWU sequence except a 1T delay state is entered after state FPOA. The sequence is FPOA→FDEL→FPOA-NEXT.

LD-HWU-ESC

This sequence is the same as the LD-HWU sequence except the pipeline is stopped after the completion of the current FPOA cycle.

LD/STR-SGL-ESC

This sequence is the same as the LD-SGL-ESC sequence except that in addition to normal read checks, a write check is also performed. This sequence is used for "READ-ALTER-REWRITE" types of operation.

LD/STR-HWU-ESC

This sequence is the same as LD/STR-SGL-ESC sequence except that bits 00-17 of the RDI register are loaded from the cache unit memory bits 00-17 and zeros are loaded in $RDI_{18-35}$.

LD-DBL SEQ

This sequence causes the control unit to generate the effective address during a FPOA cycle and causes the cache unit to execute a read double memory cycle of operation. The requested data is returned to the RDI register on two consecutive cycles.

LD-DBL-ESC SEQ

This sequence is the same as the LD-DBL sequence except the escape state is entered after the current FPOA cycle is completed.

STR-SGL SEQ

This 2T sequence (FPOA→FSTR) causes the control unit to generate an effective address and causes the cache unit to execute a write single memory cycle (FPOA) of operation. During the second cycle (FSTR) the register to be stored (as selected by the contents of the RRDX-A register) is transferred to the RADO register as follows ZX→ZDO→ZRESB→RADO.

STR-HWU SEQ

This sequence is the same as the STR-SGL sequence except that the cache unit causes a change only in bits 00-17 of a memory location.

STR-DBL SEQ

This 3T sequence (FPOA→FSTR-DBL→FSTR) causes the control unit to generate an effective address and causes the cache unit to execute a write double memory cycle (FPOA control state) of operation. During the second and third cycles the EVEN and ODD data words (is selected by the contents of the RRDX-A register) are sent to the cache unit.

RD-CLR SEQ

This sequence is the same as the LD-SGL sequence except the cache unit causes the memory location to be read and also cleared.

EFF-ADR SEQ

This sequence causes the control unit to load bits 00-17 of the RDI register with an effective address that is generated during a FPOA cycle while bits 18-35 of the RDI register are loaded with zeros.

EFF-ADR-ESC SEQ

This sequence is the same as the EFF-ADR sequence except the pipeline is stopped after the FPOA cycle (Escape state is entered).

TRF SEQ

This sequence causes the control unit to request two four word blocks of instructions (during FPOA and FTRF control states) for the instruction buffer in preparation for a transfer of control or any branch operation.

ESC SEQ

This sequence causes the pipeline to be stopped after the FPOA cycle. No memory cycles are initiated and there is no address preparation performed.

ESC-LD & ESC-STR SEQS

These sequences are the same as ESC and are used for executing testing operations.

ESC-EA SEQ

This sequence causes the control unit to load a temporary register with an address pointer generated during the FPOA cycle. The pipeline is stopped after FPOA.

DEL-STR-SGL SEQ

This 3T sequence (FPOA-FDEL-FESC) causes the control unit to generate an effective address during state FPOA and then switch to a second FDEL state. This allows the cache unit an extra cycle to fetch the data to be stored. At the completion of FDEL, the cache unit is caused to initiate a write single memory cycle of operation and the hardware switches to FESC state. The data to be written is transferred to the RADO register under microprogram.

DEL-STR-DBL SEQ

This sequence is the same as DEL-STR-SGL except the sequence is 3T. The sequence is FPOA→FDEL→FESC. A write double memory cycle is initiated during state FDEL. Data is transferred to the RADO register on the cycles following state FDEL under microprogram control.

EDIT SEQ (EIS)

This sequence is FPOA-FPOP1-FPOP2 followed by FPOP3. There is an escape to microprogram control which following the setting up of registers, tables, etc. required for processing edit operands signals the hardware control circuits to enter state FPOP3.

The remaining EIS sequences can be considered as having states similar to that of the EDIT sequence.

TSXn

This sequence causes the processor 700 to compute the effective address and update the instruction counter. During a second cycle (FTSX1), the updated instruction counter is loaded into the RDI register for subsequent transfer to the specified index register. The computed effective address is loaded into TEAO and the processor 700 transfers control to that location (FPI-INIT).

The hardwired control states used during I cycle processing in accordance with the present invention and a brief description of the operations performed during such control states or cycles are as follows.

| I CYCLE CONTROL STATE/CYCLE | DESCRIPTION |
|---|---|
| FPOA | The FPOA Prepare Operand state is the starting control state for all instructions. During FPOA, an |

| I CYCLE CONTROL STATE/CYCLE | DESCRIPTION |
|---|---|
| | address is calculated and the op-code is translated via the CCS control store to control further actions. |
| FPOP | The FPOP Prepare Operand Pointer state is used to process EIS instruction descriptors. |
| FSTR | The FSTR Store state is used to transfer "store" data into the RADO register in the case of instructions requiring sequences, and to transfer the second (odd) word of double precision data to the RADO register in the case of instructions requiring store double sequences. |
| FSTR-DBL | The FSTR-DBL Store Double state is used to transfer the first (even) word of double precision data to the RADO register for those instructions requiring store double sequences. |
| FESC | The FESC Escape state is used to provide a variable delay to the I-Process pipeline. During state FESC, the ESC control store has complete control over the processor 700, and determines when to restart the I-Process pipeline. |
| FDEL | The FDEL Delay state provides a 1T delay to the I-Process pipeline. |
| FWF-IND | The FWF-IND Wait for Indirect Word state provides the control to transfer signals on the ZDI lines into the RSIR register. |
| FTRF | The FTRF Transfer state is used to request that the cache unit fetch a second block of instructions for loading into the I Buffer and to strobe a first instruction for a new instruction stream into the processor 700 RBIR register. |
| FTRF-NG | The FTRF-NG Transfer No Go state is used to reload the I Buffer address registers with the old instruction stream address. |
| FPIM-1 | The FPIM-1 Prepare Instruction Address for I Buffer Maintenance Type 1 state is entered when the I Buffer runs out of instructions. During the FPIM-1 state, a block of instructions is requested for the I Buffer. Also, during the FPIM-1 state, a processor-hold condition occurs when the cache unit signals a Cache-Miss condition. |
| FPIM-2 | The FPIM-2 Prepare Instruction Address for I Buffer Maintenance Type 2 state enables a second block of instructions to be requested for the I Buffer. During the FPIM-2 state, there is no-processor-hold condition generated when the cache unit signals a Cache-Miss condition. Also, during state FPIM-2, the next instruction is strobed into the processor's RBIR register. |
| FPI-INIT | The FPI-INIT Prepare Instruction Address for I Buffer Initialize state is used to reload the I Buffer after a transfer (store compare) or after a Type 3 restart. |
| FWF-IBUF | The FWF-IBUF Wait for I Buffer Ready state is entered when an instruction is needed from the I Buffer, and the I Buffer is in a not ready condition. |
| FPIM-EIS | The FPIM-EIS Prepare Instruction Address for I Buffer Maintenance EIS state is entered following the FPOA cycle of an EIS multi-word instruction whenever the I Buffer does not contain enough descriptors to complete the processing of the instruction. |
| FWF-DESC | The FWF-DESC Wait for Descriptor state is entered when a descriptor is needed from the I Buffer, and the I Buffer is in a not ready condition. |
| FIDESC | The FIDESC Indirect to Descriptor state is the control state used to process EIS indirect descriptors. |
| FWF-IDESC | The FWF-IDESC Wait for Indirect Descriptor control state provdes the control to transfer the cache word applied to the ZDI lines to the RSIR register 704-154. |
| FIT-I | The FIT-I Indirect and Tally Indirect control state is used to process non-EIS descriptors specifying indirect and tally indirect address modifications. |
| FIRT | The FIRT Indirect and Register Test control state is entered during the processing of non-EIS descriptors specifying indirect and register address modifications to determine whether the processing of that type of address modification is completed. |
| FTSXI | The FTSXI Transfer and Set Index control state is used to transfer the updated contents of the instruction counter to the RDI register in the case of transfer and set index instructions. |

As seen from FIG. 3c, signals corresponding to the I cycle control states are applied as inputs to a plurality of control flip-flops of block 704-104, decoder circuits of block 704-106, a number of control logic circuits of block 704-108 and to a plurality of control flag indicator flip-flops of block 704-110. It is also seen that the various indicator flip-flops of block 704-110 also receive microinstruction input signals via lines MEMD054-57 from execution control unit 704-4.

Figure 3D:
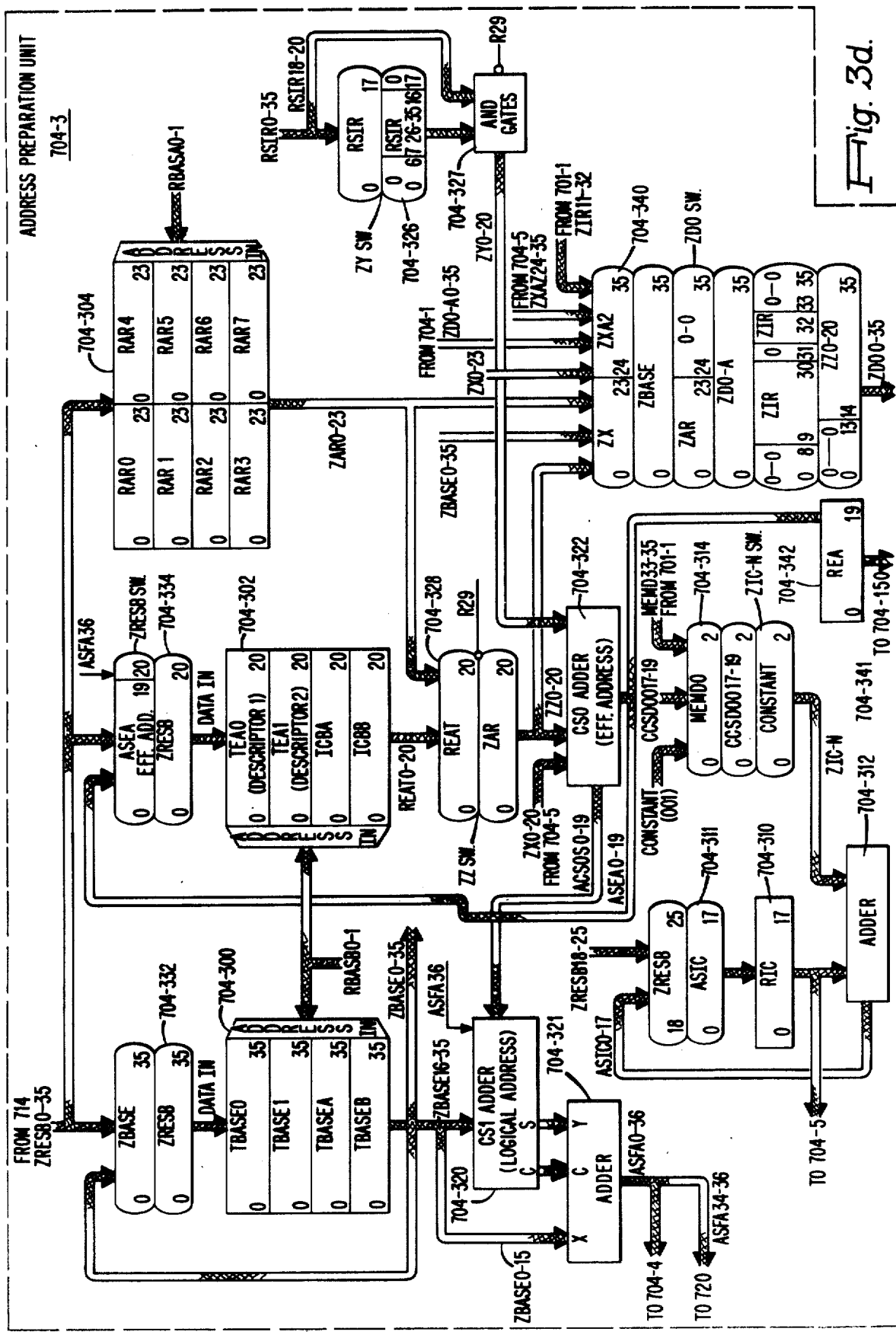

As seen from FIG. 3d, signals generated by the hardware control logic circuits 704-108 fall into one of three groups as a function of the units whose operations are being controlled. That is, the groups are instruction buffer control, hardware control and hardware memory control.

In each case, each group of signals are ored together with equivalent signals generated by other sources and then decoded. The other sources correspond to fields within the two different formats of the microinstruction word of FIG. 6a which are loaded into RCSR register 704-112 from the ECS output register 701-4.

One field corresponds to bits 32-83 of one format (large CU) and another field (short CU) corresponds to bits 32-41 of another format. These fields are decoded by a decoder 704-114 into the sets of bits indicated and combined within the decoders 704-116, 704-124, 704-126 and 704-128 as shown. Further decoding is done by the circuits of blocks 704-118, 704-135 and 704-120. The results of decoding such fields are either distributed throughout processor 700 or are stored in an RMEM register 704-130, an RSZ flip-flop 704-132, an FREQDIR flip-flop 704-136 and an FREQCAC flip-flop 704-134.

Additional decoding of the large and short CU fields and signals from the I cycle state circuits of block 704-112 is done via a decoder 704-106 and 704-107. The decoder 704-106 generates control signals for loading different ones of the registers and for enabling various multiplexer/selector switches within the processor 700. The decoder 704-107 operates to generate signals for setting and resetting a pair (RBASB) of base pointer B flip-flops 704-144. Other combinations of these signals are used to set and reset the descriptor number flip-flops of blocks 704-140 and 704-142.

As seen from FIG. 3c, the decoder 704-116 receives a control signal [EXH00 generated by the decoder circuits of block 704-117. These circuits receive signals from the RDESC register 704-140 and signals from the exhaust flip-flops of block 701-1. In accordance with the states of these signals, the circuits force signal [EXH000 to a binary ZERO to inhibit the generation of a cache memory command upon the occurrence of an exhaust condition. The signal [EXH000 is generated in accordance with the following Boolean expression:

[EXH000 = DESCO·FE11 + DESCL·FE2 + DESC2·FE3.

The flip-flop FNUM is normally set in response to the CCS-OP field of the microinstruction word. When set to a binary ONE, this indicates that the descriptor being processed is a numeric type.

The different flip-flops of block 704-104 will now be discussed in greater detail. In greater detail, the flip-flop FCHAR provides certain changes in the control of address generation. When the FCHAR flip-flop is set to a binary ONE during the processing of a load type instruction specifying character modification, then the contents of the RDI register is not changed under hardware control. This allows the RDI register to be loaded with data under microprogram control prior to starting the pipeline. Also, if the FCHAR flip-flop is set to a binary ONE during a store type instruction specifying character modification, then the execution address for this instruction is modified under hardware control to point to a unique address of the microinstruction sequence in the ECS control store that is to process this type of instruction.

The flip-flop FDT-FOUR provides additional control on the readout of the address register (ZAR$_{0-19}$) of block 704-304. Flip-flop FADR-WD provides additional control for the ZDO switch 704-340. When this flip-flop is set to a binary ONE, then the ZAR position of the ZDO switch is forced to select a word address. The flip-flop FADR-B provides additional control for the ZDO multiplexer switch. When set to a ONE, then the ZAR position of the ZDO switch is forced to select a byte address. The flip-flop FNUM is normally set in response to the CCS-OP field of the microinstruction word. When set to a binary ONE, this indicates that the descriptor being processed is a numeric type. The flip-flop FIG-LEN provides additional control over the loading of registers within the unit 722 (length registers) and over memory operations. When set to a binary ONE, the RXP, and RLN registers within unit 722 are not loaded from the RSIR register 704-154 during control states FPOP.

The FINH-ADR flip-flop inhibits the operation of the address preparation unit 704-3. When set to a binary ONE, an address cycle (FPOA/FPOP) consists of adding the contents of a temporary effective address register REA-T + ZERO. The register REA-T will have been loaded with the address prior to doing a FPOA/FPOP cycle. The FABS flip-flop enables the generation of absolute addresses. When set to a binary ONE, a 24-bit absolute address is used. As concerns the flag or indicator flip-flops of block 704-110, flip-flop FID when set to a binary ONE provides an indication that indirect address modification during an instruction is required on the descriptor loaded into the RSIR register.

The FRL flip-flop when set to a binary ONE indicates that the length is specified in a register associated with the instruction loaded into various instruction registers. The three flip-flops FINDA, FINDB and FINDC provide indications used in processing memory type instructions. Flip-flop FINDA is set to a binary ONE when length is specified in a register or when flip-flop FAFI is set to a ONE. Flip-flop FINDB is set to a binary ONE when the descriptor does not include nine bit characters. The flip-flop FINDC is set to a binary ONE when the descriptor does include six bit characters.

The FAFI flip-flop is set to a binary ONE when the processor circuits detect that indicator bit 30 of IR register 701-41 was set to a binary ONE during the execution of an EIS instruction indicative of a mid instruction interrupt (required to adjust pointer and length values because of interrupt). The FTRGP, FTNGO and FTRF-TST flip-flops are set to binary ONES in conjunction with transfer type instructions. More specifically, the FTRGP flip-flop provides a microprogram indication of being set to a binary ONE when the processor circuits detect the read out of a transfer type of instruction during the execution of an execute double (XED) or repeat (RPTS) instruction. The FTNGO flip-flop provides a microprogram indication of being set to a binary ONE when the condition of transfer signalled by the execution control unit 701 was transfer NO GO (i.e., transfer did not take place). The FTRF-TST flip-flop of this group indicates when set to a binary ONE that the previous instruction executed by processor 700 was a transfer type instruction and that the current I cycle is to be executed conditioned upon the presence of a transfer GO (TRGO) signal from control unit 701.

Additionally, the circuits of block 704-110 include a number of flip-flops used in performing indirect addressing operations under hardwired control for other than EIS instructions. These include FIR, FIRT, FIRL and FRI flip-flops which are switched to binary ONES as functions of the different types of indirect address modifications required to be performed. For example, the FRI flip-flop signals a register then indirect address modification and is switched to a binary ONE when a register indirect (RI) indicator is a binary ONE. The FIR flip-flop is switched to a binary ONE when an indirect then register (IR) indicator is a binary ONE. This flip-flop signals the beginning of an indirect then register address modification. The FIRL flip-flop is switched to a binary ONE when an indirect then tally indirect (IT-I) indicator is a binary ONE. This flip-flop signals a last indirect operation. Another flip-flop TSX2 provides an indication used in processing transfer and set index instructions while a STR-CPR flip-flop is used during the processing of store instructions.

As seen from FIG. 3c, the outputs from the control flag flip-flops of block 704-110 are applied as inputs to the branch indicator circuits of block 701-1. Also, output signals from the control flag flip-flops are also applied as inputs to the I cycle flip-flops of block 704-102.

Register Section 704-150

As seen from FIG. 3c, the control logic unit 704-1 further includes a register section 704-150. This section contains the basic instruction register (RBIR) 704-152, the secondary instruction register (RSIR) 704-154, a base pointer A register (RBASA) 704-156 used for selecting one of the address registers RAR0 through RAR7 of block 704-304, a read index register A (RRDXA) 704-158 used for selection of index registers included within section 704-5 (not shown) and for selection of outputs from the ZDO multiplexer switch 704-340, a read index A save (RRDXAS) register 704-159, and a descriptor type register (RTYP) 704-160 indicating the type of data characters being pointed to by the descriptor value (e.g. 9-bit, 6-bit, 4-bit). The section 704-150 further includes a 1-bit instruction/EIS descriptor register designated R29 of block 704-162. The state of this bit in conjunction with the contents of the RBAS-A register 704-158 are used to select the particular address register used for address preparation. When register R29 of block 704-162 is set to a binary ZERO, this indicates that none of the address registers of block 704-304 are used during address preparation. The last registers of section 704-150 include the data in register (RDI) of block 704-164 and a read index register B (RRDXB) pointing to registers used by execution unit 714.

As seen from FIG. 3, the RBIR register 704-152 is loaded via a two position switch 740-170 connected to receive signals from the sources indicated (i.e., a switch ZIB-B 704-172 and lines ZDI 0-35). The RSIR register 704-154 similarly receives signals from the ZDI lines and switch 704-172. The RBASA register 704-156 receives signals from the ZDI line 0-2 in addition to a further switch ZBASA of block 704-174. The RRDXA register and RTYP register receive signals from the ZDI lines as well as a switch 704-176 and switch 704-178 as shown. Also, the RRDXA register receives signals from the RRDXAS register 704-159.

The switch 704-172 is a two position switch which receives inputs from the switches ZIB and ZRESB from the cache unit 750 and execution unit 714 respectively. The switch 704-174 is a three input switch which receives two inputs from the execution units 714 and the output of the ZIB switch of cache unit 750.

Switch 704-176 is a four input switch which receives two of its inputs from the execution unit 714 and a single input from cache unit 750. The first position of the ZRDXA switch 704-176 selects the output of a ZRDXM switch 704-185. One position of this switch provides a tag field value from bit positions 5-8, 14-17, and 32-35 of the RBIR register 704-152 and bit positions 32-35 of the RSIR register 704-154 selected from ZIDD switch 704-180 and a two position ZMF switch 740-176.

The second position of switch 704-185 provides a constant value from the output of the ECS output register 704-1 (CCM field 32-34). The signals from the lines ZIDD 27-35 are applied as inputs to control flag flip-flops of block 704-110. The switch 704-178 receives an input from the control store 704-2, an input from cache unit 750, an input from execution unit 714, and a switch 704-171.

The data input register 704-164 receives a series of input signals from a ZIDD switch 704-180 which connects in series to a ZDIA switch 704-181 whose output provides one input of a further switch 704-182 which directly loads into the RDI register 704-164. The ZDIA switch 704-181 provides a further input to a three input switch 704-183 which receives the other inputs indicated from cache unit 750 and execution unit 714.

The ZIDD switch 704-180 receives an effective address via switch 704-186 from the address preparation unit 704-3 as well as inputs from the RBIR register 704-152, the RSIR register 704-154 and a two position ZMF switch 740-187. The positions 18 through 35 of the REA position of switch 704-180 are derived from the ZDIA switch 704-181 as shown. The ZDIA switch 704-181 receives signals from the ZDI Lines 0-35, a constant value generated from the inputs to a first switch position in addition to signals from the output of the ZIDD switch 704-80 and the ZRESB switch in execution unit 714. The switch 704-182 receives the output of the ZDIA switch and signals from the ZDI lines 0-35. The RRDXB register 704-189 is loaded by a three position switch 704-188. The switch receives via a first position signals from a RREG register included in the execution unit, a constant value from control store 701-2 via a second position and signals from the ZIDD switch via a third position.

The section 704-150 further includes a two position switch 704-185 and a scratchpad pointer register 704-186 whose output is used by the AACU 722 to form addresses for access to the scratchpad memory of the EU 714. The first switch position provides a constant value and is selected under hardware control (FPOA.R29). The second switch position applies as an output the contents of the RBASA register 704-156. This position is selected under both hardware and microprogram control (i.e., FPOA.R29 or MISCREG field).

It will be appreciated that the required timing signals for operating section 704 as well as other sections of processor 700 and cache unit 750 are provided by centrally located clock circuits. For example, in the preferred embodiment of FIG. 1, the clock circuits are located within the input/output processor 200. Such clock circuits can be considered as conventional in design and can comprise a crystal controlled oscillator and counter circuits. The timing or clocking signals from such clock circuits are distributed in a conventional manner to the various portions of the system of FIG. 1 for synchronized operation.

Address Preparation Unit 704-3

The address preparation unit 704-3 includes a number of registers and adders. The registers include a number of base registers (i.e., TBASE0 through TBASEB) of block 704-300 used for storing descriptor values of an instruction, a a pair of temporary effective address registers (TEA0, TEA1) and a pair of instruction counters (ICBA, ICBB) included within block 704-302 used for addressing the instruction buffer and eight address registers (RAR0 through RAR7) of 704-304 used during address preparation operations. The unit 704-3 also includes an instruction counter 704-310.

The adders include adder 704-312 used to update instruction counter 704-310 via switches 704-311 and 704-314 and a pair of adders 704-320 and 704-322. The adder 704-322 is used to generate an effective address value which is stored in a register 704-342 applied as an input of the control unit 704-1. The effective address is generated from a number of sources which include ZY switch 704-326 whose output is applied via a number of AND gates of block 704-327, selected address registers of block 704-304 or selected temporary address registers TEA0 and TEA1 of block 704-302 applied via another switch 704-328 or the index address signals ZX0-20 from unit 704-5. Additionally, adder 704-322 is used to update the contents of the instruction counter of the cache instruction buffer.

As seen from FIG. 3d, the outputs from adder 704-322 are also applied as an input to the adder 704-320. The adder 704-320 is used to combine base value stored in any one of the temporary base registers TBASE0 through TBASEB with the address signals ACS0S0-19 from adder 704-322. The resulting bits are applied as an input to a further adder network 704--320 which generates a logical address which is aplied to the lines ASFA0-36 via an adder 704-321. This adder sums the operand inputs together with the carry inputs from blocks 704-300 and 704-320. The effective address is used to obtain an absolute address when the system is operated in a paged mode. Since this operation is not pertinent to the present invention, it will not be discussed further herein. For further information regarding such address development, reference may be made to U.S. Pat. No. 3,976,978.

The temporary base registers of block 704-300 are loaded via a switch 704-332. The switch receives an input from the execution unit 714 and the output from block 704-300. The execution unit 714 applies further inputs to the registers of block 704-302 via a switch 704-334 as well as to the address registers of block 704-304. An output multiplexer (ZD0) switch 704-340 enables the selection of the various registers within the address preparation unit 704-3 and unit 704-5 for transfer of their contents to the execution unit 714 via lines ZDO 0-35. Also, the ZDO switch 704-340 enables the contents of various ones of the registers and control flip-flops of unit 704-1 to be read out via a fourth position (ZDO-A). The fifth position enables the states of various indicators within the control store circuits of block 701-1 to be selected for examination.

Figure 3F:
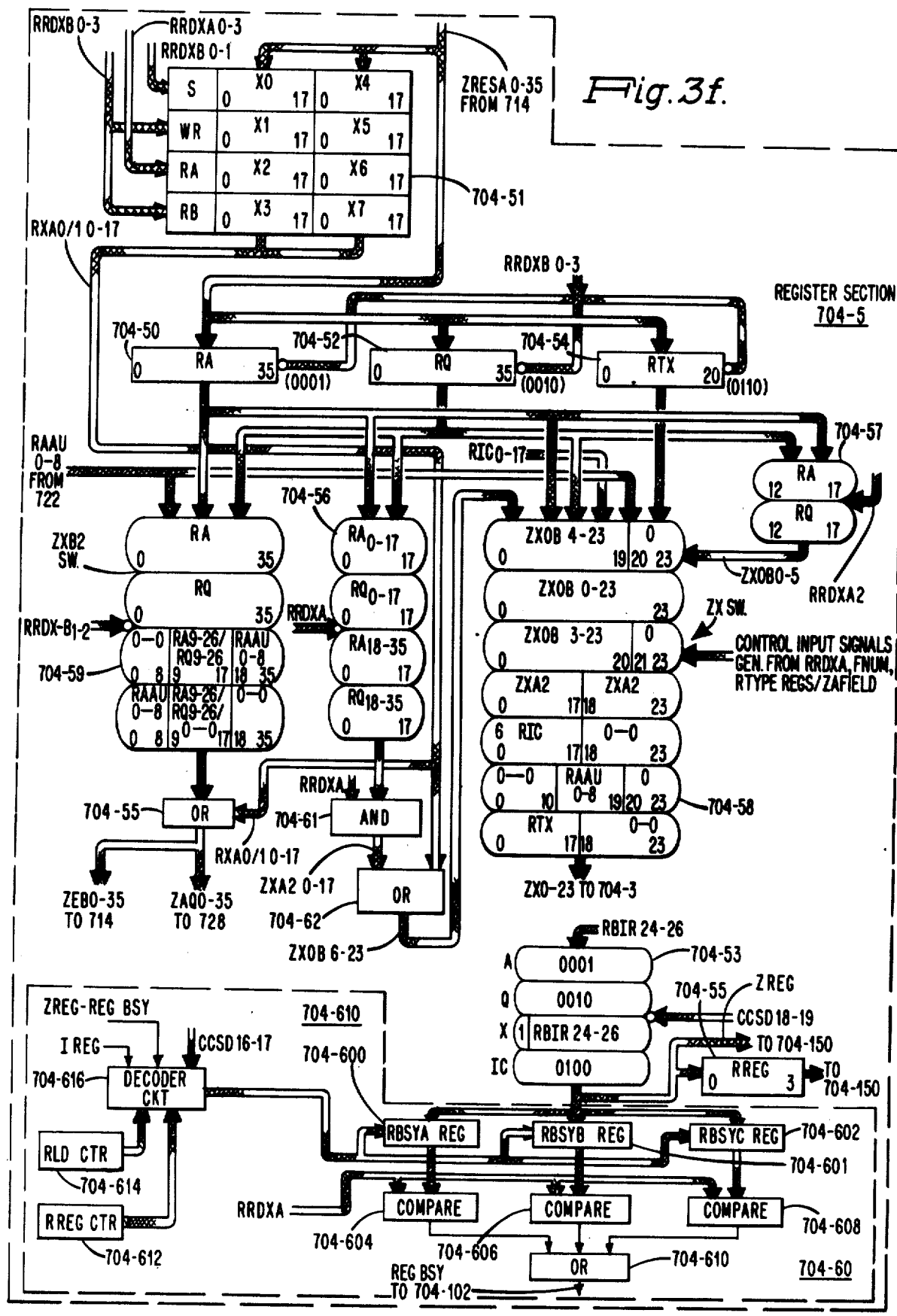

XAQ REgister Section 704-5 and Data Address Output Section 704-4 FIGS. 3e and 3f The section 704-5 includes the accumulator RA register 704-50, the quotient QA register 704-52 and the temporary index (RTX) register 704-54 utilized by the control logic unit 704-1. Additionally, it includes a group of eight index (X0-7) registers included within block 704-51. These registers are loaded via the ZRESA bus in execution unit 714. The selection of the register to be loaded is controlled by the contents of the RRDXB register 704-189. It will be noted from FIG. 3f that selection of outputs from the registers of block 704-51 is controlled by the contents of both the RRDXA and RRDXB registers 704-158 and 704-189 respectively. The contents of program visible registers RA, RQ, X0-7 and RTX are read out to the unit 704-3 via a ZXA2 switch 704-56, a ZXOB switch 704-57 and a ZX switch 704-58. From there, the register contents can be transferred to execution unit 714 or to cache unit 750 via the ZDO switch in unit 704-3.

As seen from FIG. 3f, the output of ZXA2 switch 704-56 is appplied via an AND gate 704-61 and an OR gate 704-62 in accordance with the contents of RRDA register 704-158.

The selection of outputs from the above mentioned switches are controlled by the contents of the RRDXA register 704-158, the FNUM flip-flop of block 704-104 and the RTYP register 704-160 in addition to bits 55-77 (ZX field). The ZXA2 switch 704-56 provides for the read out of the upper or lower 18 bits of RA and RQ registers 704-50 and 704-52 for address modification. The selected output signals from the ZXA2 switch and the ZXOB switch are applied to the ZX switch together with the RAAU, RTX and RIC register signals as shown.

The ZX switch selects as an output, bits of the RA/RQ/X registers for a 9-bit character string via a first positin, X/RA/RQ bits for a 6-bit character string via a second position, RA/RQ/X bits for a 4-bit character string via a third position and X/RA/RQ bits for word type modification.

Positions five, six and seven are used for selecting the contents of the RAAU register, RIC register and RTX register respectively. A further ZXB2 switch 704-59 provides a second path to the unit 714 for read out of the program visible registers via the lines ZEB0-35, A similar path to the unit 728 is provided via the lines ZAQ0-35.

The second 704-4 includes the registers and switches used for transferring commands and data to the cache 750. Such transfer operations normally require at least two cycles, one for sending an address and another for sending the data. Bits 5-8 of a command word are derived from the output of a four position switch 704-40. This switch receives a first constant value via a first position, the contents of a RZN register 704-42 via a second position, a second constant value via a third position and a third constant value via a fourth position.

Bits 1-4 of a command are applied by the circuits of block 704-1 to an OR gate circuit 704-44 together with biys 5-8. The OR gate 704-44 also receives via a ZADO switch 704-46 bits 1-8 of an RADO register 704-48. The RADO register 704-48 is an address and data out register which receives via a first position of a ZADOB switch 704-48 a logical (virtual) address from address preparation unit 704-3 via the lines ASFA0-35 and data output signals from the EU 714 via lines ZRESB0-35. The positions of the ZADOB switch 704-48 is under the control of the FMTD field for small CU format and the RADO field in the case of large CU format.

As seen from the Figure, either the ZZN1-8 bits or the ZADO bits 1-8 are applied as outpts to the RADO/ZADO lines as a function of the state of control signal [RADO-ZADO]. Bits 0 and 9 are always binary ONES while bits 10-35 are furnished by the RADO register 704-46.

Additionally, the unit 704-5 of the preferred embodiment includes a four position selector ZREG switch 704-53 which is controlled by the coding of the CCSR field. The output of the ZREG switch is used to load the RREG register 714-42 with constant values or with signals corresponding to bit positions 24-26 of the RBIR register 704-152. On a next cycle, signals corresponding to the contents of RREG register 714-52 are transferred to the RRDXB register 704-189. In the case of instructions which reference CCD codes specifying instructions within the STR-SGL or STR-DBL classes, the same signals are transferred to the RRDXA register 704-158. Further, the contents of RREG register 714-42 may be loaded into RBASA register 704-156 under microprogram control.

In greater detail, in accordance with the arrangement of the present invention, the values selected as outputs from the ZREG switch 704-53 established by the coding of the CCSR field are also applied as inputs to the group of register busy circuits of block 704-60. These circuits keep track of the register updates on program visible registers A, Q, Xn and IC from the first cycle of the pipeline wherein the instruction enters the pipeline to the last cycle of the pipeline wherein the instruction is executed under microprogram control.

As seen from FIG. 3f, the register busy circuits include three 4-bit registers 704-600 through 704-602, each of whose outputs are compared with the contents of the RRDXA register 704-158 by compare circuits 704-604 through 704-608. The outputs of the compare circuits are combined in an OR circuit 704-610 to produce an output signal REGBSY. This signal is applied as an input to the I cycle circuits of block 704-102. When the contents of the RRDXA register 704-158 equal the contents of any one of the registers RBSYA, RBSYB or RBSYC, one of the compare circuits 704-604, 704-606 or 704-608 conditions OR gate to force signal REGBSY to a binary ONE. This signals the occurrence of the register busy condition and during control states FPOA or FPOP causes the processor 700 to hold up execution of the I cycle until the register busy condition goes away.

The RBSY registers 704-600, 704-601 and 704-602 are loaded in a cyclic fashion and reset to binary ZEROS following the loading of the program visible register(s) which completes execution of the particular instruction. In greater detail, the control circuits of block 701-610 control the selection of RBSY registers to be strobed and reset in accordance with the ZREG-REGBSY and [REG signals. The ZREG-REGBSY signal is generated under hardware control during control state FPOA while the signal [REG is generated under microprogram control. As seen from FIG. 3f, the control circuits of block 704-610 include register load (RLD) counter 704-614 and a register reset (RRES) counter 704-612. Both counters are incremented by a common clock circuit, not shown.

The count outputs of the RLD and RRES counters 704-612 and 704-614 are applied as inputs to a decoder circuit 701-616 together with the signals ZREG-REGBSY and [REG. Additionally, the circuit 701-616 receives signals CCSD16-17 corresponding to the high order or upper two bits of the CCSR field.

As explained herein, the RLD counter 704-614 is incremented by one so that once one busy register is loaded with a value (e.g. RBUSY A register) in response to an instruction, the next available busy register (e.g. RBUSY B register) is selected for loading. When a program visible register is loaded in response to an instruction indicated by signal [REG, one of the RBSY registers is reset to binary ZEROS as a function of the count within the RRES counter 704-612. The RRES counter is incremented by one in response to signal [REG when the count stored both in the RLD and RRES counters 704-614 and 704-612 are not equal (i.e., RLD ≠ RRES).

It is seen from FIG. 3f that the lower two bits of the CCSR field (18-19) select the code to be applied at the output of the ZREG switch 704-53. The first positin of the switch provides a constant value "0001" which specifies selection of the A register. The second position of the switch provides a constant value of "0010" which specifies selection of the Q register. The third position provides the selection of a binary ONE and bits 24-26 of the RBIR register 704-152 which specifies selection of one of eight index registers Xn. The fourth position provides a constant value of "0100" which specifies selection of the instruction counter.

The upper two bits of the CCSR field establish whether one or two registers are to be set, load single or load double operations. The register coded value from the ZREG switch is loaded into the RBSYA, RBSYB and RBSYC registers as a function of the value of the CCS field and the count value RLD. The type of register load operations specified by the coding of the CCSR field are as follows:

| CCSR CODE | OPERATIONS |
|---|---|
| 0000 | 0001→ZREG 0→FDBL; (A REG); ZREG→RBSYA, B, C as function of count RLD; RLD + 1→RLD. |
| 0001 | 0010→ZREG 0→FDBL; QREG; ZREG→RSBYA, B, C as function of RLD; RLD + 1→RLD. |
| 0010 | 1, RBIR24-26→ZREG; 0→FDBL; INDEX REG ZREG→RBSYA, B, C as function of RLD; RLD + 1→RLD. |
| 0011 | 0100→ZREG; 0→FDBL; IC; ZREG→RBSYA, B, C as function of RLD; RLD + 1→RLD. |
| 1000 | 0001→ZREG 1→FDBL; AQREGS. ZREG→RBSYA, B, C as function of RLD; RLD + 1→RLD. |
| 1001 | 0010→ZREG; 1→FDBL; QAREGS; ZREG→RBSYA, B, C as function of RLD; RLD + 1→RLD. |
| 0100 | No change to RBSY; 0001→ZREG registers. |
| 0101 | No change to RBSY; 0010→ZREG registers. |
| 0110 | No change to RBSY; 1, RBIR24-26→ZREG registers. |
| 0111 | No change to RBSY; 0100→ZREG registers. |

In those cases where FDBL=1 indicative of a double register transfer, then the following operations are carried out.
When $\overline{CCSR3}$=1 then 0010→ZREG;
When CCSR3=1 then 0001→ZREG;
0→FDBL; RLD + 1→RLD
ZREG→RBSYA, B, C as function of RLD.

Figure 3G:
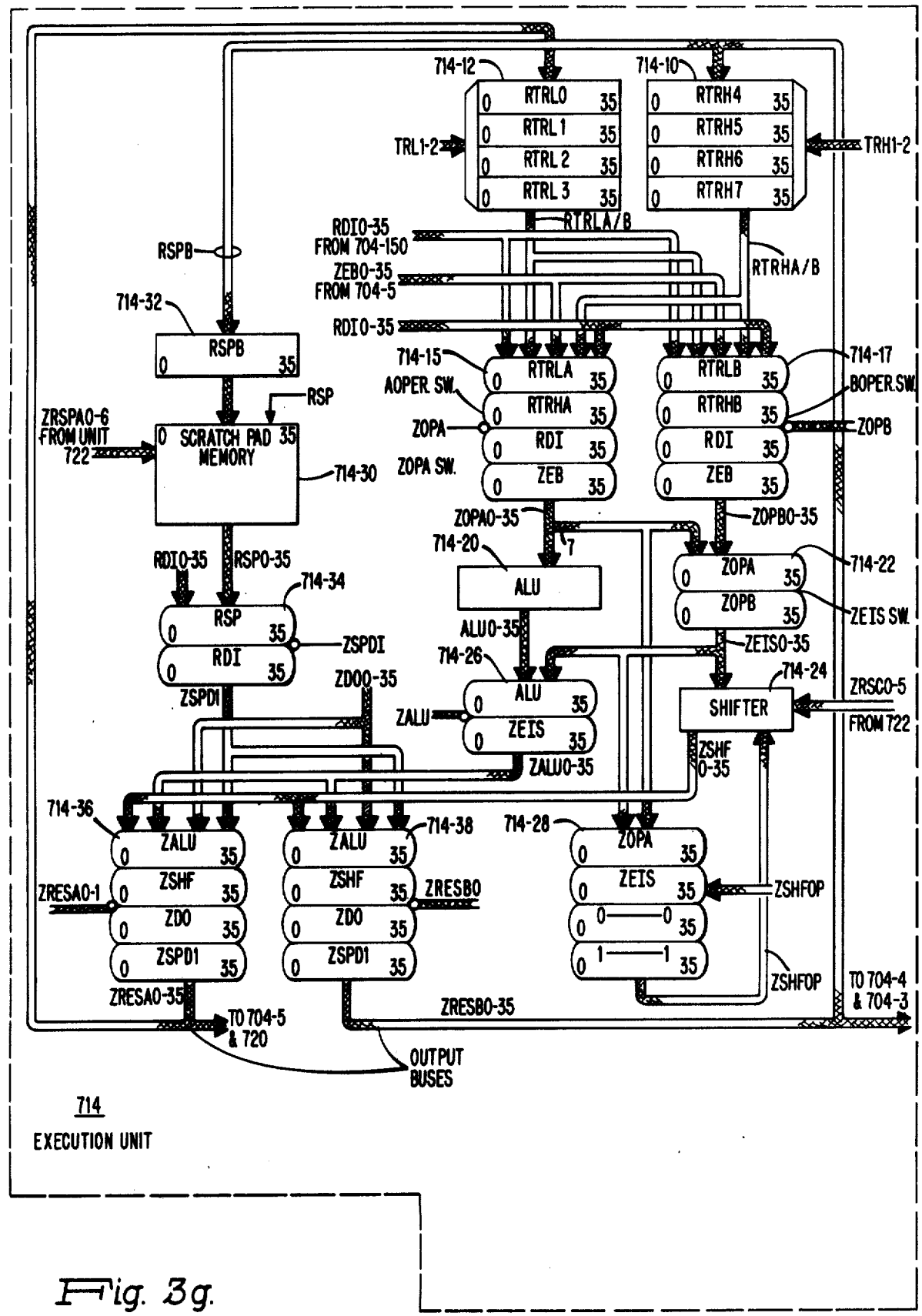

Execution Unit 714 - FIG. 3g

The unit 714 includes as major units, addressable temporary register banks 714-10 and 714-12, an arithmetic logic unit (ALU) 714-20, a shifter 714-24 and a scratchpad memory 714-30. Additionally, the unit 714 includes a number of multiposition data selector switches 714-15, 714-17, 714-22, 714-26, 714-28, 714-34, 714-36 and 714-38 to provide flexibility in selecting operands and output results.

In operation, the operands are selected via the ZOPA switch 714-15 and ZOPB switch 714-17 from one of the registers of the banks 714-12 and 714-10 or from other input lines such as ZEB0-35 or RDI0-35 as shown. The ALU 714-20 and shifter 714-24 performs operations upon the selected operands and the results are selected via the switches 714-24, 714-36 and 714-38 to be applied to the output bus lines ZRESA 0-35 and ZRESBO-35. Similarly, the contents of a scratchpad location selected via the contents of a scratchpad pad buffer 714-32 can be read out via the switches 714-34, 714-36 and 714-38.

The selected output results or other data are thereafter loaded into other registers within processor 700 including the temporary register banks 714-32 and 714-10 or the scratchpad memory 714-30 of execution unit 714.

In greater detail, the sources of operands are identical for both the ZOPA and ZOPB switches 714-15 and 714-17. The selection of switch position for the ZOPA switch and ZOPB switch is under the control of bits 9-12 and bits 13-16 of the microinstruction word. The ALU 714-20 performs logical, decimal or binary operations upon the selected operand data under the control of bits 24-28 of the microinstruction word of FIG. 6a.

The shifter 714-24 is a combinatorial logic network used to align, shift or rotate binary data under microprogram control. The input data signals from the ZXHFOP and ZEIS switches 714-28 and 714-22 can be viewed as being concatenated to form a single double word input. The shifter 714-24 provides a 36-bit output shifted in accordance with the shift count. The ZSHFOP switch 714-28 is controlled by bits 24-25 of the microinstruction word while the shift count is established by the sequence control constant fields (bits 138-143 of the microinstruction word of FIG. 6a which is appropriately selected via the auxiliary arithmetic control unit 722. For the purposes of the present invention, the ALU 714-20 and 714-24 may be considered conventional in design.

The scratchpad memory 714-30 provides a working space for storing various data required for the execution of certain instructions as well as various constants and descriptor values. For example, octal locations 10-15 are used to store an edit instruction table value required for carrying out edit operations. Writing into the scratchpad memory 714-30 involves first loading the RSPB bufter register 714-32 with input data applied via the ZRESB switch 714-38. During a next cycle, the contents of the register 714-32 are written into the location specified by the signals applied to the ZPSPA 0-6 lines by the AACU unit 722. Writing takes place when bit 22 of the microinstruction word (RSP field) is forced to a binary ONE.

As concerns the other switches, as mentioned, the results produced by the unit 714 are provided via the ZALU switch 714-26, the BSPDI switch 714-34, the ZRESA switch 714-36 and the ZRESB switch under microprogram control. The ZALU and SSPDI switches provide a first level of selection to the ZRESA annd ZRESB switches which provide a last level of selection. Since both the ZRESA and ZRESB switches have identical input sources, they can provide the same output data. The selection of ZALU switch data is under control of bits 30-31 (ZALU field) while the selection of ZSPDI data is under control of bit 23 (ZSPDI field). The selection of ZRESA and ZRESB data is under the control of bits 17-18 and bits 19-20 respectively of the microinstruction word of FIG. 6a.

The registers of banks 714-12 and 714-10 are addressed independently by bits 3-5 (TRL field) and bits 6-8 (TRH field) respectively. The first bit in each field specifies whether one of the four registers is to be addressed while theother 2 bits select the register to be addressed.

Figure 3H:
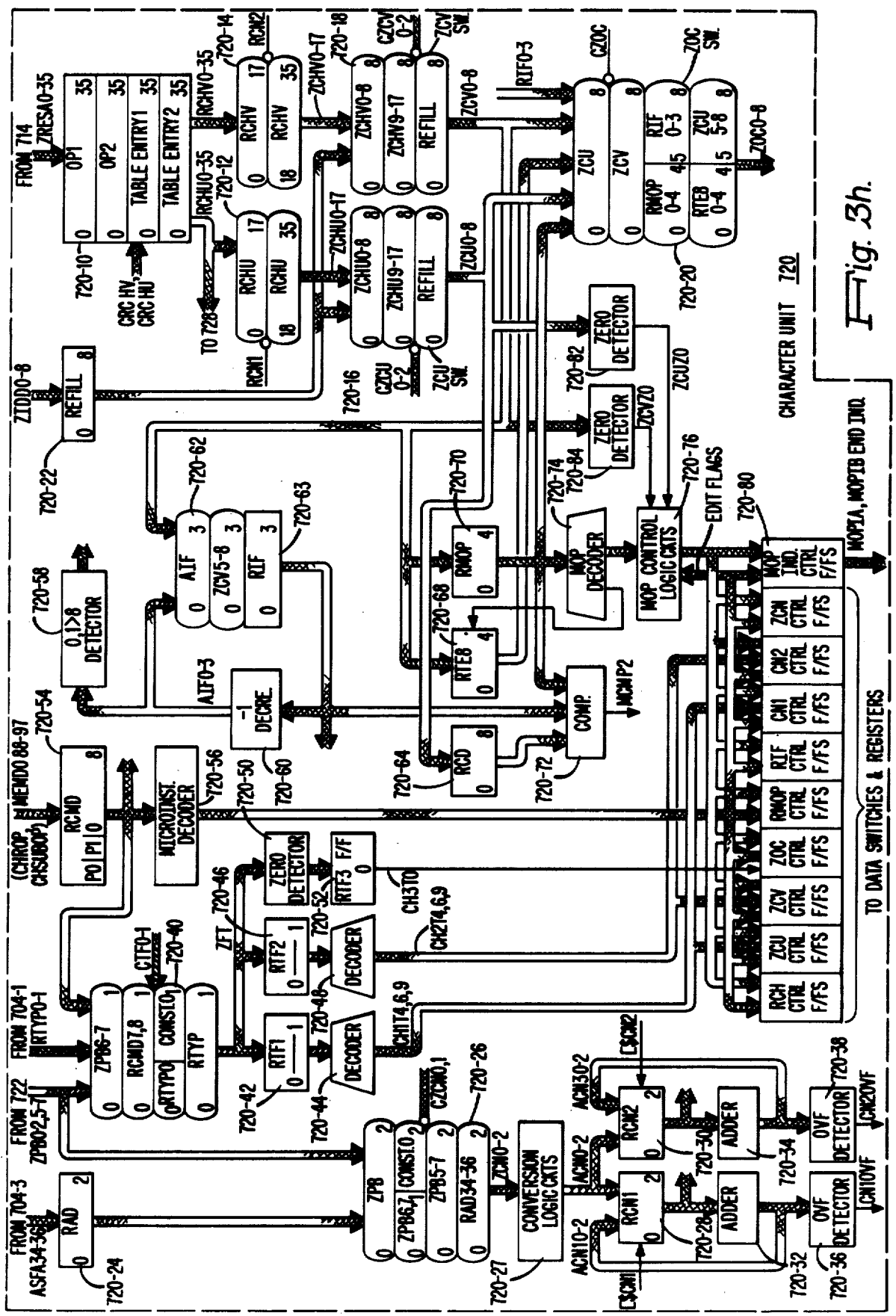

Character Unit 720- FIG. 3h

It is seen that the unit 720 includes a bank of 4 registers 720-10, a number of registers 720-22, 720-24, 720-28, 720-30, 720-42, 720-46, 720-54, 720-63, 720-64, 720-68 and 720-70, conversion logic circuits 720-27, adder networks 720-32 and 720-34, comparator network 720-72 and a number of decoder/detector networks 720-36, 720,38, 720-44, 720-48, 720-50, 720-56, 720-58 annd 720-74 interconnected via a number of multiposition selector switches 720-26, 720-40, 720-62, 720-12 through 720-20. The control and selection of such switches and the strobing of the various registers is under the control of a number of flip-flop circuits included in block 720-80 and a pair of zero detector circuits 720-82 and 720-84.

The RCH bank of registers 720-10 are used as operand buffer registers for storing information received from the EU 714 via the ZRESA lines 0-35. A first register (OP1) is used to store the operand specified by descriptor 1 or data sent to unit 728 or unit 722. A second register (OP2) is used to store the operand specified by descriptor 2. Third and fourth registers (TABLE ENTRY 1, TABLE ENTRY 2) are used to store edit insertion table entry values obtained from EU 714.

The RCN1 register 720-28 holds the actual character position data for descriptor 1 which is used to select a character to be selected by ZCU switch 720-12. The RCN2 register 720-30 holds signals designating the character position data of descriptor 2. The contents are used to select a character from switch 720-14.

The ZCU and ZCV switches 720-16 annd 720-18 are under the control of the ZCU and ZCV flip-flops of block 720-80. The RCN 1 and RCN 2 registers 720-28 are loaded under the control of the CN1 and CN2 flip-flops of block 720-80 in response to signals generated by decoder 720-56. This is done as a function of the character type (4, 6 or 9-bit characters) defined by the contents of the RTF1 and RTF2 registers 720-42 and 720-46 and the starting character position signals generated by the conversion logic circuits of block 720-27. The circuits of block 720-27 convert signals ZCN0-2 applied via switch 720-26 corresponding to an input character position value into an output character position. For 9-bit characters, there is no conversion necessary (i.e., input character postion = output character position).

The two bit RTF1 register 720-42 holds the character type information relative to descriptor 1 while the two bit RTF2 register 720-46 holds the character type information for descriptor 2. The one bit RTF3 register 720-52 holds the character type information for descriptor 3. When descriptor 3 consists of 9-bit characters, the detector 720-50 sets the RTF3 register to a binary ONE. In all other cases, the RTF3 register is set to a binary ZERO. As seen from the Figure, these registers are loaded via switch 720-40.

The five bit RMOP register 720-70 stores the "microoperation" values required for processing an edit instruction while the 4-bit RIF register 720-63 stores the information field (IF) values for such instructions. The 9-bit RCD register 720-64 is used during certain compare instruction operations for storing a first operand value. The 5-bit RTE8 register 720-68 stores the 5 most significant bits of the eighth edit insertion table entry value in response to a load signal generated by decoder 720-74 in response to a load command. The REFILL register 720-22 is used to store signals received from the unit 704-150 via the lines ZIDD 0-8. The RAD register 720-24 stores character position bits received from the unit 704-3 via the lines ASFA34-36.

The indicator flip-flops of block 720-80 store the result of an operationn specified by the contents of the RMOP register 720-70. The indicators include a 2-bit MOP indicator A (MOPIA), a 3-bit MOP indicator B MOPIB) and a 1-bit END indicator. The MOPIA indicators are decoded as follows:
00 go to MOP execute operation
01 go to LOAD MOP operation
10 Test MOPIB
11 N/A.

The MOPIB indicators provide additional status when the MOPIA indicators have the value "10". They are decoded as follows:

000: test the state of a length 1 indicator for underflow (L1UDF set when the output of the AXP adder equals 0 means L1 exhausted) and the state of the CN1 overflow indicator (CN1OVF).

001 test the state of a length 3 indicator for underflow (L3UDF set when the output of the AL adder equals 0, means L3 exhausted) and the state of a CN3 overflow indicator (CNLOVF) which is set when the output of the AP adder equals 0.

010: test the states of the L1UDF, CN1OVF, L3UDF and CN3OVF indicators.

011: decrement by 1, the length 2 value and test the states of the L3UDF and CN3OVF indicators during a first cycle and test the states of a length 2 underflow indicator (L2UDF) and the CN2OVF indicator during a second cycle.

100: test the states of the L3UDF, CN3OVF, L1UDF and CN1OVF indicators during a first cycle. Transfer the contents of the RAAU register to EU 714, decrement the length 3 value by 1 and increment the CN3 value by one during a second cycle. During a third cycle, test the states of the L3UDF and CN3OVF indicators.

101: load the table entry value.
110: change the table values.
111: N/A.

The END indicator is set to indicate that the operation specified by the MOP value is complete.

The Auxiliary Arithmetic and Control Unit (AACU) 722 - FIG. 3i

The AACU 722 includes 3 parallel adder networks 722-2, 722-6 and 722-8 designated herein as a pointer adder network, an exponent adder network and a length adder network respectively. The pointer network 722-2 includes two blanks of 4 registers (RP0-RP3 and RP4-RP7) 722-20 and 722-22. Each bank has its own multipolsition switch (722-23 and 722-24) for selecting the data to be written therein and a pair of four position output switches for selecting the data to be read therefrom (i.e., switches 722-27, 722-28 and 722-29, 722-30). Additionally, bank 722-20 has a second input switch 722-32 whose output feeds the ZRPA switch 722-23 and provides for the selection of additional input data.

The ZRPC switch 722-32, the ZRPA switch 722-23 and the register bank 722-20 are jointly controlled by either bits 64-68 (ZRPAC field), bits 69-71 (ZRPAC-3 field) or bit 67 (ZRPAC-4 field) depending upon the microinstruction format. The ZRPA switch 722-23 can select one of the outputs from the ZRPC switch 722-32 via a first position, a value for loading a character offset for address modification/loading address register instructions for the character unit 720 via a second position and a character pointer value for a 9-bit character via a third position.

The ZPA switch 722-27 and the ZPB switch 722-28 select data from the RP0-RP3 register bank 722-20 under the control of bits 59-60 (ZPA) and bits 61-62 (ZPB) respectively. The ZRPB switch 722-24 and register bank 722-22 are jointly controlled by a single control field depending upon the type of microinstruction format bits 74-78 (ZRPB-0), bits 69-73 (ZRPB), bits 72-74 (ZRPB-3) or bit 68 (ZRBP-4). The ZRPB switch 722-4 can select the output of adder output switch 722-36 via a first position, an information field from the character unit 720 via a second position, a word or character pointer value for a 9-bit character via a third position and a character pointer value for a 9-bit character via a fourth and a fifth position.

The ZPC switch 722-29 and the ZPD switch 722-30 select data from the RP4-RP7 register bank 722-23 under the control of bits 57-58 (ZPC field) and bits 67-68 (ZPD field) respectively. As seen from FIG. 3, the outputs from the switches 722-27 through 722-30 are applied to the A and B operand switches 722-25 and 722-26. The outputs of these switches are applied to a pointer adder 722-34.

The ZAPA switch 722-25, the ZAPB switch 722-26 and the adder 722-34 are jointly controlled by a single control field bits 79-84 (AP field) or bits 82-83 (AP-3 field) depending upon the microinstruction format. As seen from the Figure, the ZAPA and ZAPB switches 722-25 and 722-26 select the outputs from the ZPA, ZPC, ZPB or ZPD switches or a constant value for application to adder 722-34.

The ZLX switch 722-36, a ZXC switch 722-38, a RSC register 722-40 and a ZRSC switch 722-42 operated under micro-program control are arranged to provide shift counts to the execution unit shifter. The ZSC switch 722-38 can also be used for loading data into the RP0-RP3 register bank 722-20 via the ZRPC and ZRPA switches 722-32 and 722-23 or into the RP4-RP7 register blank 722-23 via the ZRPB switch 722-24.

The selection of ZLX switch postions is controlled by bits 48-49 (XLX field). The ZSC switch 722-38 is used to select one of the outputs of the ZLX switch 722-38 under the control of bits 50-52 (ZSC field). The RSC register 722-40 is loaded with the right most 6 bits from the output of the ZLX switch 722-38 under the control of bit 47 (RSC field). The two position ZRSC switch 722-42 selects which of two sources is to supply a shift count to the execution unit 714. Bit 84 (ZRSC field) selects either bits 138-143 (CNSTU/L field) or the RSC register 722-40 as a shift count source.

The last group of circuits shown in block 722-2 include a ZAAU switch 722-44 and the RAAu register 722-46 connected to receive the output of switch 722-44. The ZAAU switch 722-44 is used for transferring data to the register 722-46. From there the data is transferred via the section 704-5 to the execution unit 714 on the ZEB lines 0-35.

The inputs of the ZAAU switch 722-44 are selected by bits 50-52 (ZAAU field). The first position applies a 9-bit character output from the character unit 720 via the lines ZOC 0-8. The second and third positions are used for displaying the outputs from the length adder and exponent adders of blocks 722-6 and 722-8. The RAAU register 7-2-46 is loaded from the ZAAU switch 722-44 in response to bit 47 (RAAU field).

As seen from FIG. 3i, the exponent adder network 722-6 includes a single bank of 4 registers (RXPA-RXPD). The bank 722-60 has a multiposition switch 722-62 for selecting the data to be written therein and a pair of four position output switches for selecting data to be read therefrom (i.e., switches 722-64 and 722-66). The ZXP switch 722-62 and the RXPA-RXPD register bank 722-60 are controlled by bits 59-62 (ZXP field), bits 65-66 ZXP-1 field or bits 75-77 (ZXP-3 field).

A first position of the ZXP switch 722-62 is used to load the exponent result into register bank 722-60. The second position is used to store the result from the length adder 722-8. The next or third position is used for storing exponent values received from the character unit 720. Lastly, the fourth position is used for storing numeric scale factor information received from the RSIR lines 24-35.

The ZXPL switch 722-64 and ZXPR switch 722-66 select data from the register bank 722-60 under the control of bits 63-64 (ZXPL field) or bit 64 (ZXPL-1 field) and bits 65-66 (ZXPR field) respectively. The outputs from the switches 722-64 and 722-66 are applied as inputs to an A operand switch 722-68 and B operand switch 722-70 respectively. These switches apply selected inputs to a pair of 12-bit adders (AXP and AXM) of block 722-72 which generate an exponent output value applied to an output ZAXP switch 722-74. A single control field AXP (bits 69-73) controls the operation of the ZXPA switch 722-68, ZXPB switch 722-70, the adders, the ZAXP switch -22-74 and the loading of a RE register 722-76.

One adder AXM is arranged to receive the contents of the RE register 722-76 for providing absolute value when the sign of value generated by the AXP adder is negative (i.e., the AXP sign indicator not shown has control over the ZAXP switch selection).

The ZXPA switch 722-68 can select via a first position the contents of the RE register 722-76 or the output from the ZXPL switch 722-64 via a second position. The ZXPB switch 722-70 can select via a first position, a constant value, via a second position binary floating point exponent signals applied to the RDI lines 0-7, via a third position a numeric scale factor value applied to the RSIR lines 24-35, a fourth position the output from the ZXPR switch 722-66 and via a fifth position the output from the ZLNA switch 722-84.

The third adder network 722-8 for managing operand length data, similar to network 722-6, includes a single bank of 4 registers (RLN1-RLN4). The bank 722-80 has a multiposition switch 722-82 for selecting the data to be written therein and a pair of four position output switches for selecting data to be read therefrom (i.e., switches 722-84 and 722-86). The ZLN switch 722-82 and the RLN1-RLN4 register bank 722-80 are controlled by bits 59-63 (ZLN-1 field), bit 63 (ZLN-2 field) bits 79-81 (ZLN-3 field) or bits 79-83 (ZLN-4 field) depending upon microinstruction format.

The ZLN switch 722-82 applies the output of the length adder as an output via a first position, the output of the ZAXP switch 722-74 via a second position and a length field value from RSER lines 24-35 via a third position. Additionally, it applies a numeric length field value from RSIR lines 30-35 via a fourth position, a shift count value from RDI lines 11-17 via a fifth position and a length value from RCH lines 24-35 via a sixth position as inputs to register bank 722-80.

The ZLNA and ZLNB switches 722-84 and 722-86 select data from the register bank 722-80 under the control of bits 53-54 (ZLNA field) and 55-56 (ZLNB field) respectively as inputs to an A operand switch 722-88 and a B operand switch 722-90 respectively.

The outputs of these switches are applied as inputs to a 12-bit length (AL) adder 722-92. The ZALA switch 722-88, the ZALB switch 722-90 and AL adder 722-92 are all controlled by bits 74-78 (AL field). The ZALA switch 722-88 selects as an operand the output of the ZLNA switch via a first position, a constant field via a second position, the output of the ZPC switch via a third position and a numeric length field via a fourth position.

The ZALB switch 722-90 can select as an operand, a constant field via a first position, the output of the ZLNB switch 722-86 via a second position, the output of the ZXPL switch via a third position, a shift count value from RDI lines 11-17 via a fourth position, the output of the ZPC switch via a fifth position, the output of the ZPA switch via a sixth position and bit positions 6 and 7 of the ZPC switch 722-29 via a seventh position.

The unit 722 includes another group of circuits for furnishing a scratchpad address to unit 714. The circuits include a ZSPA switch 722-100, a RSPA register 722-102 and a ZRSPA switch 722-104, each controlled by bits 48-49 (ZSPA field), bit 47 (RSPA field) and bits 50-52 (ZRSPA field) respectively. The ZSPA switch 722-100 can select as an output, bits 91-97 corresponding to a scratchpad address field via a first position and the output of pointer adder 722-34 via a second position.

The ZRSPA switch 722-104 can select as an output, the contents of register 722-102 via a first position, a scratchpad address field via a second position and a descriptor value applied from the RSIR lines 32-35 via a third position and a value from the RSPR register of unit 704-150 via a fourth position. Additionally, the unit 722 includes a pair of registers 722-106 and 711-108 which are loaded with signals corresponding to bit positions 21-23 of RSIR register 704-154. One register is loaded when bit 53 of the microinstruction word of FIG. 6b or the FPOP flip-flop is a binary ONE. The registers are selected for loading in accordance with the states of the RDESC register 704-140 (00 or 10 = R1DW; 011 = R2DW).

The various control field signals used by the AACU 722 are derived from a decoder 722-110 which receives as inputs, the various microinstruction word bits loaded into a register 722-112.

CACHE UNIT 750 - FIG. 4

General Description

The cache unit 750 is divided into five primary sections: a command buffer section 750-1, a control section 750-3, a cache directory section 750-5, a cache storage section 750-7 and an instruction buffer section 750-9.

Command Buffer Section 750-1

The command buffer section 750-1 includes a four word write command buffer 750-100 and a four word read command buffer 750-102 which are addressed via the counters 750-104 and 750-106. The write ZAC buffer 750-100 provides storage for a single ZAC write command while the read ZAC buffer 750-102 provides storage for up to four read ZAC commands.

The processor 700 transfers commands via the RADO/ZADO lines of interface 605 through the first position of a selector switch 750-110. The processor 700 transfers cache command information via the DMEM and DSZ lines through the first position of a selector switch 750-112. The states of these lines are held or stored in a register 750-114. As seen from the Figure, this information is also written into the buffers 750-100 and 750-102.

In addition to the cache command signals, the processor 700 sets a DREQCAC line. The processor 700 sets other control lines (e.g. HOLD-C-CU, CANCEL-C, CACFLUSH, BYPASS-CAC, READ IBUF, READ EVEN) when it wants to have the cache unit 750 perform other types of operations.

The states of the other control lines are decoded by a decoder 750-116 whose output is used to enable the ZAC buffers 750-100 and 750-102. Additionally, the processor 700 transfers zone bit signals for certain types of write commands via the lines DZD0-3. These signals are loaded into a RDZD register 750-132 via a switch 750-134. From there, the contents are applied via a switch 750-136 to a set of byte CBYSEL lines. Additionally, the signals on the DZO lines are applied to the MITS lines via a switch 750-139. Other zone signals (bits 5-8) are loaded into an RC address register 750-140 and thereafter applied to another set of byte CBYSEL select lines via a switch 750-142.

A plurality of busy bit registers 750-120 and 750-122 are used to determine which of the locations in the RZAC buffer 750-102 are available. The states of these registers are decoded via a priority decoder network 750-130 which selects the first available buffer location. The value developed is stored in the register 750-106 and is used as a write address for the read ZAC buffer 750-102. When the cache request involves doing a backing store (MEM memory) fetch (cache miss signaled by the state of signal BSPD), the appropriate busy bit or both busy bits are set in accordance with the number of SIU responses (ARDA signals) which will be generated. The busy bits are set by signals applied to a pair of lines SETBOTHBSY and SETONEBSY from a decoder, not shown, which decodes the particular command resulting in the application of a signal to one of the BSY lines. For example, a read single command (not bypassed) causes two SIU ARDA responses, each response for bringing in a pair of words. Thus, both busy bits are set. In the case of a read single bypass command, there is only one SIU ARDA response. Hence, only one busy bit is set. Resetting of the busy bits takes place in response to the ARDA line via a RSPB register 750-124 which receives signals from the SIU 100 via the RMIFS lines.

In greater detail, the contents of registers 750-120 and 750-122 are set in accordance with the number of ARDA responses as mentioned when a $\overline{\text{PENBIT}}$ signal is a binary ONE (i.e., the pending bit corresponding to the block is not set). The decoder circuit 750-130 decodes the states of the busy bits and sets counter register 750-106 to the appropriate address value specifying the next empty location within read RZAC buffer 750-102.

The same address signals PRACW0-1 are also applied to a second position of the switch 750-139 in the case of read commands. From there, the signals are loaded into a 4-bit MITS register 750-138 and applied to the MITS lines. The main memory 800 operates to return the coded signals to cache unit 750 via the MIFS lines upon transferring the requested pairs of data words of a block. Thereafter, the signals are loaded into a 4-bit RMIFS register 750-125 and then into the RSPB register 750-124 when the control state signal THCFD is a binary ONE. The received value causes the resetting of the appropriate busy bit indications stored in registers 750-120 and 750-122.

It will be noted that the RMIFS bit signals 2 and 3 are used to address read RZAC buffer 750-102 for read out of the appropriate command. Additionally, as explained herein, signals from an out pointer circuit (COUT), not shown, are used to access commands stored in read ZAC buffer 750-102. The busy bit indications stored in registers 750-124 and 750-126 are applied as inputs to the exclusive OR circuits of block 750-132. These circuits are operative to generate output signals indicative of the number of busy bits set. These outputs are in turn applied to different positions of a 4 position selector switch 750-133. By selecting the appropriate position or location, in response to the RMIFS bit signals 2 and 3, the switch 750-133 provides output signal SECRCV whose state determines when the cache unit 750 has received the second pair of words of a block. The SECRCV signal is applied as an input to block 750-3.

The outputs of the write ZAC buffer 750-100 and read ZAC buffer 750-102 are applied to different ones of a group of two position switches 750-150, 750-152, 750-154, 750-156 and 750-158. The output of ZAC buffer switch 750-150 is loaded into a SIU output register 750-174 via the switches 750-170 and 750-172. The output from the ZAC switch 750-152 is loaded into a pair of data register 750-180 via the switches 750-177 and 750-178.

The outputs of switches 750-154 and 750-158 are applied to a further switch 750-160 and stored in a holding register 750-162. The output of switch 750-156 is applied to a decoder 750-166 together with the DMEM outputs of switch 750-160. The other outputs from this switch are applied to a decoder 750-168. Additionally, the output of the switch 750-158 is applied to a decoder 750-164.

The decoder 750-166 decodes the cache commands received from processor 700 via the DMEM0-3 lines and those read out from the buffers 750-100 and 750-102 and generates signals for transferring commands to the cache storage 750-7 and directory 750-5. That is, the cache decoder 750-166 is used to control what information will be written into the cache storage 750-7 from the processor 700. The decoder 750-168 decodes the states of the BYPCAC and DSZ1 signals. It will be noted that the source of these last mentioned signals corresponds to processor 700 or switch 750-154.

The decoder 750-164 decodes the commands read out from the buffers 750-100 and 750-102 and generates signals for transferring commands to MEM memory (backing store) via the SIU 100. That is, the S decoder 750-164 is used to control the sending of information from the command buffers 750-100 and 750-102 to the SIU.

Additionally, the ZPSW switch 750-178 via a first position selects the ZAC command from the processor 700 on the RADO/ZADO lines for transfer to the SIU 100 on the DTS lines via the switch 750-172 or writes the main memory data into cache storage 750-7 via the RDO, RDI data registers 750-180. The second position of the ZPSW switch 750-178 applies the data output of the ZALT switch 750-177 to the DTS lines (ZAC data) or writes the main memory data from the DFS lines into cache storage 750-7 via the RDO, RDI registers 750-180 or transfers the ZAC commends to the processor 700 via the ZDI lines.

The ZACSW2 switch 750-170 is used to transfer a ZAC command (first position) or data from the ZAC buffer to the SIU 100 via the DTS lines (second position).

Control Section 750-3

This section includes a number of control state flip-flops which generate signals for sequencing the cache unit 750 through the required cycles of operation for processing the various commands. Additionally, the section includes the necessary logic circuits for generating the required control signals during the required cycles of operation. For the purposes of the present invention, these circuits may be implemented in a conventional manner. Therefore, in order to simplify the description herein, only a brief description and the Boolean expressions will be given for certain control state flip-flops and control logic circuits as required for an understanding of the operation of the present invention.

The control state flip-flops generate a series of timing sequences which control the following data transfer sequences:

(1) processor to cache, SIU (operation to cache and to SIU);
(2) processor to SIU (transfer write data to SIU);
(3) ZACBUF to cache (operation to cache);
(4) ZACBUF to SIU (operation to SIU);
(5) processor to ZACBUF (write data saved in buffer);
(6) SIU to cache, processor (2 words transferred);
(7) SIU to cache, processor (1 word transferred).

The transfers utilize the following flip-flops.

Control State Flip-Flops

The OATB flip-flop is the first flip-flop set in a first sequence which enables a transfer information from the SIU 100 to cache 750 and to the processor 750.

The OATB flip-flop is set for one cycle in accordance with the following Boolean expression: ARDA·DPFS.

The THCFD flip-flop is the next flip-flop set in the first sequence which enables the information received furing cycle OATB from the SIU 100 to be transferred to processor 700 via the ZDI lines. The THCFD flip-flop is set for one cycle in accordance with the following Boolean expression:

SET : OETF = ARDA·DPFS.

the UG COGTH flip-flop when set permits the setting/resetting of a F/F bit, the setting of a pending bit, the setting of RR bits, writing MSA into the address of the directory section and writing data for write-single command into CACHE memory. It is set and reset in accordance with the following Boolean expressions:

| SET | $\overline{HOLD}$ · SET-COGTH. |
|---|---|
| RESET | $\overline{(HOLD)}$: $\overline{CAC\text{-}BSY1}$ · $\overline{NO\text{-}HOLD\text{-}CAC}$ · CACBSY1 + NO-HOLD-CAC |

The UGSOGTH flip-flop is the first set in a CPU to SIU sequence. When set, a first data word is put on the DTS lines. It is set for one cycle in accordance with the following Boolean expression:

| SET | $\overline{HOLD}$ · DWRT wherein DWRT = CWRT · SNG + CWRT · DBL + CWRT · RMT. |
|---|---|

The CAOPR flip-flop is set in response to the read for an AOPR response. It is set for one cycle in accordance with the following Boolean expressions:

| SET | SSET-IN · CLD-IBUF(CBYP-CAC + $\overline{BPSD}$) + CPR-RD · $\overline{CBYP\text{-}CAC}$ · $\overline{BPSD}$ + (CRD-SNG + CRD-DBL) · (CBYP-CAC + $\overline{BPSD}$) + CRD-CLR + CRD-RMT + CWRT-SNG + CWRT-DBL + CWRT-RMT. |
|---|---|

The CPR-FF flip-flop is used for determining when the cache unit will respond to a DREQ-CAC signal from processor 700. When this flip-flop is set to a binary ONE during a previous cycle, the cache unit will not respond to a request except in the cases of PREREAD, INST-F1, INST-F2, LDQUAD, RD-SINGLE or RD-DBL type commands. It is set and reset in accordance with the following Boolean expressions:

| SET | (CINST-F1 + CINST-F2 + CLD · QUAD + CRD · DBL + CRD · SNG) · (CBYP · CAC + $\overline{BPSD}$) + CPR-RD · $\overline{CBYP\text{-}CAC}$ · $\overline{BPSD}$ · |
|---|---|
| RESET | $\overline{HOLD}$ = $\overline{RD\text{-}BSY}$. |

The RBPSD flip-flop is used for turning off the processor 700 in the case of HOLD-ON-MISS or BYP-CAC condition. When the data comes back from the SIU 100, this flip-flop is reset except for an INST-FI cycle. In the case of IF-1, after 4 words have been received from the SIU, this flip-flop is reset. It is set and reset in accordance with the following Boolean expressions:

| SET | SSET-IN · $\overline{HOLD\text{-}CAN}$ · CRP-RMT + CRD-CLR + (CINST-F1 + CRD-SNG + CRD-DBL) · (CBYP-CAC + BPSD) |
|---|---|
| RESET | $\overline{(HOLD)}$ = THCFD · SEC-RCV · CINST-F1 + DATA-RECOV · $\overline{INST\text{-}F1\text{-}FF}$. | ing Boolean expression:

---

CONTROL LOGIC SIGNALS

1. The CPSTOP signal is the signal which is used to turn off the processor 700.
CPSTOP = FBPSD = REQ CAC · [RDTYP.RZAC-ALL-BSY + PRFF · (PR-RD + INST-F2 + LDQUAD + RD-SNG + RD-DBL) + CAC-BSY1 + CAOPR + UGCOGTH] + RBPSD + DBL · FF + PENBIT · FF +

CONTROL LOGIC SIGNALS (RD-IBUF/ZDI · CAC-BSY-1) + (RD-IBUF/ZDI · LD-QUAD-FF) + (UGCOGTH · RD-DBL · CAC-BSY1).

2. The CAC-BSY1 signal indicates when the cache unit is busy.
CAC-BSY1 = OATB + THCFD.

3. The [$F/E-WRT signal is a write enable signal for setting and resetting the full/empty bits.

[$F/E-WRT = $\overline{\text{CAC·BSY1}}$ · (UGCOGTH) · $\overline{\text{UGSOGTH}}$ · RD-DBL · $\overline{\text{BYP-CAC}}$ · $\overline{\text{DLY-BPSD}}$ · (INST-F2 + LD-QUAD) · BYP-CAC · $\overline{\text{DLY-BPSD}}$.

4. The [$SPEN1-WRT signal is a write enable signal for setting the operation pending bits.

[$SPEN1-WRT = $\overline{\text{CAC-BSY1}}$ · (UGCOGTH) · (INST-F2 + LD-QUAD + PR-RD + RD-SNG · $\overline{\text{DLY-BPSD}}$ + RD · DBL · $\overline{\text{DLY-BPSD}}$).

5. The [$SPEN2-WRT signal is a write enable signal for resetting the pending bits when all data associated with a request has been received from main memory.

[$SPEN2-WRT = THCFD · SEC-RCV · (INST-F2 + LD-QUAD + PR-RD + RD-SNG + RD-DBL · $\overline{\text{BYP-CAC}}$).

6. The RZAC-ALL-BSY signal indicates the busy status of the RZAC buffer established in accordance with the states of the busy bits.
RZAC-ALL-BSY = (RBB-00 + RBB-01) · (RBB-10 + RBB-11) · (RBB-20 + RBB-21) · (RBB-30 + RBB-31).

7. The [SRMIFS signal is a write strobe signal which allows the multiport identifier bits to be stored when data or status information is received from main memory. These bits identify which location in the RZAC buffer contains the ZAC word associated with the received data (i.e., the data pertains to which of the several possible outstanding read requests).
[SRMIFS = ARDA + AST.

8. The ALTSW0-DT signal enables incoming data from main memory to be saved in the RD0 and RD1 registers.
ALTSW0-DT = CAC-BSY 1.

9. The ALTSW2-DT signal enables data from the ZAC buffer to be transferred to the RD0 and RD1 registers.
ALTSW2-DT = DS-ALT + $\overline{\text{ALTSW0-DT}}$.
wherein DS-ALT = DS-11 + DS-12 + DS-13.

10. The signals OPSW0-DT through OPSW2-DT control the ZDI switch for transfers of data words from cache to processor 700 via the ZDI lines.
OPSW0-DT = RD-IBUF/ZDI.
OPSW1-DT = $\overline{\text{RD-IBUF/ZDI}}$ (REQ-CAC + UGCOGTH) · WDSEL0.
OPSW2-DT = RD-IBUF/ZDI + WDSEL1 · (RD-SNG + INST-F1)
+ REQ-CAC · $\overline{\text{UGCOGTH}}$ · INST-F1
+ REQ-CAC · $\overline{\text{UGCOGTH}}$ · RDSNG
+ REQ-CAC · $\overline{\text{UGCOGTH}}$ · DBL-FF.

11. The signals ZACSW1-LC1 and ZACSW2-LC2 control the switch 750-702 which selects the source address for all cache memory chips. The sources are the processor 700 when receiving commands, the ZAC buffer and the CADR address register.
ZACSW1-LC1 = $\overline{\text{ZACSW1-LC4}}$ · $\overline{\text{CAC-BSY-1}}$ · UGCOGTH.
ZACSW2-LC2 = CAC-BSY1 + UGCOGTH.

12. The signal DATA-RECOV enables the processor 700 to recover from a stop condition (e.g. restrobe registers).
DATA-RECOV = THCFD · (CINST-F1 + CRD-SNG) ·
($\overline{\text{FMIFS-1}}$ · $\overline{\text{WDSEL0}}$ + THCFD ·
CRD-DBL ($\overline{\text{FSMIFS-1}}$ · WDSEL0 +
FMIFS-1 · WDSEL0 + FMIFS-1 ·
WDSEL0 + CBYP-CAC) + THCFD ·
CRD-RMT.

13. The RD-BSY signal establishes when certain state flip-flops are reset.
RD-BSY = RBB-00 + RBB-01 + RBB-10 +
RBB-11 + RBB-20 + RBB-21 +
RBB-30 + RBB-31.

14. The SSET-IN signal is used to set certain state flip-flops.
SSET-IN = $\overline{\text{RBPSD}}$ · $\overline{\text{CDBL-FF}}$ · $\overline{\text{PENBIT-FF}}$ · $\overline{\text{UGCOGTH}}$ · $\overline{\text{CAOPR}}$ · $\overline{\text{CAC-BSY1}}$ ·
[$\overline{\text{CPR-FF}}$ · $\overline{\text{CPR-RD}}$ · $\overline{\text{CINST-F2}}$ · $\overline{\text{CLD-QUAD}}$ · $\overline{\text{CRO-SNG}}$ · $\overline{\text{CRD-DBL}}$] ·
[$\overline{\text{CRD-TYP}}$ · $\overline{\text{RZAC-ALL-BSY}}$] · DREQ-CAC.

15. SEC-RCV = $\overline{\text{RMIFS-2}}$ · $\overline{\text{RMIFS-3}}$ · [RBB-00 ⊕ RBB-01] +
$\overline{\text{RMIFS-2}}$ · RMIFS-3 · [RBB-10 ⊕ RBB-11] +
RMIFS-2 · $\overline{\text{RMIFS-3}}$ · [RBB-20 ⊕ RBB-21] +
RMIFS-2 · RMIFS-3 · [RBB-30 ⊕ RBB-31].

16. The BPSD signal indicates a cache hit condition.

-continued

CONTROL LOGIC SIGNALS $$BPSD = \overline{BYP\text{-}CAC} \cdot \sum_{i=0}^{3} (ZADO10\text{-}23 = SP\text{-}i\text{-}00 \rightarrow 14) \cdot$$

$$F/Ei \cdot \overline{PENi}$$

wherein SP-i-00—14 corresponds to the address directory outputs (the saved address bits), F/Ei corresponds to the full/empty bit "i" and PENi corresponds to the pending bit "i".

It will be appreciated that in the above expressions that the symbols · denotes an AND operation,
  + denotes an OR operation, and
  ⊕ denotes an Exclusive OR operation.

Cache Directory Section 750-5

This section includes a 4 level control directory 750-500 and a 4 level set associative address directory 750-502. The directory 750-502 includes 128 columns, each column being divided into 4 levels, 15 bits in length thereby providing space in each column for four blocks. The control directory 750-500 includes 128 10-bit locations, each of which stores a 10-bit word of control information. The control information for each of the blocks includes two round robin (RR) bits, 4 full/empty (F/E) bits and 4 operation pending bits as shown.

The full/empty bits indicate whether a particular directory address has any significance (i.e., is valid). For a cache hit to occur, the F/E bit must be set to a binary ONE. A binary ZERO indicates the presence of an empty block. The round robin bits provide a count which indicates which block was replaced last. This count is incremented by 1 under the control of the full-/empty bits by a counter 750-512 and is used to identify the next block to be replaced. As seen from FIG. 3, this operation takes place when the round robin and full-/empty bits are read out into a pair of output registers 750-504 and 750-506. The full/empty bits are also read into a register 750-510 which controls the incrementing of the round robin bits. That is, the round robin bits are used after all the full/empty bits are set to establish which of the full blocks is to be used for new data. The resulting value (ADDRRO-1) is applied as an input to switch 750-518. All of the full/empty bits are reset by an initialize signal. The full/empty bits can be set via a register 750-516. When the processor 700 issues a read request which is a miss, during the state UGOGTH, a value "1000" is loaded into the register 750-516. This value is written into the control directory 750-500. On the next request, the value "1100" is loaded into the register 750-516 and etc. until all the full/empty bits are set.

The operation pending bits are used to indicate when a particular operation is still outstanding. For example, the pending bits when set indicates that all the read data for a particular block has not been received. Accordingly, during a read operation, when the address directory signals a hit, with the pending bit set, the cache unit 750 halts the operation of processor 700. Hence, no new request is made to main memory.

The network for setting and resetting the operation pending bits includes a 4-bit buffer register 750-520, a block decode register 750-524 and a decoder 750-512. The registers 750-520, during a write cycle of operation, are addressed by the signals PRZACWO-1 via an address register 750-522 and signals MIFS2-3 during a read cycle. The block decode register 750-524 forces different ones of the output signals BKDCODO-3 to binary ONES under the following conditions: (1) If at least one full/empty bit is a ZERO, when that bit is set to a binary ONE, the corresponding pending bit is set via the decoder 750-512. When all the full/empty bits are set, the next value for the round robin count is encoded and that bit position within the set of four pending bits is set to a binary ONE. A pending bit is reset via the decoder 750-512 only when the cache 750 has received all of the information (i.e., 4 words) from SIU 100. The contents of the registers 750-520 indicate the position of the pending bit to be reset. The pending bits read out from control directory 750-500 are applied as an input to decoder 750-514 for updating as required.

The pending bits are set and reset under the following conditions:

SET  INSTF2 (BYPCAC + CACMISS) + LDQUAD (BYPCAC + CACHEMISS)

+ PREREAD ($\overline{BYPCAC}$ · CACMISS) + READSINGLE · CACMISS +

READDBL · $\overline{BYPCAC}$ · CACMISS ·

RESET  INSTF2 + LDQUAD + PREREAD + RDSNG + RDDBL · $\overline{BYPCAC}$.

The actual control signals are as listed previously.

The address directory 750-502, as mentioned, contains 128 sets of 4 words, each 15 bits in length. Each 15-bit word corresponds to the address of a 4 word block in the cache storage section 750-7. Whenever, a ZAC command is processed and involves either writing to or reading from cache unit 750, the 15 bits of the block address contained in the ZAC buffers 750-1h0 or 750-102 are compared on a "set basis" with the address contents of the directory 750-502 to determine the presence of a hit or miss condition. More specifically, the directory 750-502 makes its associations on bits 0-14 of the ZAC address for detection of a hit or miss condition. These bits correspond to the address signals applied to either the ZAC 11-18, 20-26 lines or to the ZADO/RADO 10-24 lines selected via an input two position ZACSW switch 750-530.

The address of the directory set is defined by a cache address (CADDL0-6) applied via a three position input switch 750-702. This enables the referencing of 4 block addresses which are read out and applied as one input to each of a group of 4 comparator circuits 750-536 through 750-542. Each of the comparator circuits compares its block address with bits 0-14 of the ZAC address. The results generated by the circuits 750-536 through 750-542 are applied to corresponding inputs of a first group of AND gates 750-544 through 750-550 together with corresponding ones of the full/empty bit signals from register 750-506. A second group of AND gates 750-552 through 750-558 combine the outputs from AND gates 750-544 through 750-550 with signals ZEXTBK0-3 indicative of which block is being selected applied via register 750-518.

The AND gates 750-552 through 750-558 provide a group of output block selection signals (i.e., signals CBSEL0-3) which are applied as inputs to a cache storage 750-700 and to a group of directory hit detection circuits of block 750-560. The circuits of block 750-560 include a group of AND gates 750-562 which logically combine signals indicative of the operation pending bits with the block selection signals, the results of which are "ored" by an OR gate 750-564 to provide a directory hit signal on line BPSD. The circuits of block 750-560 force the line BPSD to a binary ONE when the address bits 0-14 match the directory contents, the corresponding full/empty bit is a binary ONE, and the corresponding pending bit is a binary ZERO. It is assumed there are error conditions.

Cache Storage Section 750-7 the section 750-7 includes a storage unit 750-700 having 2048 (2k), 40-bit word locations organized into 128 sets of 4 blocks. The unit is constructed from bipolar chips, conventional in design. The cache storage unit 750-700 is addressed by the 7-bit address CADDL0-6 applied via the switch 750-702. The address is stored in a holding register 750-704. This causes 4 blocks of 4 words to be applied as inputs to a group of 1 to 4 selection switches (not shown). The appropriate block (level) is determined by the states of the block select signals applied to the CBSEL0-3 lines. The signals applied to the CBYSEL0-7 lines via switch 750-708 provide the appropriate selection of even word and odd word bytes. Between words 0, 2 and 1, 3 the byte selection is independent and proceeds as follows:

| |
|---|
| OBYSEL0 (byte 0 select) for words 0, 2 |
| . |
| . |
| . |
| CBYSEL3 (byte 3 select) for words 0, 2 |
| CBYSEL4 (byte 0 select) for words 1, 3 |
| . |
| . |
| . |
| CBYSEL7 (byte 3 select) for words 1, 3. |

The signals applied via lines CWSEL0-3 via a decoder 750-706 is used for desginating the words. This ensures that the contents of the appropriate bit positions of the group of memory chips which comprise the unit 750-700.

The words of a selected block are applied as inputs to a number of sets or OR (NAND) gates 750-712 through 750-716. Each group of gates select the word of the selected block. The word outputs from the OR gates are applied as inputs to an instruction buffer 750-900 via a second position of a two position switch 750-902 and to the first 4 positions of an output ZDI switch 750-720 for forwarding to processor 700. The fifth position of the switch applies the word contents of registers 750-180 to processor 700 via a ZBP switch 750-902. Lastly, the sixth position of the ZDI switch 750-720 applies the output of the instruction buffer 750-900 via the ZIB lines 0-39.

As seen from the Figure, during a write cycle of operation, the word contents from the register 750-180 are applied as inputs to the unit 750-700.

Instruction Buffer Section 750-9

This section includes a 16 word instruction buffer 750-700 which receives data inputs from the registers 750-180 via the switch 750-902. As mentioned previously, the outputs from cache storage 750-700 are also written into the buffer 750-700 via the switch 750-902. Control signals and address signals applied via a switch 750-904 are decoded by a decoder 750-906 and are used to set a read address counter 750-908 and a write address counter 750-910 to the appropriate states. The address outputs of the counters are applied via a switch 750-912 and 750-914 to the buffer 750-900 and used to provide the appropriate addresses during read and write cycles of operation.

DESCRIPTION OF OPERATION

With reference to FIGS. 1-9b, the operation of the present invention will now be described in connection with several examples involving the processing of several different types of instructions having formats illustrated in FIGS. 8a through 8d.

However, before discussing these examples, reference will first be made to the state diagram of FIG. 7. This diagram illustrates the sequencing of the I cycle control state storage circuits of block 704-102 as a function of the coding of the "CCS" sequence field applied via the lines 704-210. As seen from FIG. 7, the control state FPOA is a beginning state for processing all instructions.

The FPOA state is entered when the FPOA control state flip-flop of block 704-102 of FIG. 3 switches to a binary ONE. This flip-flop is set to a binary ONE under hardware control in accordance with the following Boolean expression:

SET =
[$\overline{\text{HOLDI}}$·(DIBFRDY·$\overline{\text{DIBFEMTY}}$·[$\overline{\text{STRC-PR}}$·$\overline{\text{DXEDRPTS}}$·DPIPE1-4).

That is, the FPOA cycle is entered following an [END cycle when there is no hold condition relating to the pipeline (i.e., signal $\overline{\text{HOLDI}}$=1), the instruction buffer 750-900 is not empty (i.e., $\overline{\text{DIBFEMTY}}$=1), it has at least one instruction ready for transfer to processor 700 (i.e., DIBFRDY=1), the previous instruction did not produce a store compare condition (i.e., [$\overline{\text{STRCPR}}$=1), is not an execute or repeat instruction (i.e.,$\overline{\text{DXEDRPTS}}$=1) and the pipeline has been restarted (i.e., DPIPE1-4=1).

When in control state FPOA, the RBIR register 704-152 stores the instruction op-code as well as the remainder of the instruction word having one of the formats illustrated in FIGS. 8a and 8b. Also, the RSIR register 704-154 stores the same instruction word. In the case of an instruction having the format of FIG. 8a, the RBASA register 704-156 stores the upper three bits of the y field while the RRDX-A register 704-158 stores the td portion of the instruction word TAG field. The R29 flip-flop 704-162 stores the value of the AR bit 29 of the instruction word.

During control state FPOA, the hardware circuits of block 704-101 decode the CCS sequence field read out from the CCS control store 704-200 in response to the 10-bit op-code (bits 18-27) applied via the RBIR register 704-152. It is the coding of the CCS sequence field which establishes what path the processing of the instruction is to follow. Accordingly, the coding of the CCS sequence field determines the tyes of operations performed during the FPOA and subsequent cycles which complete as much processing of each instruction as possible under hardware control. Examples of the specific operations are set forth in the section "Hardwired Control State Actions" included herein.

Considering the paths in greater detail, it i seen from FIG. 7 that the hardware circuits of block 704-102 sequence from the FPOA state to control state FTRF-NG when a control flag flip-flop FTRF.TST indicates that the previous instruction was within the transfer class and that the condition for transfer or branching was not met ($\overline{\text{TRGO}}$=1). During control state FTRF-NG, the process hardware circuits generate signals for reinitializing the instruction buffer as a function of the contents of the instruction counter. This enables the discontinuance of that stream of instructions and a change back to the current stream of instructions whose address is indicated by the instruction buffer circuits. The FTRF-NG control state is then followed by one of the cycles FPI-INIT through FWF-IBUF as a function of the coding of the I buffer status lines.

In the case of normal instruction processing, the path followed as a consequence of decoding the CCS sequence field is that labelled $\overline{\text{FTRF-TST}}$ = [TRGO. This path indicates that the previous instruction was not within the transfer class ($\overline{\text{FTRF.TST}}$=1) or if it was within such class the condition for transfer is going to be met ([TRGO=1). Hence, this path indicates continued processing of a transfer class instruction under hardware control. It will be noted that if the previous instruction was a transfer class instruction (FTRF-TST=1) and if the current instruction is a transfer class instruction (TRF), then the hardware circuits of block 704-102 remain in control state FPOA (i.e., follow path TRF to FTRF-TST).

The point X in FIG. 7 denotes from the coding of the CCS sequence field whether the particular instruction is in the EIS class, the ESC class or TRF·EA class, the EIS·ESC·[EA·TRF class or the EIS·ESC·[EA class. In the case of the EIS class, the coding of CCS sequence field determines how many descriptors are needed for that particular EIS instruction. Each of the EIS instructions has the multiword format illustrated in FIG. 9b and can require up to three descriptors. The CCS fields for all instructions requiring one, two and three desriptors are grouped together within the decoding circuits. Additionally, signals applied via address lines of the instruction buffer circuits of the cache unit 750 are decoded to determine how many descriptor values or words are presently stored in the instruction buffer. These sets of signals are compared and when there are not enough descriptors presently in the I buffer to complete the instruction, then the circuits of block 704-102 switch from FPOA to control state FPIM-EIS. During control state FPIM-EIS, the processor circuits generate signals for conditioning the cache unit 750 to perform an instruction fetch operation for fetching four more words from main memory or backing store which are loaded into the instruction buffer.

Once the required numbers of descriptors have been fetched and the cache unit 750 signals that the instruction buffer is ready (IBUFRDY=1), the hardware circuits of block 704-102 are at point C. If the instruction buffer is not ready ($\overline{\text{IBUF-RDY}}$=1), the hardware circuits 704-102 switch to control state FWF-DESC wherein the processor 700 waits for the descriptor. When the instruction buffer is ready (IBUFRDY=1), the hardware circuits are again at point C.

It will be noted that all EIS type instructions (CCS codes 110000-111111) follow a path to point C. If the CCS field indicates that the instruction is a bit type EIS instruction (BIT=1), then the hardware circuits 704-102 switch control state (FESC) without performing any FPOP cycles of operation. If the CCS sequence field indicates that the instruction is not within the bit type class (i.e., $\overline{\text{BIT}}$=1), the hardware circuits 704-102 switch to control state FPOP for one cycle of operation. It will be appreciated that the number of descriptors within the EIS multiword instruction determines the number of FPOP cycles.

A maximum number of descriptors are processed under hardware control before the circuits 704-102 switch to control state FESC enabling control to be transferred to a microprogram routine within the execution control store 701-2. For those EIS multiword instructions which require address preparation on three descriptors, the hardware circuits 704-102 remain in the FPOP control state for executing two cycles during which the processor circuits generate addresses for the first and second descriptors before switching to control state FESC.

It is seen from FIG. 7 that depending upon the type of instruction as defined by control sequence field and the type of address preparation required, address preparation for the different descriptors proceeds until it is determined that address preparation can no longer continue under hardware control. More specifically, during the FPOP cycle, address preparation is performed for descriptors of the classes of instructions which include instruction types NUM2 through MVT conditioned on the fact that the descriptor is not an indirect descriptor ($\overline{\text{FID}}$=1), that the descriptor does not specify an indirect length ($\overline{\text{FRL}}$=1) and it is not a Type 6 descriptor ($\overline{\text{TYP6}}$=1) or address preparation is to be completed under hardware control (FINH-ADR=1) in addition to other unusual situations which cannot be handled under hardware control (i.e., $\overline{\text{FAFI}}$=1). When the circuits of block 704-104 force signal FINH-ADR to a binary ZERO, this indicates the the address preparation had been completed under microprogram control and therefore does not have to be performed during a FPOP cycle.

The circuits of block 704-110 force signal $\overline{\text{FAFI}}$ to a binary ONE when the address preparation can be accomplished during the FPOP cycle and there are no special conditions such as the occurrence of a mid instruction interrupt.

Lastly, the condition RDESC=00 is defined by the states of flip-flops of block 704-142 and indicates the occurrence of a first FPOP cycle during which the processor circuits prepare the address of the first descriptor.

In the event that there are some special type of conditions presently defined by the function f, the hardware circuits of block 704-102 switch to control state FESC. This enables the transfer of control to routines stored in the ECS control store 701-2 for continuing the processing of the instruction under microprogram control.

Additionally, the circuits of block 704-102 include flip-flops which provide control states FIDESC and FWF-IDESC for processing under hardware control indirect operand descriptors for EIS instructions.

For a first indirect descriptor, it becomes necessary to hold up completion of the I cycle for a cycle and let the execution unit 714 complete its operation. As soon as the E cycle is completed, the processor circuits under hardware control fetch the indirect descriptor. In greater detail, when the CCS field indicates that the instruction in an EIS instruction and bit 31 of the RSIR register is a binry ONE (see FIG. 8c), this means that the first descriptor of the EIS instruction is an indirect operand.

During control state FPOA, the hardware circuits of block 704-102 hold up completion of the I cycle (i.e., HOLD-I =1) for one cycle. This is, a control flip-flop FPOAID included within block 704-102 is switched to a binary ONE in response to a first clock pulse which forces the [HOLDI00 signal to a binary ZERO. Upon the occurrence of a next clock pulse, the FPOAID flip-flop is reset to a binary ZERO which allows the HOLDI00 signal to be forced to a binary ONE (see expressions listed under FPOA control state in "Hardwired Control State Actions" section).

For the remaining EIS descriptors, the hardware circuits of block 704-102 do not hold up the completion of any more I cycles following control system FPOA. From FIG. 7, it is seen that the control system FPOP is entered. However, the hardware circuits of block 704-102 immediately switch to control state EIDESC upon detection of an indirect descriptor. This state is followed by a switching to control state FWF-IDESC and a return to control state FPOP completing the processing of a first indirect operand descriptor. These states are repeated for each descriptor word specified by the MF field of the instruction word as having an indirect operand (see FIG. 8b).

Considering instructions other than EIS type instructions, it will be noted from FIG. 7 that when the CCS sequence field indicates that the instruction is within the escape class or within the transfer class and require indirect address modification, the hardware circuits 704-102 immediately switch from control state FPOA to the FESC control state. As mentioned, control is transferred to the approprite microprogram routines stored in ECS control store 701-2. Thereafter processing of the instruction proceeds under microprogram control. As indicated in FIG. 7, the occurrence of certain microinstruction codes causes the hardware circuits 704-102 to switch to control state FPOP.

The arrangement for transferring control and the conditions under which control is transferred need not be discussed further herein. However, for further information, reference may be made to the patent applications listed in the introduction. For the purpose of the present invention, it need only be understood that the ardware circuits of block 704-102 passes control to the ECS control store 701-2 for completion of certain types of instructions which cannot executed in a pipeline mode of operation.

The above mentioned instructions include EIS type instructions as well as those instructions in which the hardware circuits of block 704-102 switch to control state FESC during the processing thereof. It will be noted that the particular coding of the CCS sequence field enables the processor 700 to detect an early point in time whether an instruction can be executed in the pipeline mode of operation.

It can also be seen from FIG. 7 that non-EIS type instructions other than transfer class instructions ($\overline{TRF}=1$) which require indirect addressing and are not within the escape class ($\overline{ESC}=1$) follow a path which causes the hardware control circuits of block 704-102 to switch to control state FWF-IND. For execute double and repeat instructions, XED or RPT, the hardware control circuits 704χswitch to control store FESC. Thereafter, indirect address preparation is performed under microprogram control.

In accordance with the preferred embodiment, indirect address modification operations for instructions having the format shown in FIG. 8a are performed under hardware control. These include register then indirect (RI), indirect then register (IR) and indirect then tally (IT). Other IT address modification operations requiring other than indirection are performed under microprogram control.

As seen from FIG. 7, when register indirect address modification is required (i.e., the tm field specifies a register than indirect type modification), the hardware control circuits of block 704-102 switch from the FWF-IND control state to the FPOA control state provided that the CCS field indicates that the instruction is not an execute double or repeat instruction (i.e., RI·$\overline{XED \cdot RPTS}=1$).

The RI address modification is a 2T operation (i.e., FPOA (RI)→FWF-INT→FPOA). During control state FPOA, when the tm portion of the instruction word contents of the RSIR register 704-158 indicate RI address modification, the processor circuits inhibit the loading of the CCS field address into the ECS address register 701-10 of FIG. 3b. Also, the processor 700 takes action to fetch from memory the indirect word specified by the effective address resulting under R type modification (i.e., generates a read single memory command).

During control state FWF-INT, the processor 700 under hardware control transfers in for the indirect word, having the format shown in FIG. 8d, from cache unit 750 and forces the RI flip-flop of block 704-110 to a binary ONE. The RI flip-flop remains a binary ONE for the duration of the next FPOA control state. This flip-flop is used to force the R29 register 704-162 to a binary ZERO since the indirect word fetched from memory has its AR bit 29 set to a binary ONE (see FIG. 8d).

As seen from FIG. 7, when the tm field of the instruction specifies an indirect then register address indirect modification and the instruction is other than an execute double or repeat (i.e., (IR + FIR)·$\overline{XED \cdot RPTS}=1$), the hardware control circuits of block 704-102 switch from the FWF-IND control state to the FIRT control state. The IR modification is a 3T operation (i.e., FPOA-(IR)→FWF-IND→FIRT→FPOA). The same operations mentioned in connection with RI modification are carried out during control state FPOA.

During control state FWF-IND, the control state flip-flop FIRT and the FIR flip-flop are forced to binary ONES. This state is followed by control state FIRT during which the original contents of the RRDXA register 704-158 saved in the RRDXAS register 704-159 are transferred to RRDXA register 704-158 where the address modification specified by the indirect word is either of R or IT type. At this point, the development of an effective address is complete (last indirection).

Also, the control flip-flop FIRL is forced to a binary ONE. The FIRI (flip-flop indirect last) flip-flop remains a binary ONE for the duration of the next FPOA control state. Since the operation is not complete, the FIR flip-flop remains at a binary ONE during control state FPOA.

During the next control state FPOA, the FIRL flip-flop forces the R29 register 704-162 and RSIR tag bits 30-31 to binary ZEROS. This completes the I cycle of operation for that instruction. A similar sequence is followed in the case of a non-execute double or repeat instruction requiring an indirect then tally address modification. This is a 3T operation (i.e., FPOA (IT)→FWF-IND→FIT-I→FPOA). During control state FWF-IND, in addition to loading the indirect word into the processor registers (i.e., ZDI→RSIR, RDI and RRDX-A, R29), the control state flip-flop FIT-I is forced to a binary ONE and the RRDXAS register 704-159 is forced to ZEROS.

During control state FIT-I, the ZERO contents of RRDXAS register 704-159 are loaded into RRDXA register 704-158. Also, the FIRL flip-flop is forced to a binary ONE. Similar to that described above, the R29 register 704-162 and RSIR tag bits 30-31 are forced to binary ZERO by the FIRL flip-flop. The "Hardwired Control State Actions" section illustrates the various operations described above in greater detail.

As seen from FIG. 7, non-EIS type instructions which are not within the escape class and do not require generation off an effective address ($\overline{EIS \cdot ESC \cdot EA}$) follow a path to point XX. These instructions have the format of FIG. 10a and their tm portion of their TAG fields are coded to specify no indirection (i.e., 00 code). As indicated, the tm portion of an instruction is tested for indirection during the FPOA cycle and when indirection is not specified, the control flag [EA is forced to a binary ONE state.

As seen from FIG. 7, the various groups of instructions following this path are those which reference CCS sequence fields coded to specify sequences listed within group A, group B, group C, TRF, STR-SGL, STR-HWU and STR-DBL. Instructions requiring group A sequences as well as those instructions whose processing has reached point B follow the path to point XXX. Point XXX in FIG. 7 indicates the point at which processor 700 has completed the I cycle processing of an instruction and must then fetch the next instruction from the I buffer for processing. Before that can be done, the processor 700 must make certain that the instruction just completed has not placed it in an execute double or repeat loop (i.e., the instruction is not an XED or RPT instruction). If the processor 700 has been placed in a loop, the hardware circuits of block 704-102 switch to control state FXRPT followed by control state FESC. This ensures that the processor 700 does not fetch the next instruction but instead control is transferred to the ECS control store 701-2 wherein the next operation(s) are carried out under microprogram control. More specifically, during control state FXRPT, the processor 700 under hardwired control forces the ECS control store 701-2 to the appropriate address and during control state FESC transfers control from the hardware circuits.

When the CCS sequence field indicates that the instruction is not an execute double or repeat type of instruction and that the control flag STR-CPR is a binary ONE indicating that the instruction buffer must be reloaded because of a store operation, the hardware circuits of block 704-102 switch to control state FPI-INIT. The STR-CPR flag is set to a binary ONE during a cache write operation when the address of the cache command equals the address of the instruction block. During this state, the processor 700 initializes the instruction buffer via the circuits of block 704-128. Thereafter, the hardware circuits of block 704-102 switch to control state FPIM-2 to fetch the next instruction. This state is followed by a return to control state FPOA as shown in FIG. 7.

When the CCS sequence field indicates that the instruction is neither an execute double or repeat instruction and the instruction buffer does not have to be reloaded because of a store compare operation ([$\overline{STR\text{-}CPR}$ = 1]), the hardware circuits of block 704-102 switch to one of three control states FPIM-1, FPOA and FWF-IBUF as shown. In the case where the instruction buffer is empty (IBUF-EMPTY = 1), it switches to control state FPIM-1 to enable the fetching of instructions to fill the instruction buffer. After the instruction buffer has been filled, the hardware circuits of block 704-102 switch to control state FPOA to begin the processing of the next instruction. In the case where the buffer is not empty, ($\overline{IBUF\text{-}EMPTY}$ = 1) but is ready for read out of the next instruction (IBUFRDY = 1) the hardware circuits of block 704-102 immediately switch back to control state FPOA.

It will be noted from FIG. 7 that in the event the instruction buffer is not in a ready condition ($\overline{IBUFR\text{-}DY}$ = 1), the hardware circuits of block 704-102 switch to the FWF-IBUF control state and remain in that state until the instruction buffer is ready (IBUF-RDY = 1). When it is ready, the hardware circuits of block 704-102 switch to control state FPOA.

It will be noted that instructions which reference CCS fields coded to specify the sequences listed in group B follow the path labeled group B wherein the hardware circuits of block 704-102 switch from control state FPOA to control state FESC. Similarly, instructions which reference CCS fields coded to specify the sequences listed in group C cause the hardware circuits of block 704-102 to switch to control state FDEL followed by control state FESC. In each case, these instructions require operations which cannot be executed by processor 700 under hardware control but which required certain microinstruction routines for completing the processing thereof.

A seen from FIG. 7, the instructions which reference CCS fields coded to specify STR-SGL or STR-HWU sequences are processed under hardware control provided these instructions do not require character address modifications ($\overline{FCHAR}$ = 1). In such cases, the hardware circuits of block 704-102 switch to control state FSTR.

Those instructions which reference CCs field codes specifying an STR-DBL sequence, the hardware circuits of block 704-102 switch from control state FPOA to the FSTR-DBL control state followed by control state FSTR. In the case of each of three types of sequences mentioned, the hardware circuits of block 704-102 follow a path back to point B for fetching the next instruction from the instruction buffer.

In accordance with the preferred embodiment, the path labelled TSXn is followed when the CCS field is coded to specify the TSX instructions within the class. Initially, the path is the same as that followed by intructions within the ESC-EA class. Hence, similar operations in generating an effective address are performed by processor 700 during control state FPOA. Additionally, the instruction counter is updated by being incremented by one.

The hardware circuits of block 704-102 then switch to control state FTSX1. During this state, the updated instruction counter contents are loaded into the RDI register 704-164. The hardware circuits of block 704-102 switch control flag flip-flop FTSX2 to a binary ONE and thereafter switch to control state FPI-INIT. The control flag flip-flop FTSX2 causes the processor 700 to reference effective address generated during control state FPOA and stored in TEA0 during control state FPI-INIT. It will be appreciated that normally, the processor 700 references the address value IC+0+0 during control state FPI-INIT. The hardware circuits of block 704-102 then switch to control state FPIM-2 followed by control state FPOA.

It will be appreciated that FIG. 7 only discloses the hardware operations relative to the I cycle of operation. As mentioned, the processing of a given instruction is performed to the extent possible under hardware control. Depending upon the class into which an instruction falls as specified by the CCS field establishes the operations performed during the FPOA control state and subsequent control states. As explained herein and as seen from the section, Hardwired Control State Actions, the hardware circuits of block 704-102 as a function of the coding of the CCS sequence field, generates the appropriate type of cache command during control state FPOA. This action as well as the other actions occurring during the control states of FIG. 7 are as indicated in the following section.

---

HARDWIRED CONTROL STATE ACTIONS SECTION
FPOA CONTROL STATE

1. If $\overline{\text{FINH-ADR}} = 1$ then $[Y(29) + X(RRDX\text{-}A) + ADR(29)] \longrightarrow \text{ASEA};$ $[Y(29) + X(RRDX\text{-}A) + ADR(29)] + ZBASE \longrightarrow \text{ASFA};$ If $RSIR_{30-31} = 00$ then $1 \longrightarrow EA^*$;

If $RSIR_{30-31} \neq 00$ then $0 \longrightarrow EA$; $RBAS\text{-}A(29) \longrightarrow RSPP$;

*The bracket sign ( [ ) has been omitted from the term EA throughout for the sake of clarity.

2. If FINH-ADR = 1 then $[0 + 0 + REA\text{-}T] \longrightarrow \text{ASEA};$ $[0 + 0 + REA\text{-}T] + ZBASE \longrightarrow \text{ASFA};$ $1 \longrightarrow EA$ 3. $ASEA \longrightarrow REA$; $ASFA \longrightarrow RADO$
    $[SCACHE\text{-}REG = 1$ 4. If $\overline{\text{FTRF-TST}} = 1$ then $0 \longrightarrow FTNGO$ 5. If FMSK-29 = 1 then MASK R29 to 0
   If FIRL = 1 then MASK RSIR 30, 31 to 00

$0 \longrightarrow FIR$ $0 \longrightarrow FRI$ $0 \longrightarrow FIRL$

6. If $(FTRF\text{-}TST \cdot \overline{[TRGO)} \cdot TRF \cdot EA \cdot \overline{EIS} = 1$ and
    if EA·(LD-SGL + LD-HWU + RD-CLR + EFF-ADR + NO-OP) then $1 \longrightarrow END$; and
    if EA·(STR-SGL + STR-HWU + STR-DBL) = 1 then $ZREG \longrightarrow RRDX\text{-}A$; $0 \longrightarrow R29$; and if EA = 1 then ZREG——REG-BSY and if TSXn · EA = 1 then IC + 1 $\longrightarrow$ IC $CCS \longrightarrow CCS\text{-}REG$; $CCS\text{-}O_{0-1} \longrightarrow RTYP_{0-1}$ and
    if EA [DEL-STR-SGL + DEL-STR-DBL + TSXn + INST-GR] +
      [EA·ESC] = 1 where INST-GR = LD-SGL-ESC + LD-DBL-ESC + LD-HWU-ESC + EFF-ADR-ESC + ESC-EA then 00 $\longrightarrow$ RBAS-B 7. If $\overline{\text{FTRF-TST}} \cdot TRF \cdot EA = 1$ then -continued a. $\overline{ZREG} \longrightarrow REG\text{-}BSY$;
b. [INIT-IBUF = 1];
c. $\overline{CCS} \longrightarrow CCS\text{-}REG$;

8. If $\overline{FTRF\text{-}TST} \cdot \overline{TRGO} \cdot EIS$
   If FREQ-DIR = 1 then [HOLD I = 1

If $\overline{FREQ\text{-}DIR}$ = 1 then $RBIR_{27-35} \longrightarrow ZIDD_{27-35} \longrightarrow R29$, RRDX-A, FID, FRL;

If BIT = 1 then 01 $\longrightarrow RTYP_{0-1}$;

If MTM-MTR = 1 then 00 $\longrightarrow RTYP_{0-1}$;

If $\overline{BIT} \cdot \overline{MTM\text{-}MTR}$ = 1 then ZIB $\longrightarrow RTYP_{0-1}$ $RIR_{30} \longrightarrow FAFI$;

ZIB $\longrightarrow$ RSIR, RBAS-A;
   If ($\overline{NEED\text{-}DESC}$) · (IBUF-RDY) = 1 then $\overline{FTRF\text{-}TST}$ = 1 then [READ-IBUF/ZIB (CUR) = 1
   FTRF-TST = 1 then [READ-IBUF/ZIB (OPS) = 1

CCS $\longrightarrow$ CCS-REG

9. If $\overline{FPOA\text{-}ID} \cdot RSIR_{31}$ then HOLD-I $\longrightarrow$ 1

If $\overline{FPOA\text{-}ID} \cdot RSIR_{31} \cdot \overline{HOLD\text{-}E}$ then 1 $\longrightarrow$ FPOA-ID, If FPOA-ID · $\overline{HOLD\text{-}E}$ then 0 $\longrightarrow$ FPOA-ID 10. If FTRF-TST = 1 and
    If [TRGO = 1 then Toggle FABUF-ACTV; If XED-RPTS = 1
    then 1 $\longrightarrow$ FTRGP If $\overline{END}$ = 1 then [RDI/ZRESB = 1

11. If $\overline{TRGO}$ = 1 then Inhibit IC strobe;

1 $\longrightarrow$ FINGO 12. 0 $\longrightarrow$ FTRF-TST

DMEN AND VALUES GENERATED DURING CONTROL STATE FPOA

[MEM, [SZ for FPOA

If FTRF-TST · $\overline{TRGO}$ = 1 then [MEM = None;

If ($\overline{FTRF\text{-}TST}$ + [TRGO) · ESC = 1 then [MEM = None,

If ($\overline{FTRF\text{-}TST}$ + [TRGO) · EIS = 1 then [MEM = None;

If ($\overline{FTRF\text{-}TST}$ + [TRGO) · $\overline{ESC}$ · $\overline{EIS}$ · $\overline{EA}$ = 1 then [MEM = Read Single; [SZ = Sgl;

($\overline{FTRF\text{-}TST}$ + [TRGO) · EA
If ESC-EA + DEL-STR-SGL + TSXn + DEL-STR-DBL + NO-OP = 1
then [MEM = None;
If LD-SGL + LD-SGL-ESC + LD-SGL-DEL then $\overline{FCHAR} \cdot RRDX\text{-}A = \overline{DU} \cdot \overline{DL}$ = 1 then [MEM = Read Single; [SZ = Sgl;

$\overline{FCHAR} \cdot RRDX\text{-}A = DU$ = 1 then [MEM = Direct; [SZ = HWV;

$\overline{FCHAR} \cdot RRDX\text{-}A = DL$ = 1 then [MEM = Direct; [SZ = HWL;
FCHAR = 1 then [MEM = None
If LD-HWU + LD-HWU-ESC + LD-HWU-DEL = 1 then $RRDX\text{-}A = \overline{DU} \cdot \overline{DL}$ = 1 then [MEM = Read Single; [SZ = HWU
RRDX-A = DU = 1 then [MEM = Direct; [SZ = HWU
RRDX-A = DL = 1 then [MEM = Direct; [SZ = ZERO
If STR-SGL = 1 then if $\overline{FCHAR}$ = 1 then [MEM = Write Single; [SZ = Sgl and
if FCHAR = 1 then [MEM = None
If TRF = 1 then if $\overline{FTRF\text{-}TST}$ · FABUF-ACTV = 1 then [MEM = Inst. Fetch-1;
[SZ = B and if $\overline{\text{FTRF-TST}} \cdot \overline{\text{FABUF-ACTV}} = 1$ then [MEM = Inst. Fetch-1; [SZ = A and
if FTRF-TST = 1 then [MEM = None
If EFF-ADR + EFF-ADR-ESC = 1 then [MEM = Direct; [SZ = HWU
If LD-DBL + LD-DBL-ESC + LD-DBL-FP-ESC = 1 then
[MEM = Read Double
If RD-CLR = 1 then [MEM = Read Clear
If STR-DBL = 1 then [MEM = Write Double; [SZ = DBL
If STR-HWU = 1 then [MEM = Write Single; [SZ = HWU
If LD/STR-SGL-ESC = 1 then [MEM = Read Single; [SZ = Sgl];
[R/W = 1
If LD/STR-HWU-ESC = 1 then [MEM = Read Single; [SZ = HWU;
[R/W = 1

FSTR CONTROL STATE

1. REG(RRDX-A) → ZX;
2. [ENAB-ZX-A2 = 1;
3. ZX, ZX-A2 → ZDO;
4. [ENAB-REG-BSY-STR;
5. ZRESB → RADO;
6. [END = 1.

FSTR-DBL CONTROL STATE

1. REG(RRDX-A) → ZX;
2. [ENAB-ZX-A2 = 1;
3. ZX, ZX-A2 → ZDO;
4. [ENAB-REG-BSY-STR;
5. ZRESB → RADO;
6. 0010 → RRDX-A;
7. 1 → R29.

FESC CONTROL STATE

1. If [DIBUF/PIPE = 10 + 11 or [PIPE = 001 + 100] then
[END = 1.
2. If [DIBUF/PIPE = 11 or [PIPE = 100] then 1 → FWF-REL.

FWF-IND CONTROL STATE

ZDI → RDI

If (RI + IR + IT-I) = 1 then ZDI → RSIR

ZDI → RRDX-A, R29

If RI · ($\overline{\text{DXED-RPTS}}$) = 1 then 1 → FRI

If (IT-I) · ─╫─ = 1 then 0 → RRDXAS$_{0-3}$

If IR · ─╫─ = 1 then RRDX-A → ZRDXAS$_{0-3}$ and

1 → FIR.

FIT-I CONTROL STATE

1. RRDXAS → RRDX-A$_{0-3}$
2. 1 → FIRL

FIRT CONTROL STATE

1. If $\overline{\text{RSIR-31}}$ = 1 then RRDXAS → RRDX-A and

1 → FIRL

FXRPT CONTROL STATE

1. CCS → CCS-REG

FTSX1 CONTROL STATE

1. IC → ZX
2. ZX → ZDO
3. ZRESB → RDI
4. 1 → FTSX2

FDEL CONTROL STATE

1. [0 + 0 + REA-T]⟶ASEA; and

[0 + 0 + REA-T] + ZBASE⟶ASFA.
2. ASEA⟶REA; ASFA⟶RADO; and $ZBASE_{33-35}$⟶$RBASE_{33-35}$; and
3. [$CACHE-REG = 1.
4. If DEL-STR-SGL = 1 then [MEM = WRITE SGL; [SZ=SGL.
5. If DEL-STR-DBL = 1 then [MEM = WRITE DBL; [SZ=DBL.
6. If $\overline{\text{DEL-STR-SGL} \cdot \text{DEL-STR-DBL}}$ = 1 then [MEM = NONE.
7. If LD-SGL-DEL + LD-DBL + LD-HWU-DEL = 1 then [END.

FPI-INIT CONTROL STATE

1. If $\overline{\text{FTSX2}}$ = 1 then [0 + RIC + 0]⟶ASEA;

If FTSX2 = 1 then [0 + 0 + REA-T]⟶ASEA;

ASEA + ZBASE⟶ASFA.
2. 0⟶FTSX2
3. ASEA⟶REA; ASFA⟶RADO.
4. [$CACHE-REG = 1.
5. ASEA⟶REA-T.
6. Toggle FABUF-ACTV.
7. [MEM = INST-FETCH1.
8. [INIT-IBUF-OPS = 1.

FTRF CONTROL STATE

1. [4 + 0 + REA-T]⟶ASEA and

[4 + 0 + REA-T] + ABASE⟶ASEA.
2. ASEA⟶REA; ASFA⟶RADO (force 00⟶$RADO_{32-33}$).
3. [$CACHE-REG = 1.
4. RBAS-B⟶ZBAS-C; 0, REA⟶RDI; 1⟶FTRF-TST.
5. ZDI⟶RBIR, RSIR, RBAS-A, RRDX-A, R29.
6. [READ-IBUF/ZIB (OPS) = 1.

FTRF-NG CONTROL STATE

1. [0 + 0 + REA-T]⟶ASEA; and

[0 + 0 + REA-T] + ZBASE⟶ASFA.
2. [END = 1.

FPIM-1 CONTROL STATE

1. [4 + 0 + REA-T]⟶ASEA and

[4 (forces 00⟶$RADO_{32-33}$) + 0 + REA-T] + ZBASE⟶ASFA.
2. ASEA⟶REA; ASFA⟶RADO (force 00⟶$RADO_{32-33}$) and
   [$CACHE-REG = 1.
3. ASEA⟶REA-T; and
   [MEM = INST-FETCH1; and
   RBAS-B⟶ZBAS-C.

FPIM-2 CONTROL STATE

1. [4 + 0 + REA-T⟶ASEA.
2. ASEA⟶REA; and ASFA⟶RADO (force 00⟶$RADO_{32-33}$); and
   [$CACHE-REG.
3. If $\overline{\text{ASFA-C27}}$ = 1 then ASEA⟶REA-T; ASFA, ZWS⟶RIB-VA, RIB-WS; and

[MEM = INST-FETCH2; IPTR-CUR-SEL⟶[SZ; and
   If ASFA-C27 = 1 then [MEM = NONE; and RBAS-B⟶ZBAS-C, and ZDI⟶RBIR, RSIR, RBAS-A, RRDX-A, R29, and
   [READ-IBUF/ZIB = 1.

FWF-IBUF CONTROL STATE

-continued

1. If IBUF-RDY = 1 then [READ-IBUF/ZIB (CUR), and

ZIB⟶RBIR, RSIR, RBAS-A, RRDX-A, R29.

FPIM-EIS CONTROL STATE

1. [4 + 0 + REA-T]⟶ASEA; and

[4 + 0 + REA-T] + ZBASE⟶ASFA.

2. ASEA⟶REA, and ASFA⟶RADO (force 00⟶$RADO_{32-33}$);
   [$CACHE-REG = 1.

3. ASEA⟶REA-T; and
   [MEM = INST-FETCH1; and

RBAS-B⟶ZBAS-C; ASFA-C27⟶FEIS-STR-CPR; and

ZIB⟶RSIR, RBAS-A; and

If $\overline{BIT} \cdot \overline{MTM\text{-}MTR}$ = 1 then ZIB⟶$RTYP_{0-1}$; and
   If IBUF-RDY = 1 then [READ-IBUF/ZIB, and

CCS⟶CCS-REG.

FWF-DESC CONTROL STATE

1. If IBUF-RDY = 1 then [READ-IBUF/ZIB; and

CCS⟶CCS-REG.

ZIB⟶RSIR, RBAS-A; and

If $\overline{BIT} \cdot \overline{MTM\text{-}MTR}$ = 1 then ZIB⟶$RTYP_{0-1}$.

FPOP CONTROL STATE

1. If $\overline{FINH\text{-}ADR}$ = 1 then
   [Y(29) EIS + X (RRDX-A, RTYP, FNUM) + ADR(29, $RTYP_0$)]⟶ASEA;
   [Y(29) EIS + X (RRDX-A, RTYP, FNUM) + ADR (29, $RTYP_0$)] +

ZBASE⟶ASFA.

2. If FINH-ADR = 1 then

[0 + 0 + REA-T]⟶ASEA;

[0 + 0 + REA-T] + ZBASE⟶ASFA.

3. If FID = 1 then
   HOLD-E = 1

RSIR⟶ZIDD

ZIDD⟶RRDX-A, R29

4. ASEA⟶REA; ASFA⟶RADO;
   [$CACHE-REG = 1;

If $\overline{FIG\text{-}LEN}$ = 1 then ZLN⟶RLEN

5. ASEA⟶REA-T (RDESC);

[FID + FRL + FAFI]⟶FINDA; (TYP=6) · $\overline{FINH\text{-}ADR}$⟶FINDC;

$\overline{TYP=9 + FINH\text{-}ADR}$ ⟶FINDB; FINDC + [SET-FINDC⟶DINDC;

FINDA + [SET-FINDA⟶DINDA;

FINDB + [SET-FINDB⟶DINDB.

6. RDESC = 00 (First Descriptor)
   If $\overline{FNUM \cdot EDIT}$ = 1 then $RSIR_{21-23}$⟶R1DW; $RTYP_{0-1}$⟶RTF1;

If $\overline{FIG\text{-}LEN}$ = 1 then $RSIR_{24-35}$⟶RXPA, RLN1

If $\overline{FINH\text{-}ADR}$ = 1 then $ASFA_{34-35}$⟶RP4

$ASFA_{34-35}$⟶RP0 if $\overline{RSIR21}$ = 1

$ASFA_{34-36}$⟶RP0 if RSIR21 = 1.
   If $\overline{FNUM \cdot EDIT}$ = 1 then $RSIR_{21-23}$⟶R1DW; $RTYP_{0-1}$⟶RTF1; $ASFA_{34-36}$⟶
   $RCN1_{0-2}$ $RSIR_{24-29} \rightarrow RXPA$;

If FIG-LEN = 1 then $RSIR_{30-35} \rightarrow RLN1$

If $\overline{RSIR_{21}}$ = 1 then $ASFA_{34-35} \rightarrow RP0$

If $RSIR_{21}$ = 1 then $ASFA_{34-36} \rightarrow RP0$.
If FNUM = 1 then $RSIR_{24-29} \rightarrow RXPA$; $RSIR_{21-23} \rightarrow R1DW$; $RTYP0(0) \rightarrow RTF1$;

$ASFA_{34-36} \rightarrow RCN1_{0-2}$

If $\overline{FIG\text{-}LEN}$ = 1 then $RSIR_{30-35} \rightarrow RLN1$

If $\overline{RSIR_{21}}$ = 1 then $ASFA_{34-35} \rightarrow RP0$

If $RSIR_{21}$ = 1 then $ASFA_{34-36} \rightarrow RP0$.
  A. If $[\overline{FID} \cdot \overline{FRL} \cdot \overline{FAFI} \cdot (\overline{TYP=6} + FINH\text{-}ADR)] = 1$ then 1. $0 \rightarrow$ FINH-ADR, FIG-LEN
   2. If $\overline{MTM\text{-}MTR}$ wherein DREV=MRL+TCTR+SCAN-REV = 1 then 1 =

[READ-IBUF/ZIB; ZIB $\rightarrow$ RSIR, RBAS-A;

01 $\rightarrow$ RDESC; If $\overline{TRANC}$ = 1 then IR30 $\rightarrow$ FAFI;

If $\overline{TRANC}$ = 1 then $RBIR_{9-17} \rightarrow ZIDD_{27-35} \rightarrow R29$,
      RRDX,A, FID, FRL;

If TRANC = 1 then ZIB $\rightarrow$ R29, RRDX-A;

If $\overline{SCAN} \cdot \overline{CMPC} \cdot \overline{CMPCT}$ = 1 then ZIB $\rightarrow$ RTYP;

If EDIT = 1 then $0 \rightarrow$ FNUM.
   3. If [TCT + SCAN-FWD + MVT + CONV] $\cdot [\overline{ZLN_{24-35} = 0} +$
      FIG-LEN] $\cdot \overline{FEII}$ then
      MEM = PRE-READ.
   4. If (NUM2 + NUM3 + EDIT) $(\overline{ZLN_{30-35}=0} + $ FIG-LEN).
      $\overline{FEII}$ then
      [MEM = PRE-READ.
   5. If MLR $(\overline{ZLN_{24-35} = 0} + $ FIG-LEN) $\cdot \overline{FEII}$ = 1 then
      (TYP=9) $\cdot \overline{FESCD}$ = 1 then [MEM = LD QUAD;
      1 = [INIT-IBUF; and if $\overline{(TYP=9 \cdot \overline{FESCD}} = 1$ then [MEM = PRE-READ.
   6. If (CMPC + CMPCT) $(\overline{ZLN_{24-35} = 0} + $ FIG-LEN) $\cdot \overline{FEII}$
      = 1 then
      (TYP=9) $\cdot \overline{FESCD}$ = 1 then [MEM = RDSGL; [SZ=ZONED;

$\overline{(TYP=9 \cdot \overline{FESCD}} = 1$ then [MEM = PREREAD.
   7. If OTHERWISE = 1 then [MEM = NONE.
  B If $[\overline{FID} \cdot \overline{FRL} \cdot \overline{FAFI} \cdot (\overline{TYP=6} + FINH\text{-}ADR)] = 1$ then
   1. [MEM = NONE.
7. $\overline{RDESC} = 01$ (Second Descriptor)
   If $\overline{EDIT} \cdot \overline{FNUM}$ = 1 then $RSIR_{21-23} \rightarrow R2DW$, $RTYP0\text{-}1 \rightarrow RTF2$;

If $\overline{FINH\text{-}ADR}$ and $\overline{RSIR21}$ = 1 then $ASFA_{34-35} \rightarrow RP1$ $RSIR21$ = 1 then $ASFA_{34-36} \rightarrow RP1$ $ASFA_{33-35} \rightarrow RP6$.
   If $\overline{FNUM} \cdot$ EDIT = 1 then $RSIR_{21-23} \rightarrow R2DW$, $RTYP0\text{-}1 \rightarrow RTF2$;

$ASFA_{34-36} \rightarrow RCN_{0-2}$.

If $\overline{FIG\text{-}LEN}$ = 1 then $RSIR_{30-35} \rightarrow RLN2$.
   If FNUM = 1 then $RSIR_{24-29} \rightarrow RXPB$; $RSIR_{21-23} \rightarrow R2DW$;

$RTYP0,(0) \rightarrow RTF2$; $ASFA_{34-36} \rightarrow RCN2_{0-2}$.

If $\overline{FIG\text{-}LEN}$ = 1 then $RSIR_{30-35} \rightarrow RLN2$.
   A. If $\overline{FID} \cdot \overline{FRL} \cdot \overline{FAFI} \cdot (\overline{TYP=6} + FINH\text{-}ADR) = 1$ then
      1. $0 \rightarrow$ FINH-ADR, FIG-LEN.

-continued

2. If (NUM3 + EDIT) = 1 then $RBIR_{0-8} \rightarrow ZIDD_{27-35} \rightarrow R29, RRDX-A,$
       FID, FRL;

[READ-IBUF/ZIB (CUR); IR30 $\rightarrow$ FAFI

ZIB $\rightarrow$ RSIR, RBAS-A, RTYP.
    3. If (NUM2 + NUM3 + EDIT) ($\overline{ZLN_{30-35} = 0}$
       +FIG-LEN) $\cdot \overline{FE21}$ then
       [MEM = PRE-READ, 10 $\rightarrow$ RDESC if NUM2 +NUM3.
    4. ($\overline{ZLN_{24-35} = 0}$ + FIG-LEN) $\cdot \overline{FE21}$.
    5. If (CMPC + CMPCT) = 1 then [MEM = PRE-RD.
    6. If OTHERWISE = 1 then [MEM = NONE.

B. If $\overline{FID} \cdot \overline{FRL} \cdot \overline{FAFI}(\overline{TYP=6} + FINH-ADR) = 1$ then
    1. [MEM = NONE.
8. RDESC = 10 (Third Descriptor)
  If $\overline{FNUM} \cdot \overline{EDIT}$ = 1 then $RSIR_{21-23} \rightarrow R1DW$, If $RTYP0-1=00$ = 1 then 1 $\rightarrow$ RTF3

If $RTYP0-1 \neq 00$ = 1 then 0 $\rightarrow$ RTF3

If $\overline{FIG-LEN}$ = 1 then $RSIR_{24-35} \rightarrow RLN1$

If $\overline{FINH-ADR}$ = 1 then $ASFA_{34-35} \rightarrow RP4$;

If $RSIR_{21}$ = 1 then $ASFA_{34-35} \rightarrow RPO$

If $RSIR_{21}$ = 1 then $ASFA_{34-36} \rightarrow RPO$.
If $\overline{FNUM} \cdot EDIT$ = 1 then $RSIR_{21-23} \rightarrow R1DW$, If $RTYP0-1=00$ = 1 then 1 $\rightarrow$ RTF3

If $RTYP0-1=00 \neq 1$ then 0 $\rightarrow$ RTF3

If $\overline{FIG-LEN}$ = 1 then $RSIR_{30-35} \rightarrow RLN1$

If $\overline{RSIR_{21}}$ = 1 then $ASFA_{34-35} \rightarrow RPO$

If $RSIR_{21}$ = 1 then $ASFA_{34-36} \rightarrow RPO$.
If FNUM = 1 then $RSIR_{21-23} \rightarrow R1DW$; If $RTYP0=0$ = 1 then 1 $\rightarrow$ RTF3

If $RTYP0 \neq 0$ = 1 then 0 $\rightarrow$ RTF3

If $\overline{FIG-LEN}$ = 1 then $RSIR_{30-35} \rightarrow RLN1$

If $\overline{RSIR_{21}}$ = 1 then $ASFA_{34-35} \rightarrow RPO$

If $RSIR_{21}$ = 1 then $ASFA_{34-36} \rightarrow RPO$.
  A. If $[\overline{FID} \cdot \overline{FRL} \; \overline{FAFI}(\overline{TYP=6} + FINH-ADR)] = 1$ then
    1. [MEM = NONE.

B. [SET-FESC = 1 then 1 $\rightarrow$ FESCD.

FIDESC CONTROL STATE

1. [Y(29) + X(RRDX-A) + ADR(29)] $\rightarrow$ ASEA;

[Y(29) + X(RRDX-A) + ADR(29)] + ZBASE $\rightarrow$ ASFA;

ASEA $\rightarrow$ REA; ASFA $\rightarrow$ RADO;
   [CACHE REG = 1;
   If $\overline{DU} + \overline{DL}$ = 1 then [MEM = READ-SNGL; [SZ = SINGLE);1 =

[HOLD-E; 0 $\rightarrow$ FID; RBIR30 $\rightarrow$ FAFI;

If RDESC = 00 then $RBIR_{27-35} \rightarrow ZIDD \rightarrow R29$,
   RRDX-A, FRL;

If RDESC = 01 then $RBIR_{9-17} \rightarrow ZIDD \rightarrow R29$, RRDXA, FRL;

If RDESC = 10 then $RBIR_{0-8} \rightarrow ZIDD \rightarrow R29$, RRDX-A, FRL.

FWF-IDESC CONTROL STATE

1. ZDI $\rightarrow$ RBIR, RBAS-A;

-continued

HOLD-E = 1
If $\overline{RDESC} = 00$ and
if $\overline{BIT} \cdot \overline{MTM\text{-}MTR} = 1$ then ZDI = RTYP
If RDESC = 01 and if $(\overline{SCAN + CMPC + CMPCT}) = 1$ then ZDI$\longrightarrow$RTYP If RDESC = 10 then ZDI$\longrightarrow$RTYP.

ABBREVIATIONS OF TERMS USED IN THE HARDWIRED CONTROL STATE ACTIONS SECTION

1. Y(29)   = $\overline{R29} = RSIR_{0-17}\longrightarrow ZY$ $R29 = RSIR_{3,3,3,3-17}\longrightarrow ZY$ 2. Y(29) EIS   = $\overline{R29} = RSIR_{0-20}\longrightarrow ZY$ $R29 = RSIR_{3,3,3,3-20}\longrightarrow ZY$ 3. X(RRDX-A)   = $\overline{RSIR_{30}}$ = ENAB-ZX as a function of RRDX-A
    $RSIR_{30}$ = DISABLE ZX 4. ADR(29)   = $\overline{R29} = 0\longrightarrow ZZ_{0-20}$ $R29 = ZAR_{0-19}\longrightarrow ZZ_{0-19}; 0\longrightarrow ZZ_{20}$

5. RBAS-A(29)

RSPP   = $\overline{R29} = 0010\longrightarrow RSPP_{0-3}$ $R29 = 1, RBAS\text{-}A_{0-2}\longrightarrow RSPP_{0-3}$

6. [READ-IBUF/ZIB(CUR)]   = [READ-IBUF/ZIB

FABUF-ACTV = 0$\longrightarrow$DRDB $\overline{FABUF\text{-}ACTV}$ = 1$\longrightarrow$DRDB

7. [READ-IBUF/ZIB(OPS)]   = [READ-IBUF/ZIB

FABUF-ACTV = 1$\longrightarrow$DRDB $\overline{FABUF\text{-}ACTV}$ = 0$\longrightarrow$DRDB 8. [END   = If $\overline{XED}\ \overline{RPT}\ \overline{RPL}\ \overline{RPD}\ \overline{XEC}$ then ZIB$\longrightarrow$RBIR, RSIR, RBAS-A, RRDX-A, R29;
    If $\overline{FTRF\text{-}TST} \cdot [TRGO = 1$ and
    If $(\overline{IBUF\text{-}EMPTY} \cdot IBUF\text{-}RDY) = 1$ then
    [READ-IBUF/ZID(OPS)];
    If $\overline{FTRF\text{-}TST} = 1$ and If $\overline{EIS} + FTRFNG = 1$ then IC + 1$\longrightarrow$IC;

If EIS·$\overline{FTRFNG} = 1$ then IC + CCS-R$_{1-3}\longrightarrow$IC;
    If $(\overline{IBUF\text{-}EMPTY}\cdot IBUF\text{-}RDY) = 1$ then
    [READ-IBUF/ZIB(CUR);

If $\overline{FTRF\text{-}TST} = 1$ then 0$\longrightarrow$FINH-ADR.

9. RI   = RSTR $\overline{30}\cdot 31$.
10. IR   = RSIR $30 \cdot 31$.
11. IT-I   = (RSIR $30 \cdot \overline{31}$) (RRDX-AO $\cdot \overline{1} \cdot \overline{2} \cdot 3$).
12. X(RRDX-A, RTYP, FNUM)   = ENABLE ZX as a function of RRDX-A, RTYP, FNUM.

13. ADR(29, RTYP$_0$)   = $\overline{R29} = 0\longrightarrow ZZ_{0-20}$ $R29 = ZAR_{0-19}\longrightarrow ZZ_{0-19}$;
    RTYP$_0$ = ZAR20 + 21·22 +

21·23$\longrightarrow$ZZ20

$\overline{RTYP_0} = 0\longrightarrow ZZ20$.

14. ASEA$\longrightarrow$REA-T (RDESC)   = ASEA$\longrightarrow$REA-T

RDESC = 00 = 000$\longrightarrow$ZBAS-C

RDESC = 01 = 001$\longrightarrow$ZBAS-C

RDESC = 10 = (01, FABUF-ACTV)$\longrightarrow$ZBAS-C.

15. [$RTYP-B   = If BIT = 11$\longrightarrow$RTYP-B$_{0-1}$

| | | |
|---|---|---|
| | | If $\overline{BIT}$ = RTYP$_0$, RTYP$_1 \cdot \overline{FNUM} \longrightarrow$ RTYP-B$_{0-1}$. |
| 16. | [SCACHE-REG | = STROBE CACHE CONTROL REGISTERS. |
| 17. | CCS$\longrightarrow$CCS-REG | = ZREG(CCS-R$\longrightarrow$RREG$\longrightarrow$RRDX-B on next clock pulse; CCS-02$\longrightarrow$FNUM. |
| 18. | ZREG$\longrightarrow$REG-BSY | = If $\overline{CCS\text{-}R0} \cdot \overline{CCS\text{-}R1}$ = No change to RBSY<br>If $(\overline{CCS\text{-}R0} \cdot \overline{CCS\text{-}R1})$ =<br>ZREG$\longrightarrow$RBSY-A,B,C as f(RLD) RLD +<br>1$\longrightarrow$RLD = 0$\longrightarrow$FDBL-REG<br>If (CCS-R0$\cdot\overline{CCS\text{-}R1}$) = ZREG$\longrightarrow$RBSY-A,<br>B,C as f(RLD) RLD + 1$\longrightarrow$RLD<br>1$\longrightarrow$FDBL-REG. |
| 19. | FDBL-REG | = $\overline{CCS\text{-}R3}$ = Q$\longrightarrow$ZREG; ZREG$\longrightarrow$RBSY-A, B, C as f (RLD);<br>CCS-R3 = A$\longrightarrow$ZREG; 0$\longrightarrow$FDBL-REG;<br>RDL + 1$\longrightarrow$RLD. |
| 20. | TYP9 | = RTYP$\bar{0}$ $_\Gamma$ + RTYP$\bar{0}$ · FNUM. |
| 21. | TYP6 | = RTYP$\bar{0}$ $_1$ · $\overline{FNUM}$. |

Figure 9A:
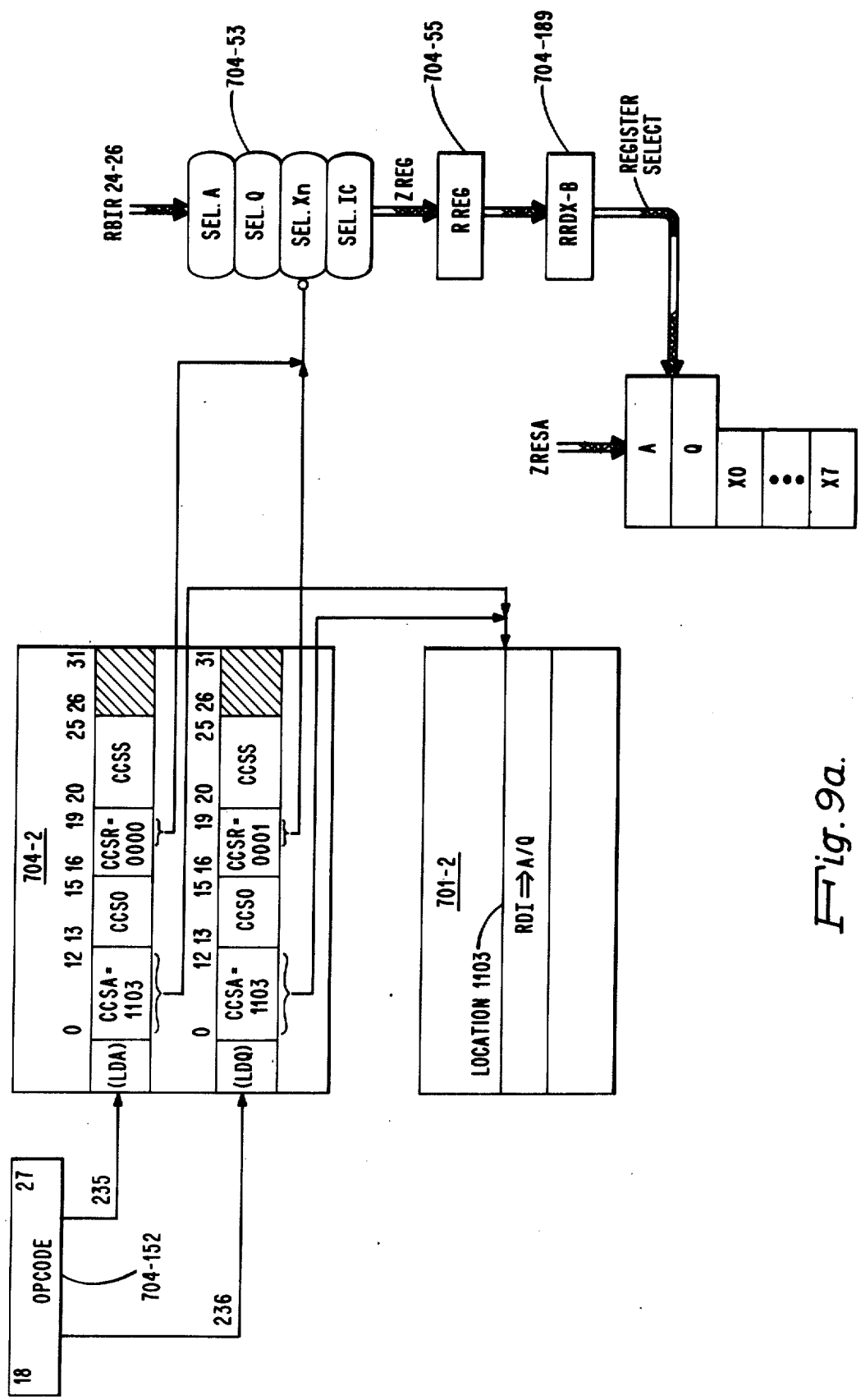
FIGS. 9a and 9b illustrate diagrammatically the operation of the preferred embodiment of the present invention.

The arrangement of the present invention will now be described with reference to FIGS. 9a and 9b. FIG. 9a diagrammatically illustrates the manner in which register selection is accomplished in accordance with the teachings of the present invention. As mentioned, the coding of the CCSR field provides register selection for load and store type instructions, control for the register busy function and an increment value for the instruction counter during EIS instruction having the format of FIG. 8b.

The coding of the CCSR field is as follows:

| Register | CCSR Code | Register Busy |
|---|---|---|
| A | 0000 | A |
| Q | 0001 | Q |
| X | 0010 | Xn (1-RBIR 24–26) |
| IC | 0011 | IC |
| AQ | 1000 | A then Q |
| QA | 1001 | Q then A |
| A | 0100 | N/A |
| Q | 0101 | N/A |
| Xn | 0110 | N/A |
| IC | 0111 | N/A. |

Referring to FIG. 9a, it is seen that the low order two bits (i.e., CCS 18-19) are used to select the value switched through ZREG switch 704-53. It will be assumed that processor 700 begins processing of a load A (LDA) instruction followed by a load Q (LDQ) instruction. The op-code of the followed by a load Q(LDQ) instruction. The op-code of the LDA instruction references a CCS location within control store 704-2 which contains a word formatted as shown. During control state FPOA of a first cycle, the processor address preparation unit 704-3 generates an address and a cache command including the address coded to specify a read single operation.

As seen from FIG. 9a, the low order bits (00) of the CCSR field select the first position of the ZREG switch 704-53. Upon selection, the code of 0001 is loaded into the RREG register 704-55. During the next cycle, the contents of register 704-55 are loaded into RRDXB register 704-189. Also, during this cycle, the cache unit 750 executes a cache cycle of operation to fetch the word specified by the cache command.

During a third cycle (E cycle), the processor 700 references the microinstruction word at the location 1103 specified by the CCSA field of the CCS word. Under microprogram control, the processor 700 executes the specified operation wherein it loads the fetched word applied to the RDI lines into the A register selected via the CCSR field.

The processor 700 carries out the same sequence of operations when executing a LDQ instruction. However, it will be noted that in this instance, the CCSR field contains a code of 0001. The low order two bits condition the ZREG switch to apply the code of 0010 as an output. This code when loaded into RRDXB register 704-189 selects the Q register as the register to receive the word fetched by cache unit 750. Thus, this arrangement of the present invention enables the processor 700 to execute both instructions utilizing the same execution routine, here the microinstruction word at location 1103. Similarly, other types of instructions may be executed in the same fashion.

Figure 9B:
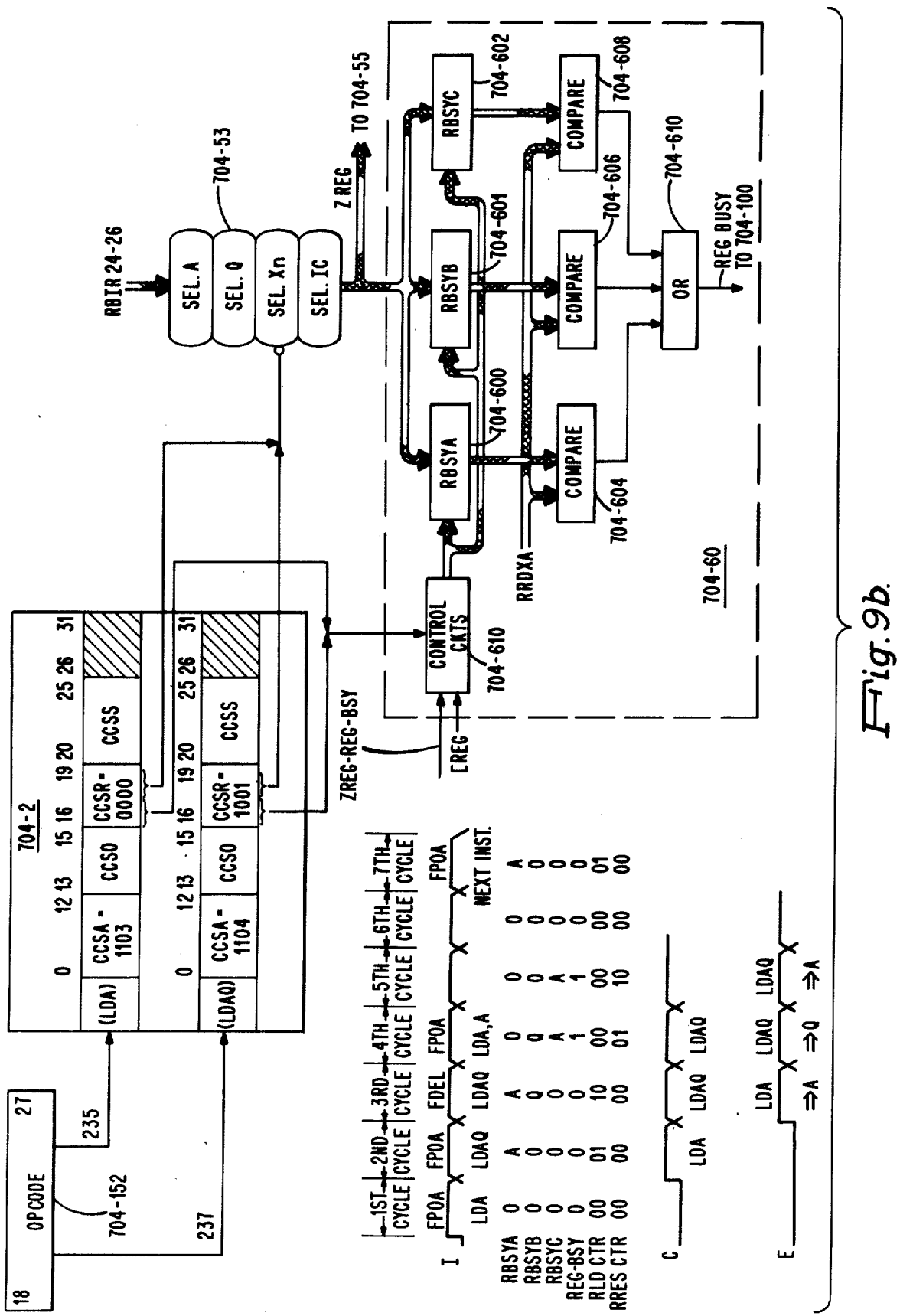

In addition to the above, FIG. 9b illustrates the manner in which the CCSR field controls the operation of the register busy circuits of block 704-60. It is assumed that processor 700 begins processing of a load A (LDA) instruction, then a load AQ (LDAQ) instruction followed by a load A, modified (LDA,A) instruction. Both the load A and load A with modification reference the same CCS word containing an all ZERO coded CCSR field. However, the LDAQ instruction references the CCS word with a CCSR field containing a 1001 code.

It is assumed that both the load (RLD) and reset (RRES) counters of block 704-610 and registers RBSYA through RBSYC have been cleared to ZEROS. Thus, during a first FPOA cycle in which the processor 700 begins processing of the first LDA instruction all the registers are all ZEROS indicating that none of the registers are busy. During cycle FPOA, the processor 700 under hardware control generates signal ZREG-REG-BSY. This signal together with the ZERO count contained in the RLD counter selects the RBSYA register 704-600 as the register to be loaded with the value selected by ZREG switch 704-53.

As previously mentioned, the low order two bits of the CCSR field condition the switch 704-53 to select the code of the first position (i.e., 0001=A) which is loaded into the A register during the next cycle. As seen from FIG. 9b, the RLD counter is incremented by one to a count of 01. The RRES counter remains at all ZEROS. The selection and loading of the A register is carried out in the manner previously described.

The next instruction is a load AQ which references a CCS word which includes a CCSR coded to specify the loading of the Q register followed by the A register (i.e., code of 1001). That is, the upper two bits of the CCSR field indicate that two registers are to be loaded in the order Q and then A. During the second FPOA cycle, the processor 700 again generates signal ZREG-REG-BSY. At this time, since the RLD counter is at a count of 01, the RBSYB register 704-601 is selected as the register to be loaded with the value selected by ZREG switch 704-53. Following that, the RLD counter is incremented by one for the next cycle.

Since the low order two bits of the CCSR field have a 01 code, the second position of switch 704-53 is selected which results in a code of 0010 (Q register) being loaded into the RBSYB register 7704-601.

Also, during the second FPOA cycle, the cache unit 750 executes a cache cycle of operation to fetch the word specified by a cache command generated during the first FPOA cycle. As seen from FIG. 9b, the A register is loaded at the end of the next cycle (FDEL) at which time the signal [REG is generated under microprogram control. This signal in turn causes the RBSYA register 704-600 to be reset to ZEROS and the RRES counter to be incremented by one to a count of 01. The RBSYA register 704-600 is selected by the ZERO count stored in the RRES counter at the time signal [REG is generated.

During the third FPOA cycle, the processor 700 generates strobe signal ZREG-REG-BSY. Since the RLD counter was at a count of 10, the RBSYC register 704-602 is selected as the register to be loaded with the value selected by ZREG switch 704-53. This results in a code of 000 (A register) being loaded into the RBSYC register 704-601. The RLD counter is again incremented by one to a count of 00. Since the tag field of the next instruction references the A register, and the RBSYC register has a value of 0001, the compare circuit 704-604 is operative to switch the REGBSY signal to a binary ONE. That is, the RRDXA register 704-158 stores the identity of the register to be used in the address modification (i.e., TAG) and when this value is compared with the contents of the RBSYC register 704-602, signal REGBSY is forced to a binary ONE.

The REGBSY signal conditions the I cycle circuits of block 704-102 to switch the IHOLD signal to a binary ZERO which stops the processor 700 from performing further I cycles of operation. As seen from FIG. 9a, this continues until both the Q and A registers have been loaded completing the execution of the LDAQ instruction. More specifically, during the third FPOA cycle, the word fetched by the cache unit 750 in response to a previous FPOA cycle is loaded into the Q register selected via the CCSR field. At that time, the processor 700 generates signal [REG which resets the RBSYB register 704-601 selected by the 01 count in the RRES counter. Also, the RRES counter is incremented by one to a count of 10.

During the next cycle (fifth cycle), the processor 700 completes its execution of the LDAQ instruction by loading the word fetched by cache unit 750 in response to the third FPOA cycle into the A register. This register is selected by the constant field (CCM) of the microinstruction word read out from control store 701-2 during the second cycle of the LDAQ instruction. At this time, processor 700 generates signal [REG which resets the RBSYC register 704-602 selected by the 10 count in the RRES counter. Also, the RRES counter is advanced from a count of 10 to 00 (complete cycle).

Upon the resetting of the RBSYC register 704-602, the REGBSY signal is switched to a binary ZERO enabling the processor 700 to begin further I cycles of operation. As seen from FIG. 10b, this results in the loading of the RBSYA register 704-600 with a code 0001 (A register) and the incrementing of RLD counter by one in response to the generation of strobe signal ZREG-REGBSY during the next FPOA cycle.

From the above, it is seen how the arrangement of the present invention provides additional advantages in controlling the pipeline operation of the processor 700 through register updating hardware circuits without necessitating additional microinstruction routines.

In addition to the above, it is seen from the previous listing of CCSR field codes that the arrangement of the present invention can also provide an increment value for EIS instructions which have the format shown in FIG. 8b.

As mentioned previously, the processor 700 under hardware control upon completing the execution of each instruction starts the processing of the next instruction at point B of FIG. 7. This involves the execution of a [END operation or cycle wherein the actions given for [END in the actions section are performed.

One set of actions include the following:

If $\overline{\text{FTRF-TST}} = 1$ and $\overline{\text{EIS}} + \text{FTRFNG} = 1$ then IC $+ 1 \rightarrow$ IC.

If $\overline{\text{FTRF-TST}} = 1$ and $\overline{\text{EIS-FTRFNG}} = 1$ then IC $+$ CCSRI-3$\rightarrow$IC.

This means that when the instruction just executed is an EIS type instruction, the processor 700 conditions the ZICN switch 704-314 of address preparation unit 704-3 to apply as an input to adder 704-312 via a second position signals corresponding to the CCSR field. In the case of an edit instruction, the CCSR field stores the code 0100. Hence, adder 704-312 operates in this instance to increment by 4 the value stored in RIC register 704-310.

From the above, it is seen that by changing the coding of the CCSR field in conformance with the particular type of EIS instruction, the updating of the instruction counter proceeds automatically eliminating the need for having to execute additional microinstructions. It is seen that the arrangement of the present invention reduces substantially the microinstruction requirements of the processor 700. Moreover, it improves the performance of processor 700 is executing a number of instructions within its repertoire.

APPENDIX A

| SINGLE WORD INSTRUCTIONS DATA MOVEMENT | |
|---|---|
| LDA | Load A |
| LDQ | Load Q |
| LDAQ | Load AQ |
| LDAC | Load A and Clear |

APPENDIX A-continued

| | |
|---|---|
| LDQC | Load Q and Clear |
| LDXn | Load Xn (n = 0, 1, ...7) |
| LXLn | Load Xn from Lower (n = 0, 1, ...7) |
| LCA | Load Complement A |
| LREG | Load Registers |
| LCQ | Load Complement Q |
| LCAQ | Load Complement AQ |
| LCXn | Load Complement Xn (n = 0, 1, ...7) |
| EAA | Effective Address to A |
| EQA | Effective Address to Q |
| EAXn | Effective Address to Xn (n = 0, 1, ...7) |
| LDI | Load Indicator Register |
| STA | Store A |
| STQ | Store Q |
| STAQ | Store AQ |
| STXn | Store Xn into Upper (n = 0, 1, ...7) |
| SXLn | Store Xn into Lower (n = 0, 1, ...7) |
| SREG | Store Register |
| STCA | Store Character of A (6 bit) |
| STCQ | Store Character of Q (6 bit) |
| STBA | Store Character of A (9 bit) |
| STBQ | Store Character of Q (9 bit) |
| STI | Store Indicator Register |
| STT | Store Timer Register |
| SBAR | Store Base Address Register |
| STZ | Store Zero |
| STC1 | store Instruction Counter plus 1 |
| STC2 | Store Instruction Counter plus 2 |
| ARS | A Right Shift |
| QRS | Q Right Shift |
| LRS | Long Right Shift |
| ALS | A Left Shift |
| QLS | Q Left Shift |
| LLS | Long Left Shift |
| ARL | A Right Logic |
| QRL | Q Right Logic |
| LRL | Long Right Logic |
| ARL | A Left Rotate |
| QLR | Q Left Rotate |
| LLR | Long Left Rotate |

FIXED POINT ARITHMETIC

| | |
|---|---|
| ADA | Add to A |
| ADQ | Add to Q |
| ADAQ | Add to AQ |
| ADXn | Add to Xn (n = 0, 1, ...7) |
| ASA | Add Stored to A |
| ASQ | Add Stored to Q |
| ASXn | Add Stored to Xn (n = 0, 1, ...7) |
| ADLA | Add Logic to A |
| ADLQ | Add Logic to Q |
| ADLAQ | Add Logic to AQ |
| ADLXn | Add Logic to Xn (n = 0, 1, ...7) |
| AWCA | Add With Carry to A |
| AWCQ | Add With Carry to Q |
| ADL | Add Low to Q |
| AOS | Add One to Storage |
| SBA | Subtract from A |
| SBQ | Subtract from Q |
| SBAQ | Subtract from AQ |
| SBXn | Subtract from Xn (n = 0, 1, ...7) |
| SSA | Subtract Stored from A |
| SSQ | Subtract Stored form Q |
| SSXn | Subtract Stored from Xn (N = 0, 1, ...7) |
| SBLA | Subtract Logic from A |
| SBLQ | Subtrat Logic from Q |
| SBLAQ | Subtract Logic from AQ |
| SBLXn | Subtract Logic from Xn (n = 0, 1, ...7) |
| SWCA | Subtract With Carry from A |
| SWCQ | Subtract With Carry from Q |
| MPY | Multiply Integer |
| MPF | Multiply Fraction |
| DIV | Divide Integer |
| DVF | Divide Fraction |
| NEG | Negate A |
| NEGL | Negate Long |

BOOLEAN OPERATIONS

| | |
|---|---|
| ANA | AND to A |
| ANQ | AND to Q |
| ANAQ | AND to AQ |
| ANXn | AND to Xn (n = 0, 1, ...7) |
| ANSA | AND to Storage A |
| ANSQ | AND to Storage Q |
| ANSXn | AND to Storage Xn (n = 0, 1, ...7) |
| ORA | OR to A |
| ORQ | OR to Q |
| ORAQ | OR to AQ |
| ORXn | OR to Xn (n = 0, 1, ...7) |
| ORSA | OR to Storage A |
| ORSQ | OR to STorage Q |
| ORSXn | OR to Storage Xn (n = 0, 1, ...7) |
| ERA | Exclusive OR to A |
| ERQ | Exclusive OR to Q |
| ERAQ | Exclusive OR to AQ |
| ERXn | Exclusive OR to Xu (n = 0, 1, ...7) |
| ERSA | Exclusive OR to Storage A |
| ERSQ | Exclusive OR to Storage Q |
| ERSXn | Exclusive OR to Storage Xn (n = 0, 1, ...7) |

COMPARE

| | |
|---|---|
| CMPA | Compare With A |
| CMPQ | Compare With Q |
| CMPAQ | Compare With AQ |
| CMPXn | Compare With Xn (n = 0, 1, ...7) |
| CWL | Compare With Limits |
| CMG | Compare With Magnitude |
| CMK | Compare Masked |
| SZN | Set Zero Negative Indicators from Memory |
| SZNC | Set Zero Negative Indicator from Storage and Clear |
| CANA | Comparative AND With A |
| CANQ | Comparative AND With Q |
| CANAQ | Comparative AND With AQ |
| CANXn | Comparative AND With Xn (n = 0, 1, ...7) |
| CNAA | Comparative NOT With A |
| CNAQ | Comparative NOT With Q |
| CNAAQ | Comparative NOT With AQ |
| CNAXn | Comparative NOT With Xn (n = 0, 1, ...7) |

FLOATING POINT

| | |
|---|---|
| FLD | Floating Load |
| DFLD | Double Precision Floating Load |
| LDE | Load Exponent Register |
| FST | Floating Store |
| DFST | Double Precision Floating Store |
| STE | Store Exponent Register |
| FSTR | Floating Store Rounded |
| DFSTR | Double Presision Floating Store Rounded |
| FAD | Floating Add |
| UFA | Unnormalized Floating Add |
| DFAD | Double Precision Floating Add |
| DUFA | Double Precision Unnormalized Floating Add |
| ADE | Add to Exponent Register |
| FSB | Floating Subtract |
| UFS | Unnormalized Floating Subtract |
| DFSB | Double Precision Floating Subtract |
| DUFS | Double Precision Unnormalized Floating Subtract |
| FMP | Floating Multiply |
| UFM | Unnormalized Floating Multiply |
| DFMP | Double Precision Floating Multiply |
| DUFM | Double Precision Unnormalized Floating Multiply |
| FDV | Floating Divide |
| FDI | Floating Divide Inverted |
| DFDV | Double Precision Floating Divide |
| DFDI | Double Precision Floating Divide Inverted |
| FNEG | Floating Negate |
| FNO | Floating Normalize |
| FRD | Floating Round |
| DFRD | Double Precision Floating Round |
| FCMP | Floating Compare |
| FCMG | Floating Compare Magnitude |
| DFCMP | Double Precision Floating Compare |
| DFCMG | Double Precision Floating Compare Magnitude |
| FSZN | Floating Set Zero and Netative Indicators from Memory |

TRANSFER OF CONTOL

| | |
|---|---|
| TRA | Transfer Unconditionally |
| TSXn | Transfer and Set Index Register |
| TSS | Transfer and Set Slave |
| RET | Return |
| TZE | Transfer on Zero |

APPENDIX A-continued

| | |
|---|---|
| TNZ | Transfer on NOT Zero |
| TMI | Transfer on Minus |
| TPL | Transfer on Plus |
| TRC | Transfer on Carry |
| TNC | Transfer On No Carry |
| TOV | Transfer on Overflow |
| TEO | Transfer on Exponent Overflow |
| TEU | Transfer on Exponent Underflow |
| TTF | Transfer on Tally Runout Indicator OFF |
| TTN | Transfer on Tally Runout Indicator ON |
| TPNZ | Transfer on Plus and Nonzero |
| TMOZ | Transfer on Minus or Zero |
| TRTN | Transfer on Truncation Indicator ON |
| TRTF | Transfer on Truncation Indicator OFF |

MISCELLANEOUS

| | |
|---|---|
| NOP | No Operation |
| BCD | Binary To Binary-Coded-Decimal |
| GTB | Gray to Binary |
| XEC | Execute |
| XED | Execute Double |
| MME | Master Mode Entry |
| DRL | Derail |
| RPT | Repeat |
| RPD | Repeat Double |
| RPL | Repeat Link |
| RCCL | Read Calendar Clock |
| SPL | Store Pointers and Lengths |
| LPL | Load Pointers and Lengths |

ADDRESS REGISTER

| | |
|---|---|
| LARn | Load Address Register n |
| LAREG | Load Address Registers |
| SARn | Store Address Register n |
| SAREG | Store Address Registers |
| AWD | Add Word Displacement to Specified AR |
| A9BD | Add 9-bit Character Displacement To Specified AR |
| A6BD | Add 6-bit Character Displacement To Specified AR |
| A4BD | Add 4-bit Character Displacement To Specified AR |
| ABD | Add Bit Displacement to Specified AR |
| SWD | Subtract Word Displacement from Specified AR |
| S9BD | Subtract 9-bit Character Displacement from Specified AR |
| S6BD | Subtract 6-bit Character Displacement from Specified AR |
| S4BD | Subtract 4-bit Character Displacement from Specified AR |
| SBD | Subtract Bit Displacement from Specified AR |
| AARn | Alphanumeric Descriptor to ARn |
| NARn | Numeric Descriptor to ARn |
| ARAn | ARn to Alphanumeric Descriptor |
| ARNn | ARn to Numeric Descriptor |

MASTER MODE

| | |
|---|---|
| DIS | Delay Until Interrupt |
| LBAR | Load Base Address Register |
| LDT | Load Timer Register |
| LLUF | Load Lockup Fault Register |
| SCPR | Replaced with SFR |
| SFR | Store Fault Register |
| LCCL | Load Calender Clock |
| RIMR | Read Interrupt Mask Register |
| LIMR | Load Interrupt Mask Register |
| RRES | Read Reserved Memory |
| CIOC | Connect I/O Channel |

EXTENDED MEMORY

| | |
|---|---|
| LBER | Load Base Extension Register |
| LMBA | Load Master Bar A |
| LMBB | Load Master Bar B |
| SBER | Store Base Extension Register |
| SMBA | Store Master Bar A |
| SMBB | Store Master Bar B |
| MLDA | Master Load A |
| MLDQ | Master Load Q |
| MLDAQ | Master Load AQ |
| MSTA | Master Store A |
| MSTQ | Master Store Q |
| MSTAQ | Master Store AQ |
| RPN | Read Processor Number |
| HALT | Halt |

MULTIWORD INSTRUCTIONS
ALPHANUMERIC

| | |
|---|---|
| MLR | Move Alphanumeric Left to Right |
| MRL | Move Alphanumeric Right to Left |
| MVT | Move Alphanumeric With Translation |
| CMPC | Compare Alphanumeric Character String |
| SCD | Scan Character Double |
| SCDR | Scan Character Double in Reverse |
| TCT | Test Character and Translate |
| TCTR | Test Character and Translate in Reserve |
| SCM | Scan With Mask |
| SCMR | Scan With Mask in Reserve |

NUMERIC

| | |
|---|---|
| MVN | Nove Numeric |
| CMPN | Compare Numeric |
| AD3D | Add Using three Decimal Operands |
| AD2D | Add Using two Decimal Operands |
| SB3D | Subtract Using 3 Decimal Operands |
| SB2D | Subtract Using 2 Decimal Operands |
| MP3D | Multiply Using 3 Decimal Operands |
| MP2D | Multiply Using 2 Decimal Operands |
| DV3D | Divide Using 3 Decimal Operands |
| DV2D | Divide Using 2 Decimal Operands |

BIT STRING

| | |
|---|---|
| CSL | Combine Bit Strings Left |
| CSR | Combine Bit Strings Right |
| SZTL | Set Zero and Truncation Indicator with Bit Strings Left |
| SZTR | Set Zero and Truncation with Bit Strings Right |
| CMPB | Compare Bit Strings |

CONVERSION

| | |
|---|---|
| DTB | Decimal to Binary Convert |
| BTD | Binary to Decimal Convert |

EDIT MOVE

| | |
|---|---|
| MVE | Move Alphanumeric Edited |
| MVNE | Move Numeric Edited |

MUTIWORD

| | |
|---|---|
| CMPCT | Compare Characters and Translate |
| MTR | Move to Register |
| MTM | Move to Memory |
| MVNX | Move Numeric Extended |
| CMPNX | Compare Numeric Extended |
| AD3DX | Add Using three Decimal Operands Extended |
| AD2DX | Add Using two Decimal Operands Extended |
| SB3DX | Subtract Using 3 Decimal Operands Extended |
| SB2DX | Subtract Using 2 Decimal Operands Extended |
| MP3DX | Multiply Using 3 Decimal Operands Extended |
| MP2DX | Multiply Using 2 Decimal Operands Extended |
| DV3DX | Divide Using 3 Decimal Operands Extended |
| DV2DX | Divide Using 2 Decimal Operands Extended |
| MVNEX | Move Numeric Edited Extended |

VIRTUAL MEMORY MANAGEMENT
PRIVILEGED INSTRUCTIONS

| | |
|---|---|
| LDWS | Load Working Space Registers |
| STWS | Store Working Space Registers |
| LDSS | Load Safe Store Register |
| STSS | Store Safe Store Register |
| LDAS | Load Argument Stack Register |
| LDPS | Load Parameter Stack Register |
| LPDBR | Load Page Table Directory Base Register |
| SPDBR | Store Page Table Directory Base Register |
| LDDSD | Load Data Stack Descriptor Register |
| STDSD | Store Data Stack Descriptor Register |
| LDDSA | Load Data Stack Address Register |
| STDSA | Store Data Stack Addres Register |
| CAMP | CLear Associative Memory Paged |
| CCAC | Clear Cache |
| EPAT | Effective Address and Pointer to Test |

APPENDIX A-continued

ALL MODE INSTRUCTIONS

| | |
|---|---|
| LDφ | Load Option Register |
| STφ | Store Option Register |
| STPS | Store Parameter Stack Register |
| STAS | Store Argument Stack Register |
| PAS | POP Argument Stack |
| LDDn | Load Descriptor (Register) n |
| SDRn | Store Descriptor Register n |
| STPn | Store Pointer n |
| LDPn | Load Pointer (Register) n |
| STDn | Store Descriptor Register n |
| EPPRn | Effective Pointer to Pointer (Register) n |
| LDEAn | Load Extended Address n |
| CLIMB | Domain Transfer |

It will be appreciated that many modifications may be made to the preferred embodiment of the present invention without departing from its teachings.

While in accordance with the provisions and statutes there has been illustrated and described the best form of the invention known, certain changes may be made to the system described without departing from the spirit of the invention as set forth in the appended claims and, in some cases, certain features of the invention may be used to advantage without a corresponding use of other features.

What is claimed is:

1. A microprogrammable data processing unit comprising:
    a number of registers, one of said registers for storing an instruction to be processed, said instruction including a multibit operation code;
    a first addressable control store having a plurality of storage locations, one for each different instruction operation code and including at least a multibit control sequence field, a control register field and an address field;
    a cycled second addressable control store having a plurality of storage locations for storing at least one microinstruction of a plurality of execution sequences;
    sequence control circuit means coupled to said first control store for generating one of a plurality of sequences of control signals designated by the coding of said control sequence field contained in one of said locations read out in response to an instruction operation code;
    a register section including a plurality of program visible registers and
    output selection means coupled to each of said plurality of registers, to said first control store and to said sequence control circuit means, said selection means in response to control register signals generated from said register field of each location of a group of locations read out in response to a corresponding one of said instruction operation codes selecting a specified one of said registers and each location of said group having an address field for referencing the same one of said execution sequences for execution of the operation specified by each instruction operation code.

2. The processing unit of claim 1 wherein said control sequence field and control register field respectively of each of the locations of said group of said first control store locations are coded to specify the same sequence of control signals and a different one of said plurality of program visible registers for enabling the sharing of said specified execution routine by the different types of instuctions which reference said group of locations.

3. The processing unit of claim 2 wherein said different types of instructions each have an operation code specifying a load operation.

4. The processing unit of claim 2 wherein said different types of instructions each have an operation code specifying a store operation.

5. The processing unit of claim 2 wherein the processing of instructions proceed in a pipelined fashion wherein each instruction is processed in a number of different phases of operation to completion, said sequence control circuit means generating said one of said plurality of sequences of control signals for performing those operations required for completing first and second ones of said phases of operation of said each instruction.

6. The processing unit of claim 2 wherein said instructions further include at least one address and wherein said processing unit further includes an execution unit for executing said instructions, coupled to said second control store and to said output selection means of said register section, said execution unit being conditioned by said one microinstruction of said same one of said execution sequences for executing the operation specified by said each instruction operation code, upon the contents of the register specified by the coding of the corresponding control register field during a third one of said phases of operation.

7. The processing unit of claim 6 wherein said processing unit operatively couples to a cache unit arranged to provide fast access to instructions and data stored therein, said different phases of operation including an instruction cycle (I cycle) corresponding to said first one of said phases wherein an instruction operand address is generated from said one address, a cache cycle (C cycle) corresponding to said second one of said phases wherein cache commands are generated causing said cache unit to fetch an operand specified by said instruction operand address and an execution cycle (E cycle) wherein the operation specified by said instruction operation code is performed upon said operand.

8. The processing unit of claim 1 wherein said plurality of program visible registers include:
    an accumulator (A) register;
    a quotient (Q) register;
    a number of index (Xn) registers; and
    an instruction counter IC.

9. The processing unit of claim 1 wherein said data processing unit further includes:
    control register selector means including output terminals, control terminals and a plurality of sets of input terminals, each one of said plurality of sets of input terminals being connected to generate control register signals having a different coded bit pattern and said control terminals being connected to receive signals corresponding to certain bits of said multibit control register field, said control register selector means being conditioned by said signals to apply to said output terminals from one of said number of said plurality of sets of input terminals, said control register signals designated by said bits of said multibit control register field.

10. The processing unit of claim 9 wherein said one of said plurality of registers is coupled to certain input terminals of one of said plurality of sets of input terminals for applying thereto signals corresponding to a portion of said instruction operation code, said plurality of program visible registers including a number of address registers and said control register selector means being conditioned by a predetermined pattern of said certain bits of said multibit control field to apply to said output terminals, signals corresponding to said portion of said instruction operation code for selecting one of said number of address registers.

11. The processing unit of claim 10 wherein each of said instructions includes at least one address, said number of address registers including a corresponding number of index values for selection in modifying said one address.

12. The processing unit of claim 9 wherein first, second, third and fourth sets of said plurality of input terminals are connected to generate control register signals having codes of 0001, 0010, 1 RBIR 24-26 and 0100 respectively and wherein the pair of least significant bits of said multibit control register field connect to said control terminals of said control register selector means.

13. The processing unit of claim 12 wherein said processing unit further includes:
   a first temporary register connected to receive said control register signals from said control register selector output terminals; and
   a second register connected to receive said control register signals from said first register for application to said output selection means.

14. The processing unit of claim 1 wherein each instruction further includes at least one address and a tag field coded for specifying the register to be used during an address modification, another one of said plurality registers coupled to said one register for storing signals corresponding to said tag field, register section further including:
   a plurality of busy status registers for controlling the updating of the contents of said plurality of program visible registers, each connected for storing coded values generated in response to said control register signals read out from one of said locations of said first control store in accordance with the operation codes of different ones of a number of instructions;
   a corresponding plurality of comparison circuits, each connected to a different one of said plurality of registers and to said another register;
   control circuits connected to each of said plurality of busy status registers, said sequence control circuit means and to said first control store for receiving certain ones of said control register signals coded to indicate the number of registers to be loaded with said coded values and the order of loading, said control circuits being by said certain ones of said control register signals to generate strobe signals for loading the specified number of busy status registers in a preestablished order with values of said control register signals specified by other ones of said control register signals; and
   output gating means connected to each of said comparison circuits for generating an output register busy signal indicating a comparison between the contents of any one of said busy status register and said another register so as to inhibit the utilization of the program visible register designated by said control register contents required for the processing of a next instruction.

15. The processing unit of claim 14 wherein the processing of instructions proceed in a pipelined fashion wherein each instruction is processed in a number of different phases of operation to completion, said sequence control circuit means being connected to said output gating means, said sequence control circuit means being conditioned to said output register busy signal to inhibit the further generation of said plurality of said sequence of control signals until said designated program visible register is no longer busy thereby preventing conflicts between instructions during pipeline operation.

16. The processing unit of claim 15 wherein said control circuits are coupled to said second control store, said control circuits being operative in response to each register signal generated from the read out of said one microinstruction of a specified one of said execution sequences from said second control store to generate an output signal for resetting to binary ZEROS, a previous loaded one of said plurality of busy status registers to resume said instruction processing.

17. The data processing unit of claim 1 wherein said processing unit operatively couples to a cache unit arranged to provide fast access to instructions and data stored therein, certain ones of said instructions having multiword formats including said multibit operation code and a plurality of operand addresses, said processing unit further including instruction counter updating apparatus, said apparatus comprising:
   an instruction counter for storing the address value of the next instruction to be fetched from said cache unit;
   increment selector means including output terminals, control terminals and a plurality of sets of input terminals, a first set of input terminals being connected to receive a 001increment value, a second set of input terminals being connected to said first control store for receiving signals corresponding to said control register signals, a third set of input terminals being connected to receive increment control signals from said second control store and said control terminals being connected to said sequence control means; and
   an adder circuit having first and second sets of input terminals connected to said instruction counter and said increment selector output terminals respectively and a set of output terminals connected to said instruction counter; said increment selector means being conditioned by said sequence control means upon completing the execution of one of said multiword formatted instruction to apply a value corresponding to said control register signals read out from one of said locations of said first control store in response to the operation code of said one multiword formatted instruction to said second set of adder input terminals, and said adder circuit incrementing the contents of said instruction counter by a value contained within said control register field of said one location.

18. A microprogrammable data processing unit comprising:
   a number of registers, one of said registers for storing an instruction to be processed, said instruction including a multibit operation code;
   a first addressable control store having a plurality of storage locations, one for each different instruction operation code and including at least a multibit control sequence field, a control register field and an address field;
   a cycled second addressable control store having a plurality of storage locations for storing at least one microinstruction of a plurality of execution sequences;

a register section including a plurality of registers; and output selection means coupled to each of said plurality of registers, to said first control store, said output selection means in response to control register signals generated from said register field of each location of a group of locations read out in response to a corresponding one of said instruction operation codes selecting a specified one of said registers and each location of said group having an address field for referencing the same one of said execution sequences for execution of the operation specified by each instruction operation code.

19. The processing unit of claim 18 wherein said control sequence field and control register field respectively of each of the locations of said group of said first control store locations are coded to specify the same sequence of control signals and a different one of said plurality of program visible registers for enabling the sharing of said specified execution routine by the different types of instructions which reference said group of locations.

20. The processing unit of claim 19 wherein the processing of instructions proceed in a pipelined fashion wherein each instruction is processed in a number of different phases of operation to completion and said processing unit further including sequence control circuit means coupled to said first control store for generating one of a plurality of sequences of control signals designated by the coding of said sequence control field contained in one of said locations read out in response to an instruction operation code, said sequence control circuit means generating said one of said plurality of sequences of control signals for performing those operations required for completing first and second ones of said phases of operation of said each instruction.

21. The processing unit of claim 18 wherein said instructions further include at least one operand address and wherein said processing unit further includes an execution unit for executing said instructions coupled to said second control store and to said output selection means of said register section, said execution unit being conditioned by said one microinstruction of said same one of said execution sequences for executing the operation specified by said each instruction operation code involving the operand specified by said operand address, upon the contents of the register specified by the coding of the corresponding control register field during a third one of said phases of operation.

22. The processing unit of claim 18 wherein said plurality of registers correspond to the program visible registers which include:
an accumulator (A) register;
a quotient (Q) register;
a number of index (Xn) registers; and
and instruction counter IC.

23. The processing unit of claim 18 wherein said data processing unit further includes:
control register selector means including output terminals, control terminals and a plurality of sets of input terminals, each one of said plurality of sets of input terminals being connected to generate control register signals having a difference coded bit pattern and said control terminals being connected to receive signals corresponding to certain bits of said multibit control register field, said control register selector means being conditioned by said signals to apply to said output terminals from one of said number of said plurality of sets of input terminals, said control register signals designated by said bits of said multibit control register field.

24. The processing unit of claim 23 wherein said one of said plurality of registers is coupled to certain input terminals of one of said plurality of sets of input terminals for applying thereto signals corresponding to a portion of said instruction operation code, said plurality of registers including a number of index address registers and said control register selector means being conditioned by a predetermined pattern of said certain bits of said multibit control field to apply to said output terminals, signals corresponding to said portion of said instruction operation code for selecting one of said number of index address registers.

25. The processing unit of claim 18 wherein each instruction further includes at least one address and a tag field coded for specifying the register to be used during an address modification, another one of said plurality registers coupled to said one register for storing signals corresponding to said tag field, register section further including:
a plurality of busy status registers for controlling the updating of the contents of said plurality of registers, each connected for storing coded values generated in response to said control register signals read out from one of said locations of said first control store in accordance with the operation codes of different ones of a number of instructions;
a corresponding plurality of comparison circuits each connected to a different one of said plurality of registers and to said another register;
control circuits connected to each of said plurality of busy status registers, said sequence control circuit means and to said first control store for receiving certain ones of said control register signals coded to indicate the number of registers to be loaded with said coded values and the order of loading, said control circuits being by said certain ones of said control register signals to generate strobe signals for loading the specified number of busy status registers in a preestablished order with values of said control register signals specified by other ones of said control register signals; and
output gating means connected to each of said comparison circuits for generating an output register busy signal indicating a comparison between the contents of any one of said busy status register and said another register so as to inhibit the utilization of the program visible register designated by said control register contents required for the processing of a next instruction.

26. The data processing unit of claim 18 wherein said processing unit operatively couples to a cache unit arranged to provide fast access to instructions and data stored therein, certain ones of said instructions having multiword formats including said multibit operation code and a plurality of operand addresses, said processing unit further including instruction counter updating apparatus, said apparatus comprising:
an instruction counter for storing the address value of the next instruction to be fetched from said cache unit;
increment selector means including output terminals, control terminals and a plurality of sets of input terminals, a first set of input terminals being connected to receive a 001 increment value, a second set of input terminals being connected to said first control store for receiving signals corresponding to said control register signals, a third set of input terminals being connected to receive increment control signals from said second control store and said control terminals being connected to said sequence control means; and an adder circuit having first and second sets of input terminals connected to said instruction counter and said increment selector output terminals respectively and a set of output terminals connected to said instruction counter; said increment selector means being conditioned by said sequence control means upon completing the execution of one of said multiword formatted instruction to apply a value corresponding to said control register signals read out from one of said locations of said first control store in response to the operation code of said one multiword formatted instruction to said second set of adder input terminals, and said adder circuit incrementing the contents of said instruction counter by a value contained within said control register field of said one location.

27. A microprogrammable data processing unit comprising:

a number of registers, one of said registers for storing an instruction to be processed, said instruction including a multibit operation code;

a first addressable control store having a plurality of storage locations, one for each different instruction operation code and including at least a multibit control sequence field, a control register field and an address field, and certain groups of storage locations including identical values of said multibit control sequence fields and said address fields in addition to different values of said multibit control register fields;

a cycled second addressable control store having a plurality of storage locations for storing at least one microinstruction of a plurality of execution sequences;

sequence control circuit means coupled to said first control store for generating one of a plurality of sequences of control signals designated by the coding of said control sequence field contained in one of said locations read out in response to an instruction operation code;

a register section including a plurality of program visible registers; and output selection means coupled to each of said plurality of registers, to said first control store and to said sequence control circuit means, said selection means in response to control register signals generated from said register field of each location of one of said groups of locations read out in response to a corresponding one of said instruction operation codes selecting a specified one of said registers and each location of said one group referencing the same one of said execution sequences for execution of the operation specified by each instruction operation code thereby enabling the sharing of common execution routines by the different types of instructions included within each of said groups.

28. The processing unit of claim 27 wherein said different types of instructions of a first one of said groups each have an operation code specifying a load operation.

29. The processing unit of claim 28 wherein said different types of instructions of a second one of said groups each have an operation code specifying a store operation.

30. The processing unit of claim 27 wherein the processing of instructions proceed in a pipelined fashion wherein each instruction is processed in a number of different phases of operation to completion, said sequence control circuit means generating said one of said plurality of sequences of control signals for performing those operations required for completing first and second ones of said phases of operation of said each instruction.

31. The processing unit of claim 27 wherein said instructions further include at least one address and wherein said processing unit further includes an execution unit for executing said instructions coupled to said second control store and to said output selection means of said register section, said execution unit being conditioned by said one microinstruction of said same one of said execution sequences for executing the operation specified by said each instruction operation code, upon the contents of the register specified by the coding of the corresponding control register field during a third one of said phase of operation.

32. The processing unit of claim 27 wherein said plurality of program visible registers include:

an accumulator (A) register;

a quotient (Q) register;

a numer of index (Xn) registers, and an instruction counter IC.

33. The processing unit of claim 27 wherein said data processing unit further includes:

control register selector means including output terminals, control terminals and a plurality of sets of input terminals, each one of said plurality of sets of input terminals being connected to generate control register signals having a different coded bit pattern and said control terminals being connected to receive signals corresponding to certain bits of said multibit control register field, said control register selector means being conditioned by said signals to apply to said output terminals from one of said number of said plurality of sets of input terminals, said control register signals designated by said bits of said multibit control register field.

34. The processing unit of claim 33 wherein said one of said plurality of registers is coupled to certain input terminals of one of said plurality of sets of input terminals for applying thereto signals corresponding to a portion of said instruction operation code, said plurality of program visible registers including a number of index registers and said control register selector means being conditioned by a predetermined pattern of said certain bits of said multibit control field to apply to said output terminals, signals corresponding to said portion of said instruction operation code for selecting one of said number of index registers.

35. The processing unit of claim 27 wherein each instruction further includes at least one address and a tag field coded for specifying the register to be used during an address modification, another one of said plurality registers coupled to said one register for storing signals corresponding to said tag field, register section further including:

a plurality of busy status registers for controlling the updating of the contents of said plurality of program visible registers, each connected for storing coded values generated in response to said control register signal read out from one of said locations of said first control store in accordance with the operation codes of different ones of a number of instructions;

a corresponding plurality of comparison circuits each connected to a different one of said plurality of registers and to said another register;

control circuits connected to each of said plurality of busy status registers, said sequence control circuit means and to said first control store for receiving certain ones of said control register signals coded to indicate the number of registers to be loaded with said coded values and the order of loading, said control circuits being by said certain ones of said control register signals to generate strobe signals for loading the specified number of busy status registers in a preestablished order with values of said control register signals specified by other ones of said control register signals; and output gating means connected to each of said comparison circuits for generating an output register busy signal indicating a comparison between the contents of any one of said busy status register and said another register so as to inhibit the utilization of the program visible register designated by said control register contents required for the processing of a next instruction.

36. The data processing unit of claim 27 wherein said processing unit operatively couples to a cache unit arranged to provide fast access to instructions and data stored therein, certain ones of said instructions having multiword formats including said multibit operation code and a plurality of operand addresses, said processing unit further including instruction counter updating apparatus, said apparatus comprising:

an instruction counter for storing the address value of the next instructions to be fetched from said cache unit;

increment selector means including output terminals, control terminals and a plurality of sets of input terminals, a first set of input terminals being connected to receive a 001 increment value, a second set of input terminals being connected to said first control store for receiving signals corresponding to said control register signals, a third set of input terminals being connected to receive increment control signals from said second control store and said control terminals being connected to said sequence control means; and an adder circuit having first and second sets of input terminals connects to said instruction counter and said increment selector output terminals respectively and a set of output terminals connected to said instruction counter; said increment selector means being conditioned by said sequence control means upon completing the execution of one of said multiword formatted instruction to apply a value corresponding to said control register signals read out from one of said locations of said first control store in response to the operation code of said one multiword formatted instruction to said second set of adder input terminals, and said adder circuit incrementing the contents of said instruction counter by a value contained within said control register field of said one location.

* * * * *